(12) United States Patent
Zancewicz

(10) Patent No.: US 7,092,690 B2
(45) Date of Patent: Aug. 15, 2006

(54) GENETIC ALGORITHM-BASED ADAPTIVE ANTENNA ARRAY PROCESSING METHOD AND SYSTEM

(76) Inventor: Gregory Zancewicz, 3204 Berry Hollow Dr., Melissa, TX (US) 75454

( * ) Notice: Subject to any disclaimer, the term of this patent is extended or adjusted under 35 U.S.C. 154(b) by 215 days.

(21) Appl. No.: 10/388,048

(22) Filed: Mar. 13, 2003

(65) Prior Publication Data
US 2004/0043795 A1 Mar. 4, 2004

Related U.S. Application Data

(60) Provisional application No. 60/364,234, filed on Mar. 13, 2002.

(51) Int. Cl.
*H04B 1/06* (2006.01)
(52) U.S. Cl. .................. 455/273; 455/272; 455/276.1; 455/562.1; 342/368; 342/373
(58) Field of Classification Search ................ 455/272, 455/101, 562.1, 277.2, 278.1, 121, 276.1, 455/279.1, 295, 296, 304, 575.1, 550.1, 424, 455/425, 456.5, 456.6, 19, 13.3, 25, 63.4, 455/67.11, 82, 561, 575.7, 129, 452.2, 272.1; 370/310, 329, 95.1, 95.3, 119, 334, 321, 347; 342/368, 422, 378, 383, 384, 373, 374, 81, 342/154, 380, 367, 361, 364, 365, 366, 371, 342/52, 372, 74; 375/200, 205, 346, 347, 375/351; 343/712, 728, 725, 808
See application file for complete search history.

(56) References Cited

U.S. PATENT DOCUMENTS

| | | | | |
|---|---|---|---|---|
| 5,276,452 A | * | 1/1994 | Schuss et al. | 342/371 |
| 5,592,490 A | * | 1/1997 | Barratt et al. | 370/310 |
| 5,815,198 A | * | 9/1998 | Vachtsevanos et al. | 348/88 |
| 5,974,355 A | * | 10/1999 | Matsumoto et al. | 701/120 |
| 6,141,567 A | * | 10/2000 | Youssefmir et al. | 455/562.1 |
| 6,175,331 B1 | * | 1/2001 | Woodsum et al. | 342/373 |
| 6,177,906 B1 | * | 1/2001 | Petrus | 342/378 |
| 6,185,440 B1 | * | 2/2001 | Barratt et al. | 455/562.1 |

(Continued)

OTHER PUBLICATIONS

Daniel Weile et al., "The control of adaptive antenna arrays with genetic algorithms using dominance and diploidy", Oct. 2001, IEEE 0018-926x/01, Bol. 49, No. 10, pp. 1424-1433.*

(Continued)

*Primary Examiner*—Edward F. Urban
*Assistant Examiner*—Charles Chow
(74) *Attorney, Agent, or Firm*—Sterne, Kessler, Goldstein & Fox P.L.L.C.

(57) ABSTRACT

A genetic processor is used to process a plurality of baseband signals in a communication system. Signals received at an antenna array are processed to form chromosomes based on signal-to-interference-and-noise ratios. The chromosomes are further processed to determine a fitness of the chromosomes, and a weight set corresponding to a determined best fitness level is used to selectively process each signal corresponding to each antennae of the array to increase the dynamic range of the receiver. In-phase, quadrature, amplitude and phase are signal characteristics that may be processed.

In the transmit direction, the chromosomes are used to process the modulating signal supplied to each RF antenna, thus resulting in beamforming, the actual signal processing occurs digitally in the baseband spectrum.

Chromosomes comprise a number of genes, or bits, based on the type of encoding scheme and the polarization, number and array grouping of antenna elements.

16 Claims, 48 Drawing Sheets

U.S. PATENT DOCUMENTS

| | | |
|---|---|---|
| 6,351,237 B1 * | 2/2002 | Martek et al. .............. 342/361 |
| 2001/0022558 A1 | 9/2001 | Karr, Jr. et al. |
| 2001/0035836 A1 | 11/2001 | Micell et al. |
| 2004/0090938 A1 | 5/2004 | Hsu |

OTHER PUBLICATIONS

F. J. Ares-Pena et al., "Genetic algorithms in the design and optimization of antenna array patterns," *IEEE Transactions on Antennas and Propagation*, vol. 47, No. 3, Mar. 1999, pp. 506-510.

D. Boeringer and D. Werner, "Adaptive mutation parameter toggling genetic algorithm for phase-only array synthesis," *IEEE Electronics Letters*, Dec. 5, 2002, vol. 38, No. 25, pp. 1618-1619.

D. Boeringer et al., "Synthesis of phased array amplitude weights for stationary sidelobe envelopes using genetic algorithms," *IEEE Antennas and Propagation Society International Symposium*, 2001, vol. 4, pp. 684-687.

R.L. Haupt, "Phase-only adaptive nulling with a genetic algorithm," *IEEE Transactions on Antennas and Propagation*, vol. 45, No. 6, Jun. 1997, pp. 1009-1015.

A. Lommi et al., "Sidelobe reduction in sparse linear arrays by genetic algorithms," *Microwave and Optical Technology Letters*, Feb. 5, 2002, vol. 32, No. 3, pp. 194-196.

D. Marcano and F. Durán, "Synthesis of Antenna Arrays Using Genetic Algorithms," *IEEE Antennas and Propagation Magazine*, vol. 42, No. 3, Jun. 2000, pp. 12-20.

M. Vitale et al., "Genetic algorithm assisted adaptive beamforming," presented at the *IEEE Vehicular Technology Conference (VTC), Proceedings*, VTC Fall 2002, vol. 1, pp. 601-605.

K-K Yan and Y. Lu, "Sidelobe Reduction in Array-Pattern Synthesis Using Genetic Algorithm," *IEEE Transactions on Antennas and Propagation*, vol. 45, No. 7, Jul. 1997, pp. 1117-1122.

K. Yen and L. Hanzo, "Hybrid genetic algorithm based multi-user detection schemes for synchronous CDMA systems," presented at the *IEEE Vehicular Technology Conference (VTC), Proceedings*, VTC Spring 2000, vol. 2, pp. 1400-1404.

K. Yen and L. Hanzo, "Genetic algorithm based antenna diversity assisted multiuser detection for synchronous CDMA systems," presented at the *IEEE Vehicular Technology Conference (VTC), Proceedings*, VTC Spring 2001, vol. 3, pp. 1794-1798.

S. Caorsi et al., "A real-time approach to array control based on a Learned Genetic Algorithm," *Microwave and Optical Technology Letters*, Feb. 20, 2003, vol. 36, No. 4, pp. 235-238.

S. Caorsi et al., "A new GA-based strategy for adaptive antenna array control". pp. 447-450. Atti del convegno "12th International Symposium on Antennas," Nice, France, Nov. 12-14, 2002.

\* cited by examiner

Binary encoded chromsomes before crossover
A `0 1 1 0 0 1 0 0 1 1 0 0 1 1 1 0`
B `0 1 1 0 1 0 1 0 1 0 1 0 1 0 1 1`
Crossover Locus
`0 1 1 0 0 1`   `0 0 1 1 0 0 1 1 1 0`
`0 1 1 0 1 0`   `1 0 1 0 1 0 1 0 1 1`
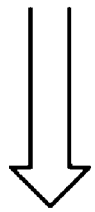
`0 1 1 0 1 0 0 0 1 1 0 0 1 1 1 0`
`0 1 1 0 0 1 1 0 1 0 1 0 1 0 1 1`
Chromosomes after crossover
FIG. 18

GENETIC ALGORITHM-BASED ADAPTIVE ANTENNA ARRAY PROCESSING METHOD AND SYSTEM

CROSS REFERENCE TO RELATED APPLICATION

This application claims the benefit of priority under 35 U.S.C. 119(e) to the filing date of Zancewicz, et al, U.S. provisional patent application No. 60/364,234 entitled "Genetic Algorithm-Based Adaptive Antenna Array Processing Method and System", which was filed Mar. 13, 2002, and is incorporated herein by reference.

FIELD OF THE INVENTION

The present invention relates to adaptive antenna array systems. More specifically, the present invention relates to using genetic algorithms for controlling the reception and radiation patterns of an adaptive array antenna within a digitally adaptive beam forming system.

BACKGROUND

Antennas may be classified as either single element or array antennas. Single element antennas may be either onmidirectional or directional. Array antennas may be classified as phased arrays or adaptive arrays. Onmidirectional antennas have equal gain in all directions and are also known as isotropic antennas. Directional antennas have more gain in certain directions and less in others. In general, an antenna may be omnidirectional in one plane (e.g. azimuth) while being directional in another (e.g. elevation). A phased array antenna system uses an array of simple ominidirectional or directional element antennas and combines the signal induced on the antennas to form an array output.

Such an antenna system typically controls the direction where maximum gain appears by adjusting the electrical phase difference between different antenna elements. An adaptive antenna is another type of antenna array that also combines the outputs of an) array of antenna elements, but controls the directional gain of the antenna by adjusting both phase and amplitude of the signal at each individual element. As described above, the array processor combines the signals induced on different elements to form a single output of the array. In the receive, or uplink, direction, the induced signals are produced by electromagnetic waves created by remote sources or transmitters and the signals are combined electronically. In the transmit, or downlink, direction, the induced signals are produced by individual transmitter elements feeding the array and the signals are combined in space through the coherent addition of electromagnetic waves.

A plot of the array response as a function of angle (azimuth and/or elevation) is normally referred to as the array pattern or beam pattern. The process of combining signals from different elements is known as beamforming. In general, beamforming creates both maximal gain in one or more directions and minimal gain or pattern nulls in others. Directional antennas in essence employ static beam forming, where the desired beam pattern is determined in advance of the antenna design and installation, and is typically not changed once implemented. Beam steering with directional antennas is typically performed mechanically by steering the entire antenna platform. Adaptive beam forming techniques permit the host system to change the antenna beam pattern electronically through the use of adaptive arrays or phased arrays in real time in response to changes in environment or system requirements.

Adaptive beam forming systems can be classified as either a radio frequency ("RF") adaptive beamformer ("RFAB") or a digital adaptive beamformer ("DABF"). An RFAB system adjusts the phases and/or amplitudes of signals at the RF or intermediate frequency ("IF") stage of the transmitter and/or receiver chain associated with the antenna. The number of beam patterns which a RFAB can produce is limited practically by the number of electrical attenuators and phase shifters available prior to the antenna terminals. A DABF system adjusts the phases and/or amplitudes of signals digitally. In a DABF receiver, signals are processed after they have been converted to IF or separated into baseband in-phase and quadrature components and digitally sampled, but prior to demodulation. In a DABF transmitter, signals are processed after modulation, but prior to digital-to-analog conversion.

Because beam forming is done digitally and is not limited practically by the number of RF or IF attenuators or phase shifters, separate signal channels can be established for each remote source or receiver of interest. Sources may include, for example, a user in the case of a wireless radio access network, a target in the case of a radar system, a jammer in the case of an electronic countermeasures ("ECM") or electronic counter-countermeasures ("ECCM") system, or some source, in the case of an electronic warfare ("EW") system. A receiver may also be any one of these.

DABF algorithms can be classified in terms of the following features, including, for example, whether the signal angle-of-arrival ("AOA") must be known; whether or not the algorithm functions in the presence of interference and if so, what number of interferers can be supported; whether the interferer's AOAs must be known; whether the number of interferers is known or unknown; and special characteristics required of the signal. A survey of available beamforming algorithms is shown in Table 1. When the signal and/or interferer AOA is required, an additional set of AOA-estimation techniques are available. The most popular techniques in this class include the Multiple Signal Classification (MUSIC) technique, Root-MUSIC, and ESPRIT.

TABLE 1

Survey of Beamforming Algorithms

| Technique | Number of Interferers | Parameter Optimized | Interferers AOA | Signal AOA | Special Signal Characteristics |
|---|---|---|---|---|---|
| Delay-and-sum | None | SNR | Known | Known | |
| DICANNE | 1 or more (unknown) | Signal Power | | | |

TABLE 1-continued

Survey of Beamforming Algorithms

| Technique | Number of Interferers | Parameter Optimized | Interferers AOA | Signal AOA | Special Signal Characteristics |
|---|---|---|---|---|---|
| NAMI, SPNAMI | 1 or more (unknown) | SINR | Unknown | Known | |
| MMSE, LMS, RLS, MRIII | 1 or more (unknown) | Reference Maximum Likelihood | Unknown | Unknown | Reference Signal Required |
| Eigenstructure methods | 1 or more (known) | SINR | Unknown | Unknown | |
| CMA | 1 or more (unknown) | Signal MSE | Unknown | Unknown | Requires signal to be constant magnitude |

(The Number of Interferers Assumed to be Less Than L−2 in All Cases, Where L is the Number of Antenna Elements)

One constraint on all of the existing techniques is the requirement that the number of sources be less than the number of antenna elements. Without this constraint, the optimization problem would amount to an unconstrained problem where the number of equations (i.e. the number of antenna element signals) would be less than the number of unknowns (i.e. the number of user signals)—a problem with no closed-form solution.

While some antenna element weights would produce higher signal-to-interference-and-noise ratio ("SINR") values than other weights, it is difficult if not impossible to determine which weight sets are relatively better than others without some sort of exhaustive search over the entire set of possible antenna weights. The dimensionality of such a search is daunting however—for an 8-element array with phase and amplitude weight factors encoded with 8-bits, the number of possible weight sets is $2^{128}$ ($10^{34}$).

Genetic algorithms have been applied successfully to a variety of problems with highly dimensional solution spaces rich in local extrema. Genetic algorithms work by encoding potential solutions in data objects referred to as chromosomes, which are then manipulated using genetic operations such as crossover, mutation, and inversion in response to some measure of fitness of each trial solution. Additional genetic operators include segregation, translocation, duplication, deletion, sexual determination, differentiation and speciation.

Genetic algorithms have been applied in a number of antenna design problems. Typically, the algorithm is applied to optimize some single or multi-variate cost function, such as gain or sidelobe level. Haupt has described an adaptive method whereby nulls are placed in a received antenna pattern in such a way as to minimize interference signal power (see FIG. 1). Haupt's method employed a conventional phased array with digital phase shifters, but with the least significant bits ("LSB") of the phase shifters controlled using a genetic algorithm.

For example, U.S. Pat. No. 6,175,331 to Woodsum et al. ("Woodsum"), entitled "Method and Apparatus for Determining and Forming Delayed Waveforms for Forming Radio Frequency Transmitting or Receiving Beams for An Array of Radio Frequency Transmitting or Receiving Elements," discloses applying genetic algorithms to a phased array system where the number of antenna elements exceeds the number of user signal channels (see FIG. 2). Woodsum's methods assume that the ideal beam pattern and phase shifts for each antenna element are known, but that only a limited number of phase shifts are available. The methods disclosed employ genetic algorithms to assign antenna elements to the set of available phase shifts such that the sum of the squared differences between the ideal and assigned phase shifts is minimized. In addition, U.S. patent application Ser. No. 09/629,386 to G. J. Zancewicz, entitled 'Genetic Adaptive Antenna Array Processor' ("386 application") discloses a general adaptive array processor that controls both phase and amplitude and incorporates an additional genetic operator—inversion.

Finally, Weile and Michielssen, in "The Control of Adaptive Antenna Arrays with genetic Algorithms Using Dominance and Diploidy," *IEEE Transactions on Antennas and Propagation,* vol. 49, 2001, pp. 1424–1433, have recently described a method whereby a genetic algorithm employing chromosome pairs—called diploid chromosomes—is used to control a linear phased array in a receiving system such that the desired SINR is maximized—the so-called Applebaum Optimization Criterion. See FIG. 3.

SUMMARY

The systems, methods, and apparatuses disclosed comprise uplink (receiver) adaptive array systems, which feature control over amplitude and/or phase using genetic algorithm ("GA") based processing in different combinations of the azimuth, elevation, polarization, and time domains and downlink (transmitter) adaptive array systems including blind systems, which replicate uplink beamforming parameters. GA processing that employs unique selection mechanisms is used, as well as calibrated systems that employ uplink beamforming information, but exploit additional array calibration information, and a downlink system which optimizes the downlink beam in a fashion which jointly optimizes the expected worst case SINR within a group of receivers. Also disclosed are macrodiversity methods so that antenna elements do not need to be collocated and optoelectronic transmission techniques, which enable efficient transmission of downlink and uplink signals between transceiving equipment and antenna elements

BRIEF DESCRIPTION OF THE DRAWINGS

FIG. 18 illustrates a crossover process.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude io any such other embodiments, adaptations, variations, modifications and equivalent arrangements, the present invention being limited only by the claims appended hereto and the equivalents thereof.

Figure 1:
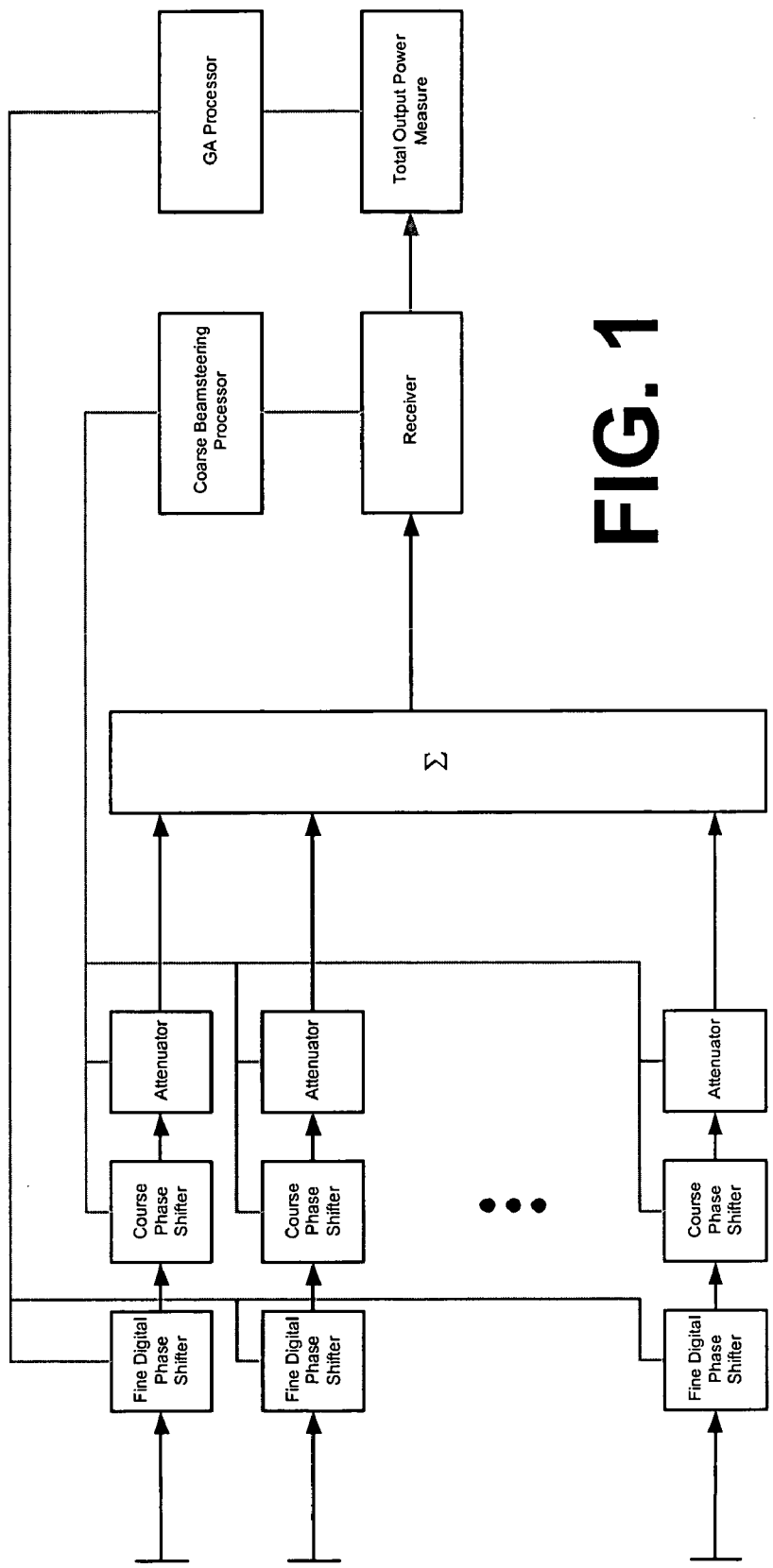
FIG. 1 illustrates prior art as disclosed in Haupt.
Figure 2:
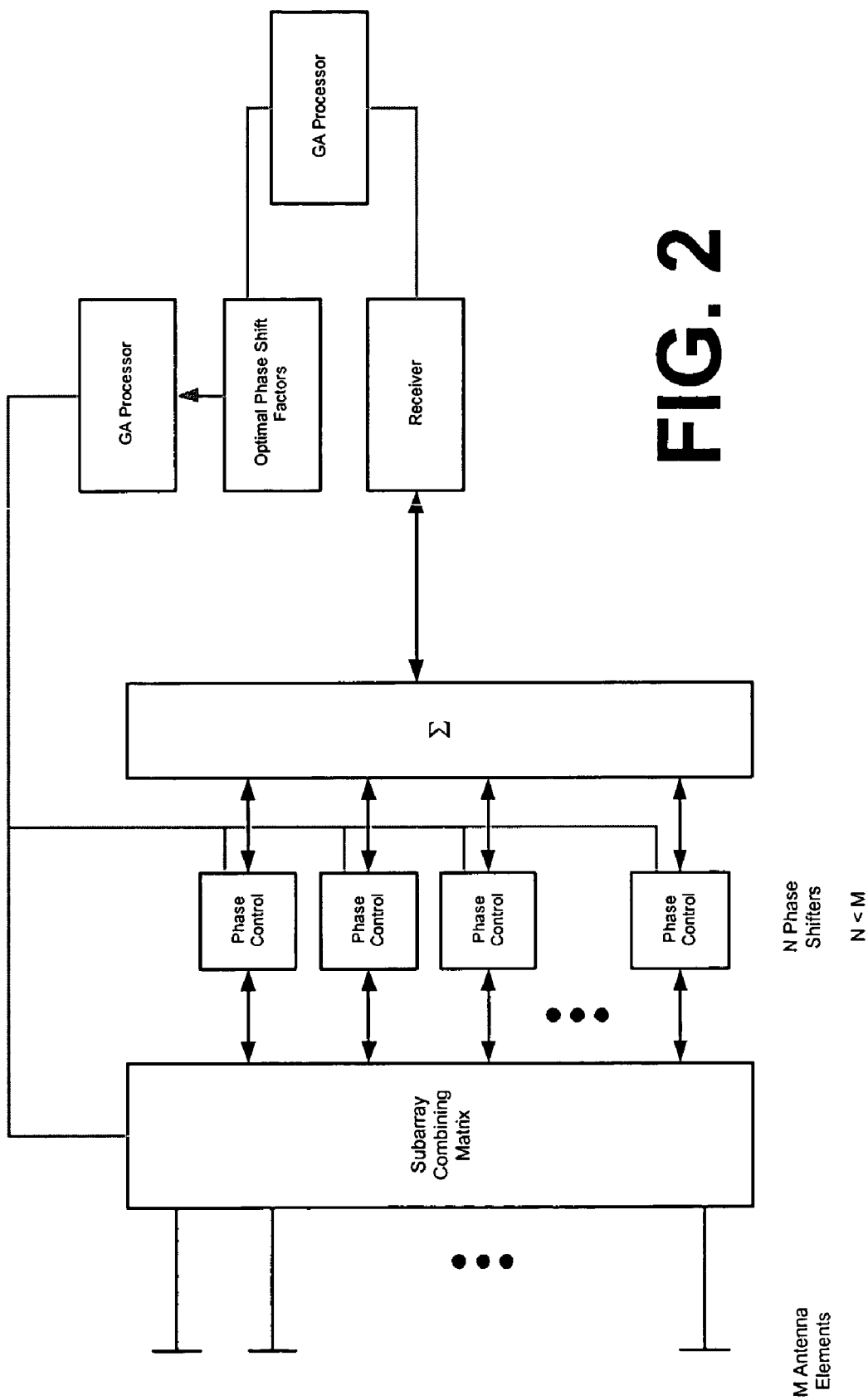
FIG. 2 illustrates prior art as disclosed in Woodsum.
Figure 3:
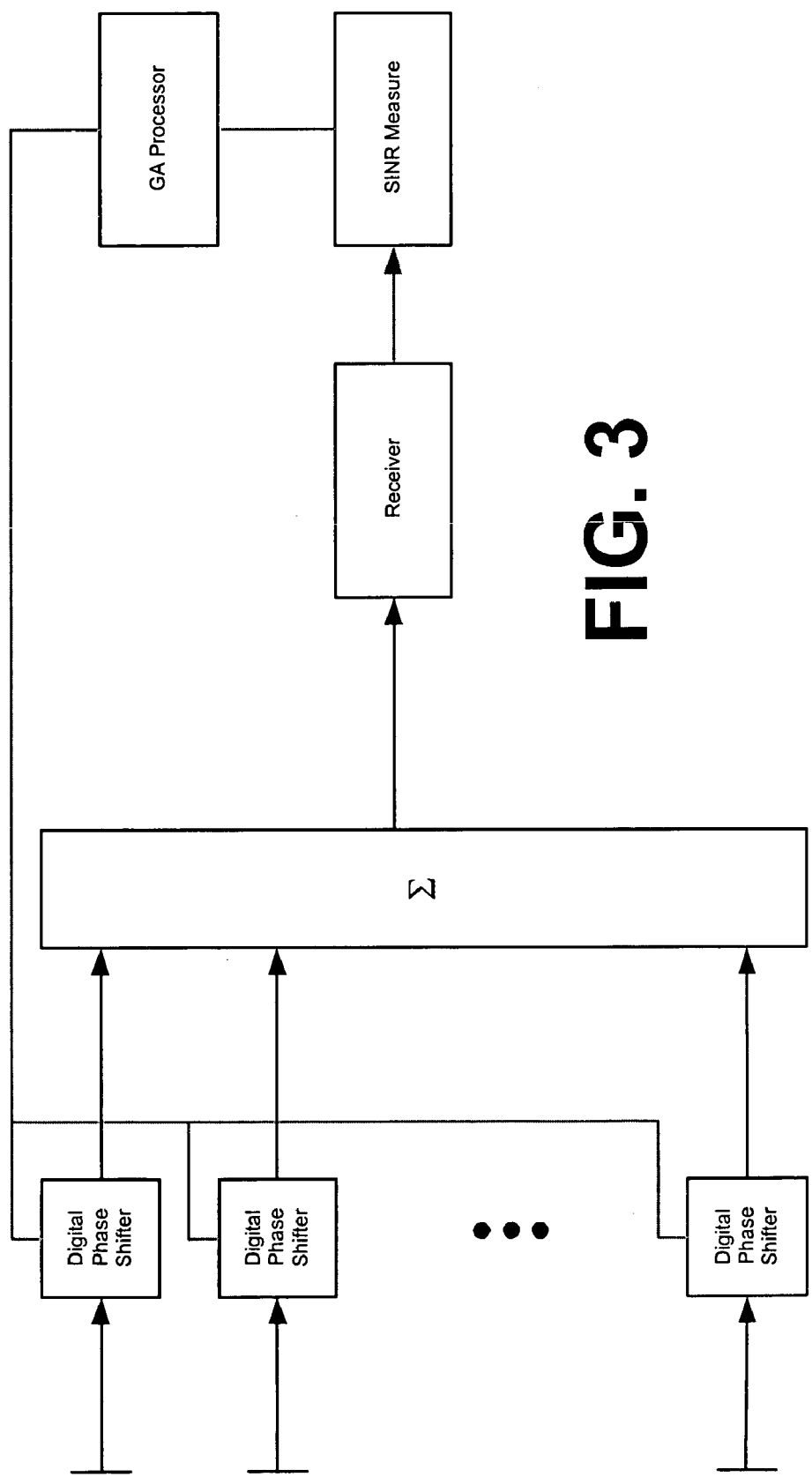
FIG. 3 illustrates prior art as disclosed by Weile and Michielssen.
Figure 4:
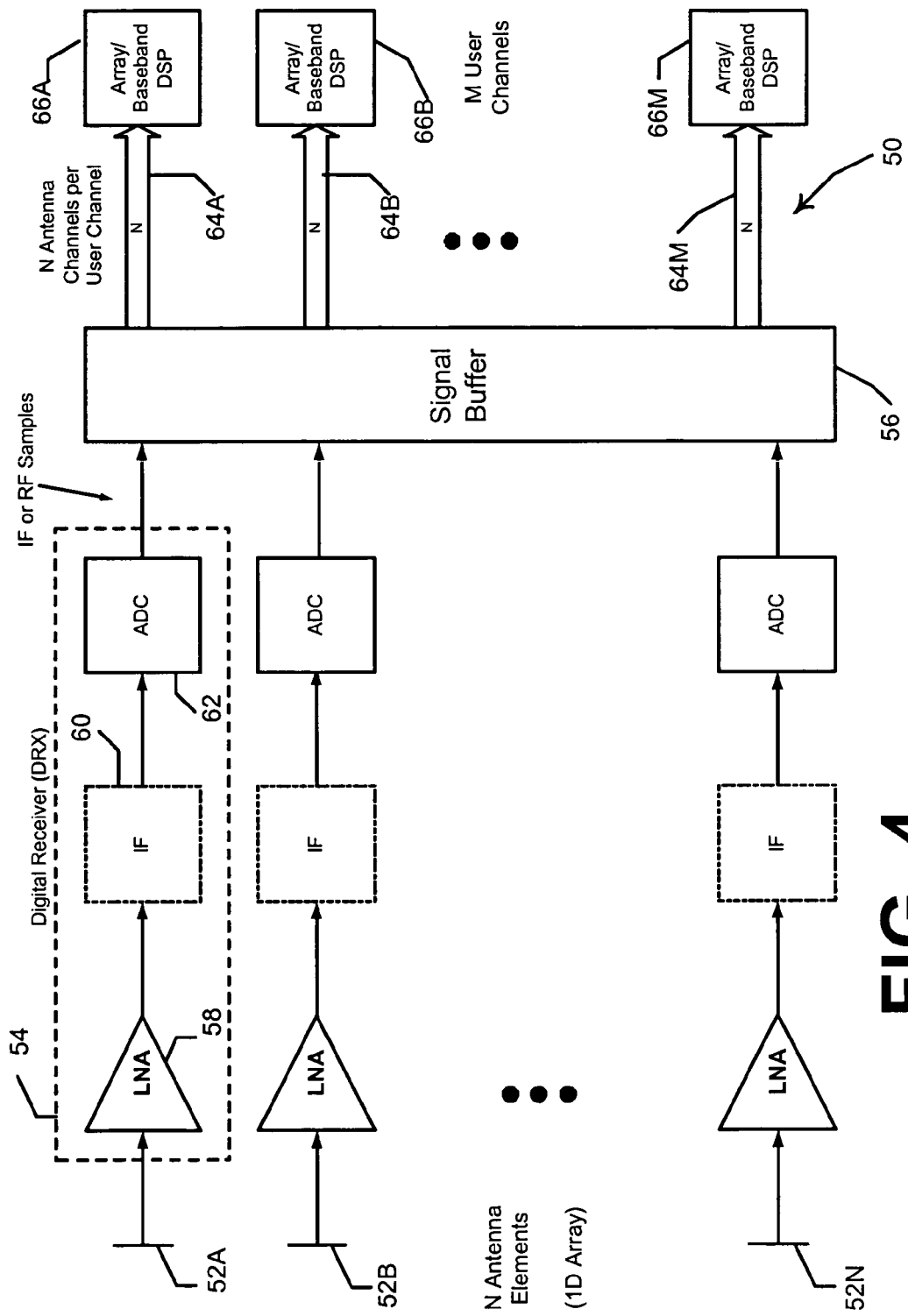
FIG. 4 illustrates an uplink DABF system.

Turning now to the figures, FIG. 4 illustrates a basic uplink digital adaptive beamfoming ("DABF") system 50. A plurality of receive antenna elements 52 corresponds to a plurality of digital receiver ("DRX") sections 54 for providing an input signal to signal buffer 56. Each DRX 54 comprises a low noise amplifier ("LNA") 58, an optional intermediate frequency ("IF") conversion section 60, which converts higher frequency radio frequency ("RF") signals to some lower frequency, and an analog-to-digital converter ("ADC") 62, which converts the analog IF input signal to a parallel or serial bit stream of digital samples. Optionally, ADC 62 may operate directly on the RF signal received from antenna element 52. Signal buffer 56 accepts the parallel or serial bit streams from ADC 62 of DRX 54 and provides M outputs 64, each of which provides a multiplexed signal comprising the bit streams received from ADC 62. This signal is received by an Array/Baseband Digital Signal Processor ("DSP") 66 corresponding to one of the multiplexed output signals from signal buffer 56. It will be appreciated that N typically corresponds to the number of antennae elements, which is four in the preferred embodiment, and M corresponds to the number of users using the system simultaneously.

Figure 5:
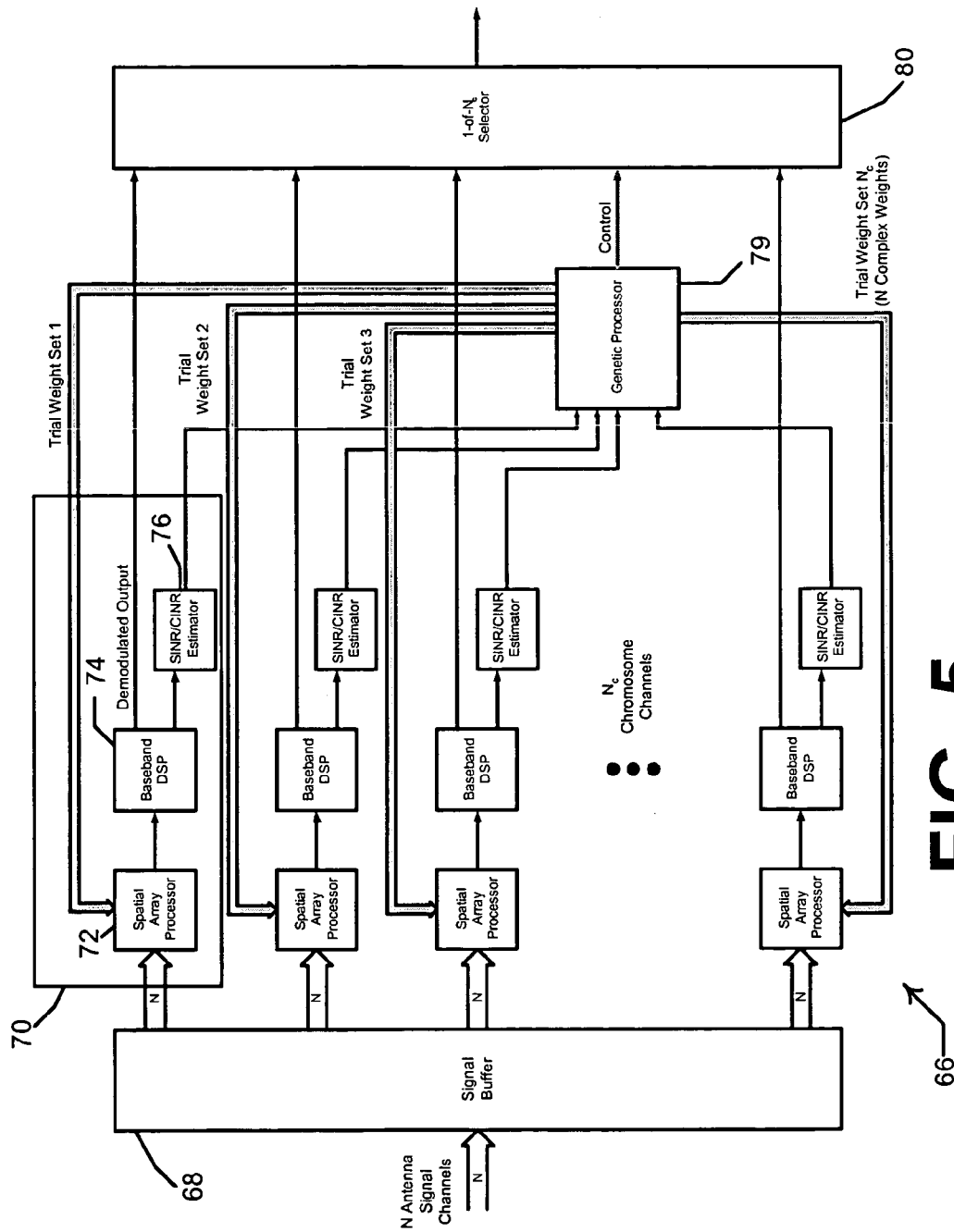
FIG. 5 illustrates the preferred structure of an array/baseband DSP.

The structure of each Array/Baseband DSP 66 is shown in FIG. 5. Each Array/Baseband DSP module 66 includes a signal buffer 68 that provides a predetermined number, $N_C$, of copies of the multiplexed digital input from the N antenna elements. For each of the $N_C$ inputs, chromosome processing block 70 includes spatial array processor 72 and a baseband DSP 74, which provides a demodulated signal output to SINR estimator 76. Genetic processor 79 accepts SINR estimates from each SINR estimator 76 and, using a genetic algorithm, generates a distinct candidate antenna-element-weighting-factor set for each spatial array processor 72 based on the genetic fitness of the chromosome generated by corresponding processing block 70. A 1-of-$N_C$ selector 80 selects the demodulated output from the chromosome channel that has the optimal SINR, which may be interpreted as being the chromosome that is the most genetically fit. Thus, for each user channel M as shown in FIG. 4, when a communication signal corresponding to that particular user is being transmitted or received, that signal is optimized in the baseband spectrum with respect to noise and interference, before being output from selector 80.

Figure 6:
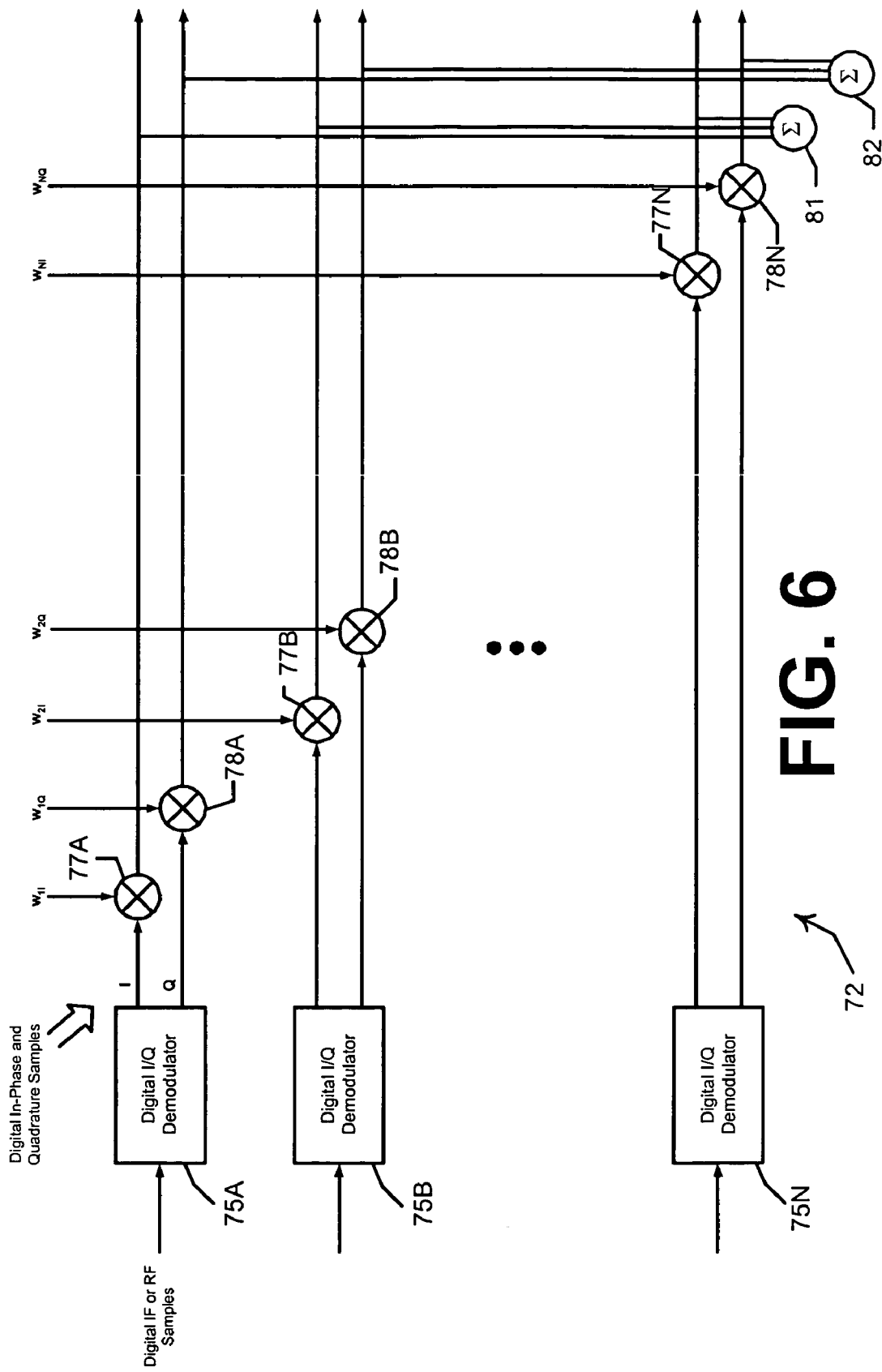
FIG. 6 illustrates the preferred structure of a spatial array processor.

Each spatial array processor 72 comprises the components shown in FIG. 6. N digital I/Q demodulators 75 each feed an in-phase multiplier 77 and a quadrature multiplier 78 that multiply the in-phase and quadrature outputs of each corresponding I/Q demodulator by the in-phase and quadrature component, respectively, of the corresponding candidate antenna element weight generated by genetic processor 79 shown in FIG. 5. In-phase summing block 81 provides the sum of the results of all in-phase component multiplications and a quadrature summing block 82 provides the sum of the results of all quadrature component multiplications.

Alternatively, instead of separate in-phase and quadrature multipliers 77 and 78, respectively, for each baseband signal, a single complex multipler may be used to apply the complex weight factors to a complex baseband signal generated by the demodulator.

Figure 7:
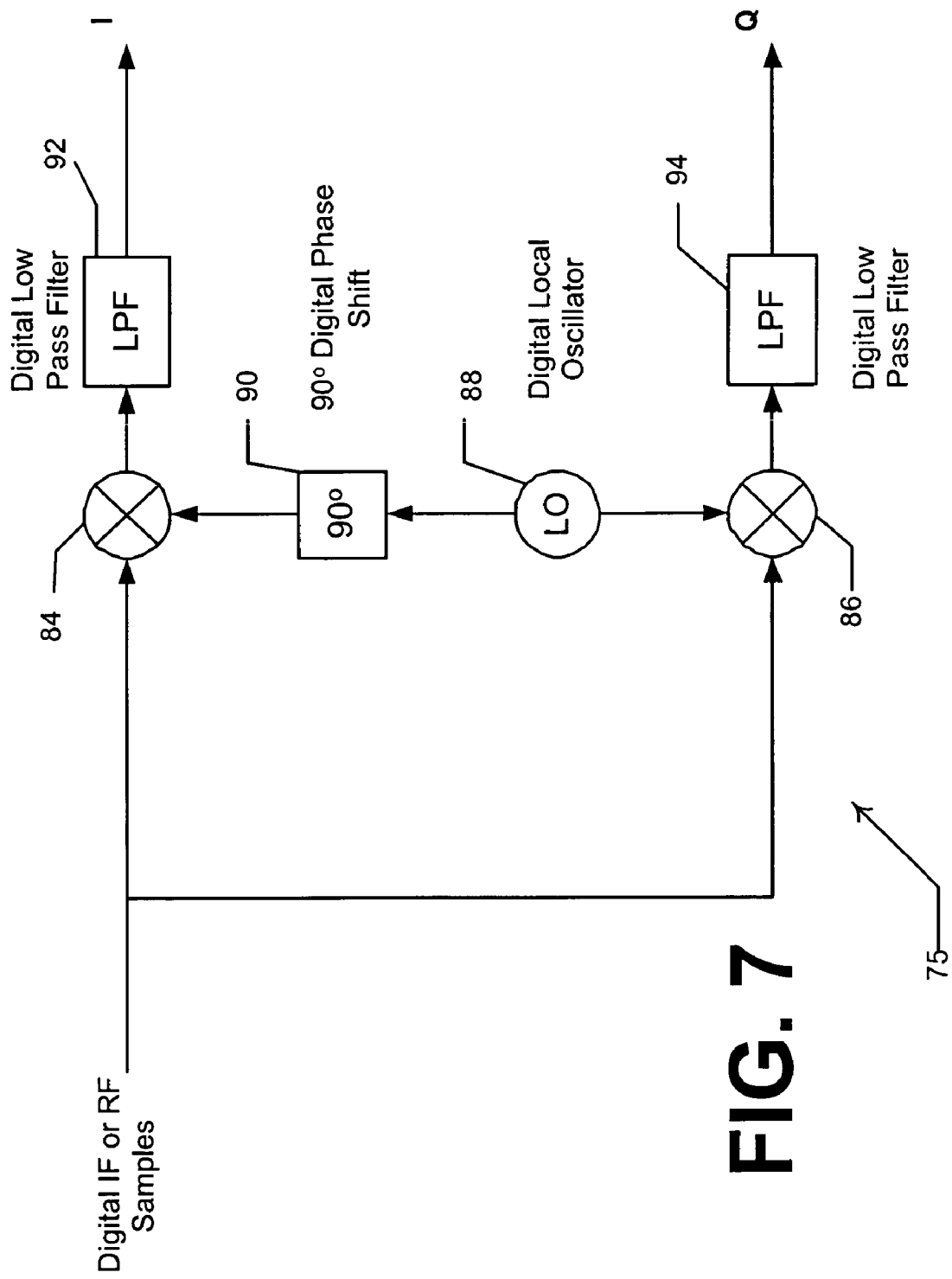
FIG. 7 illustrates the preferred structure of a digital I/Q processor.

FIG. 7 illustrates the structure of each Digital I/Q Demodulator 75 as comprising an in-phase multiplier 84 and a quadrature multiplier 86 for the in-phase and quadrature components of an input signal. Digital local oscillator 88 provides a digital sequence that takes the place of an analog local oscillator. A 90° digital phase shifter 90 may act on either, but not both, of the outputs from digital local oscillator 88 (FIG. 7 illustrates an embodiment where the phase shift is implemented in the in-phase leg). The outputs of multipliers 84 and 86 are passed through digital low pass filters 92 and 94 respectively.

Figure 8:
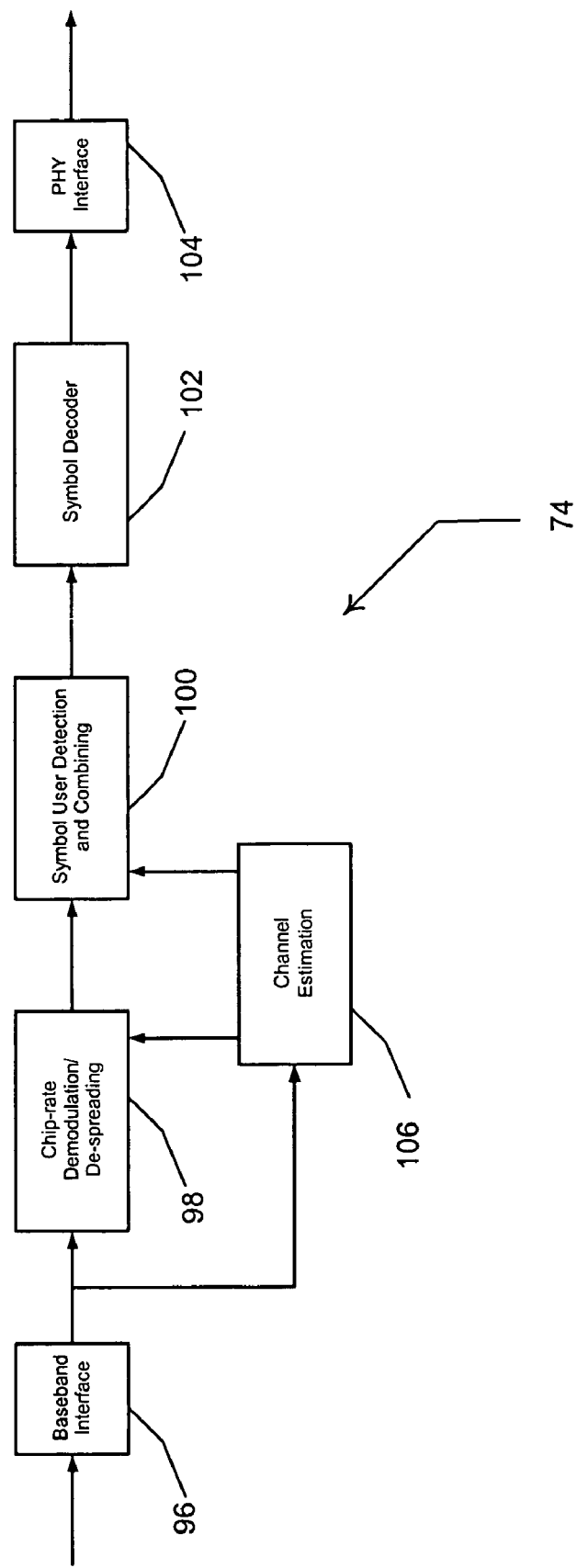
FIG. 8 illustrates a typical mobile wireless CDMA baseband processor.

Each baseband DSP 74 is selected based on the particular multi-access protocol employed within the communication system that the adaptive array is to support. FIG. 8 illustrates a typical embodiment of a mobile wireless code division multiple access ("CDMA") baseband processor 74 comprising a baseband interface 96, a chip-rate demodulation and despreading function device 98, a symbol user detection and combining function device 100, a symbol decoder 102 and a physical layer interface ("PHY") 104 to the upper layer circuit switched and packet switched functions, which form the link between the baseband DSP and the base station controller ("BSC") or radio network controller ("RNC"). A channel estimation device 106 provides feedback based on the output of baseband interface 96 to chip-rate demodulation and despreading function device 98 and symbol user detection and combining function device 100.

DABF system 50 will support a number of users less than, equal to, or greater than the number of antenna elements, in contrast to the system referred to in Woodsum.

Genetic Processing

Figure 9:
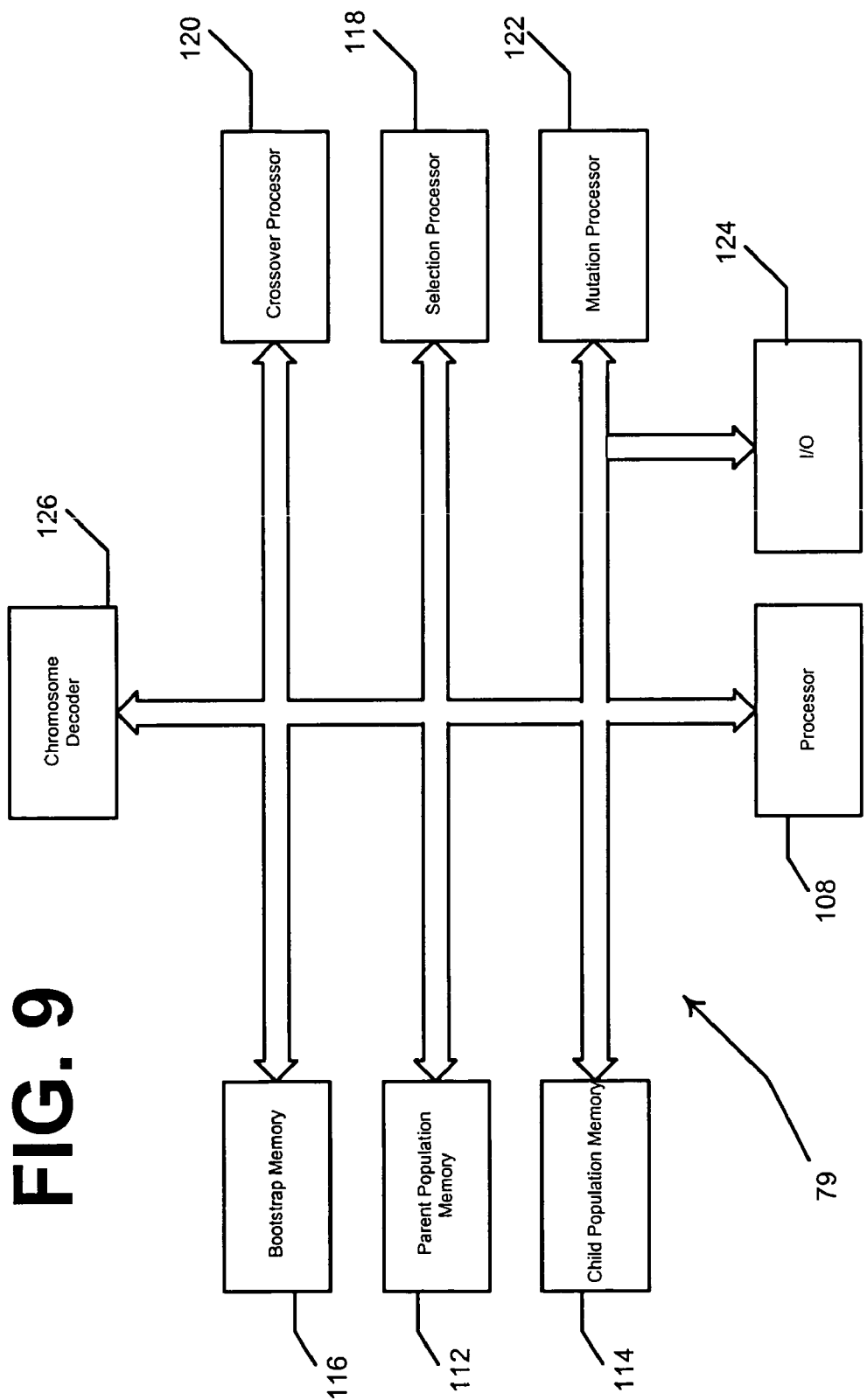
FIG. 9 illustrates the preferred embodiment of a genetic processor.

FIG. 9 shows the preferred embodiment of the genetic processor 78. Genetic processor 79 comprises a central processor 108, a data/address bus 110, a parent generation memory 112, a child generation memory 114, bootstrap memory 116, a selection processor 118, a crossover processor 120, a mutation processor 122, an Input/Output interface 124 and a chromosome decoder 126.

Figure 10:
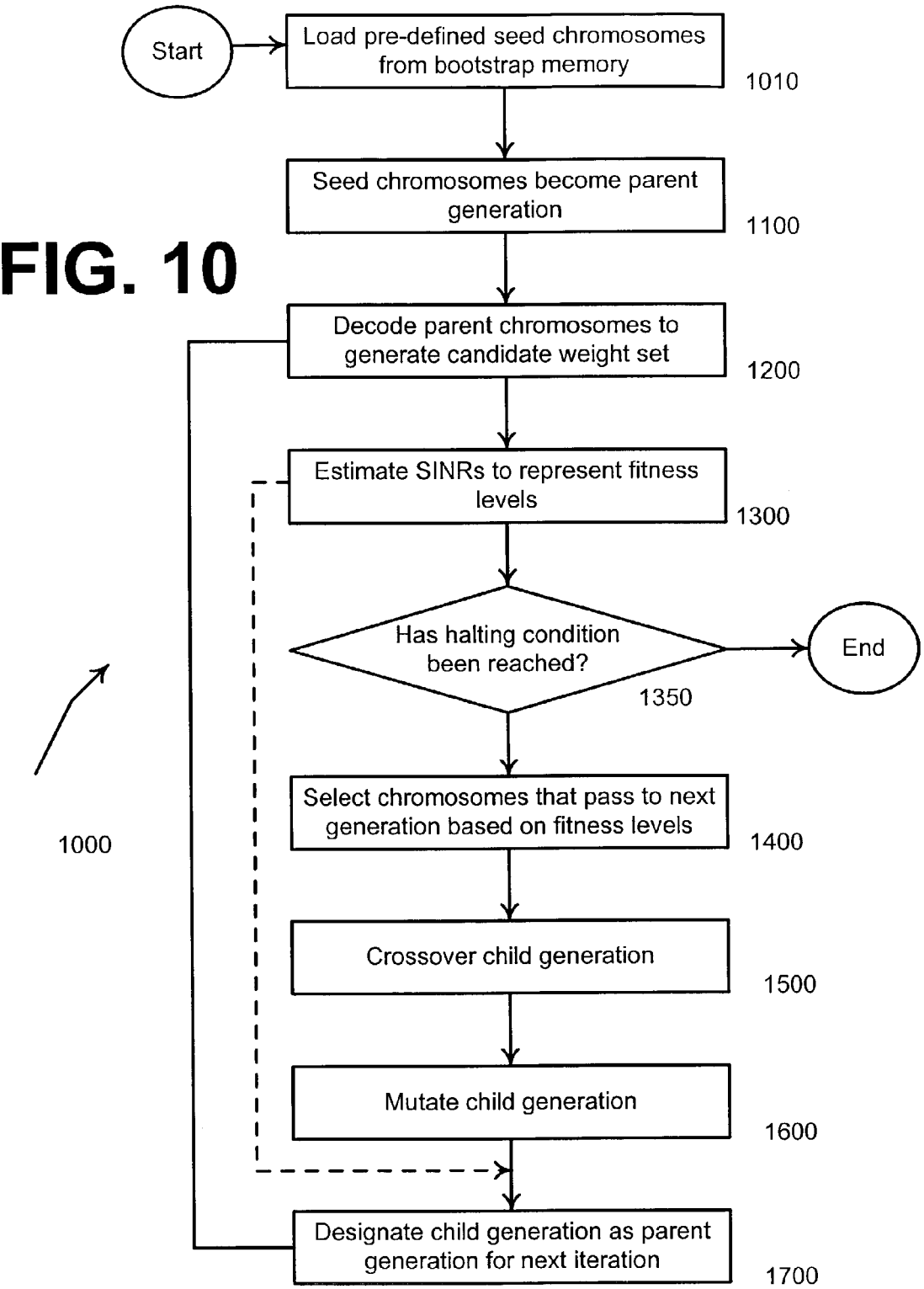
FIG. 10 illustrates a process using a genetic algorithm for determining a weight set to be applied to baseband signals to optimize the dynamic range of signals sent in a communication system.

FIG. 10 illustrates operation of the genetic processor, upon start-up, a predefined "seed" generation of chromosomes is retrieved from bootstrap memory at step 1010 and then loaded into parent generation memory at step 1100. It will be appreciated that a population (the chromosomes in a generation) is typically a number of chromosomes that is fixed before method 1000 begins.

At step 1200, chromosomes in the parent generation memory are decoded to provide a set of candidate weights for use by the spatial array processors. Next, at step 1300, SINR estimates are produced by the baseband DSP and SINR estimator in response to the candidate weight sets. These SINR estimates serve as measures of fitness to be used by the selection processor.

At step 1350, the processor determines whether a halting condition has occurred. Typically, the routine will halt if, for example, the level of fitness of the current population is better than a predetermined desired level of fitness, or if a predetermined number of iterations of method 1000 has occurred. If method 1000 continues, at step 1400, the selection processor selects certain chromosomes from the parent generation memory and loads them into the child generation memory. Next, at steps 1500 and 1600, chromosomes from the child generation memory are processed/converted by the crossover and mutation processors. It will be appreciated that in the preferred embodiment, the crossover operation is executed before the mutation operation, but mutation could be performed before crossover.

Then, at step 1700, these converted child chromosomes are designated as the next parent generation and are loaded into the parent generation memory before decoding of this new parent population begins at step 1200.

Chromosome Encoding

Figure 11:
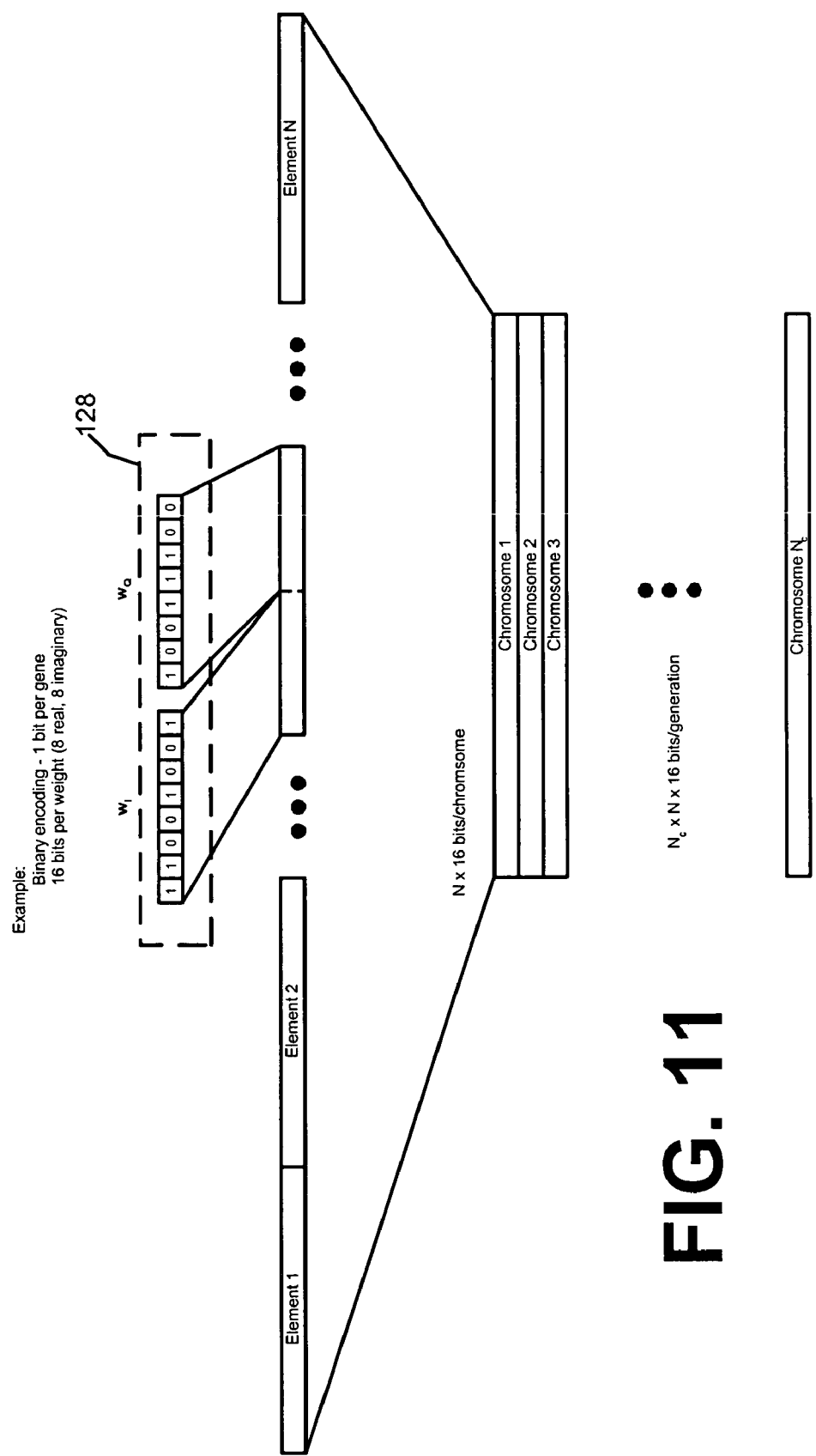
FIG. 11 illustrates an encoding scheme where each antennae weight is represented by eight bits corresponding to a real component and eight bits corresponding to an imaginary component.

In the preferred embodiments of this invention, chromosomes are binary encoded. One such embodiment is shown in FIG. 11, where the in-phase and quadrature parts of each antenna-element weighting factor 128 are each represented as a B-bit binary number, such that 2B bits completely describe each antenna element weight. A chromosome consists of a binary string of N×2B bits, where N is the number of antenna elements. The population managed by genetic processor 79 shown in FIG. 9 comprises $N_C$ such chromosomes. The chromosome decoder 126 interprets the values of each 2B-bit binary string 128 and provides an appropriate representation of the weight. If, for example, the spatial array processor 72, as shown in FIG. 5, is implemented using floating point processing, weights with amplitudes between +1 and −1 may be required. Thus, the chromosome decoder 126 would scale either of the unsigned B-bit binary-number parts, which range from 0 to 255, of weighting factor 128 into a continuous value between −1 and +1.

Figure 12:
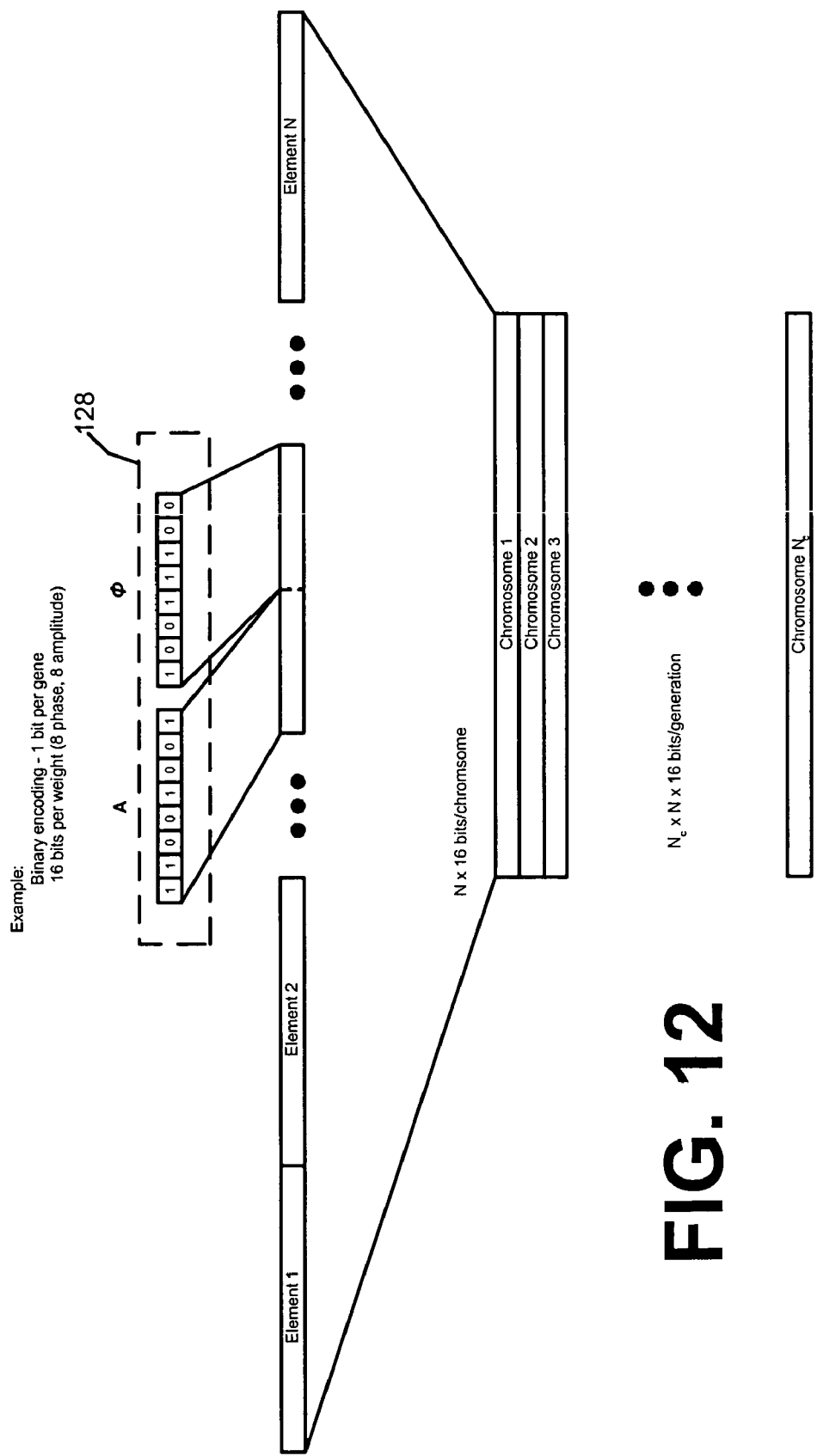
FIG. 12 illustrates an encoding scheme where each antennae weight is represented by eight bits corresponding to an amplitude component and eight bits corresponding to a phase component.
Figure 13:
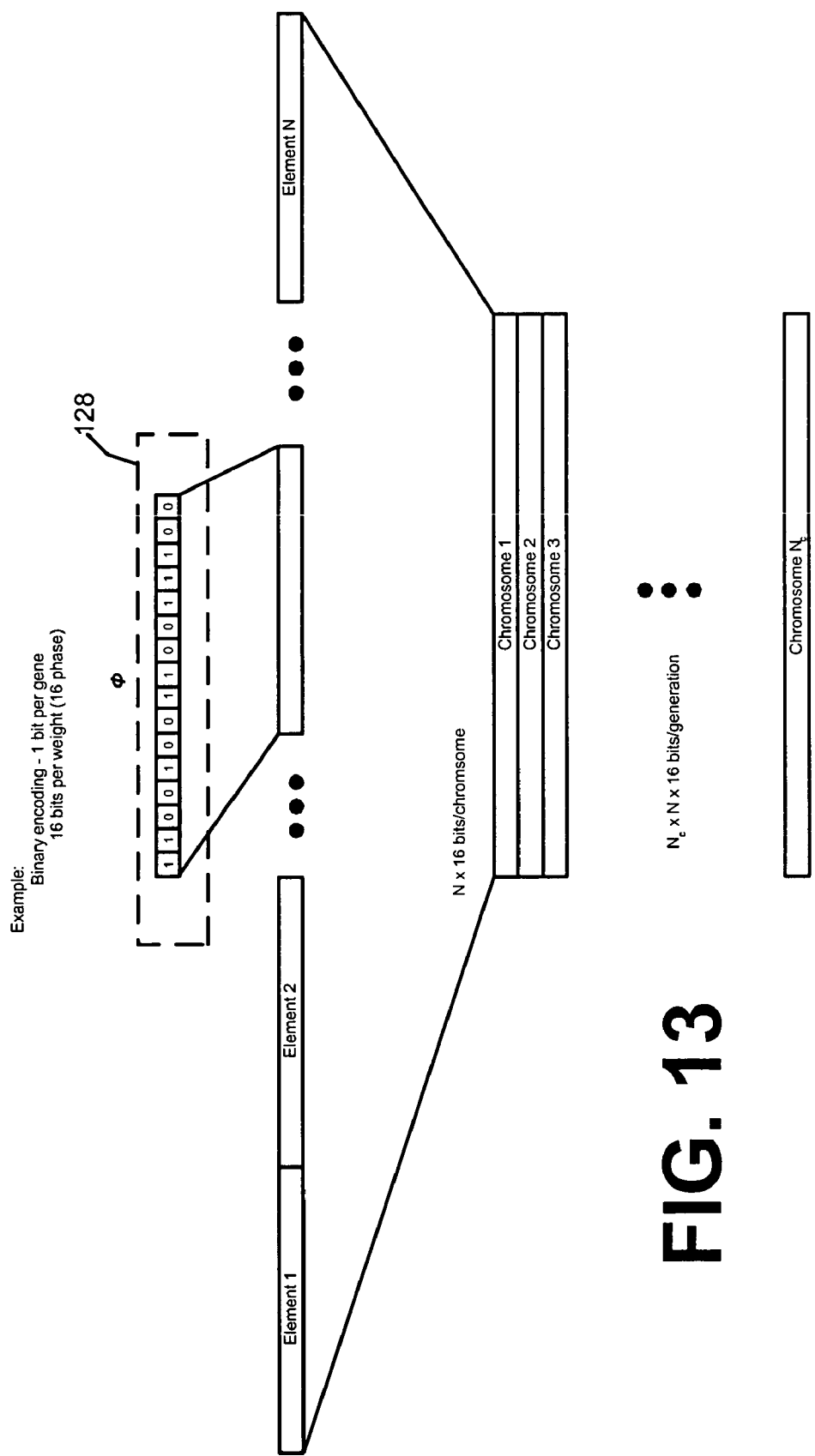
FIG. 13 illustrates an encoding scheme where each antennae weight is represented by sixteen bits corresponding to a phase component.

In other embodiments, the binary chromosome weights 128 could represent amplitude and phase rather than in-phase and quadrature as shown in FIG. 12, or could represent phase alone as shown in FIG. 13, or could represent amplitude alone (not illustrated).

Selection Processor

Figure 14:
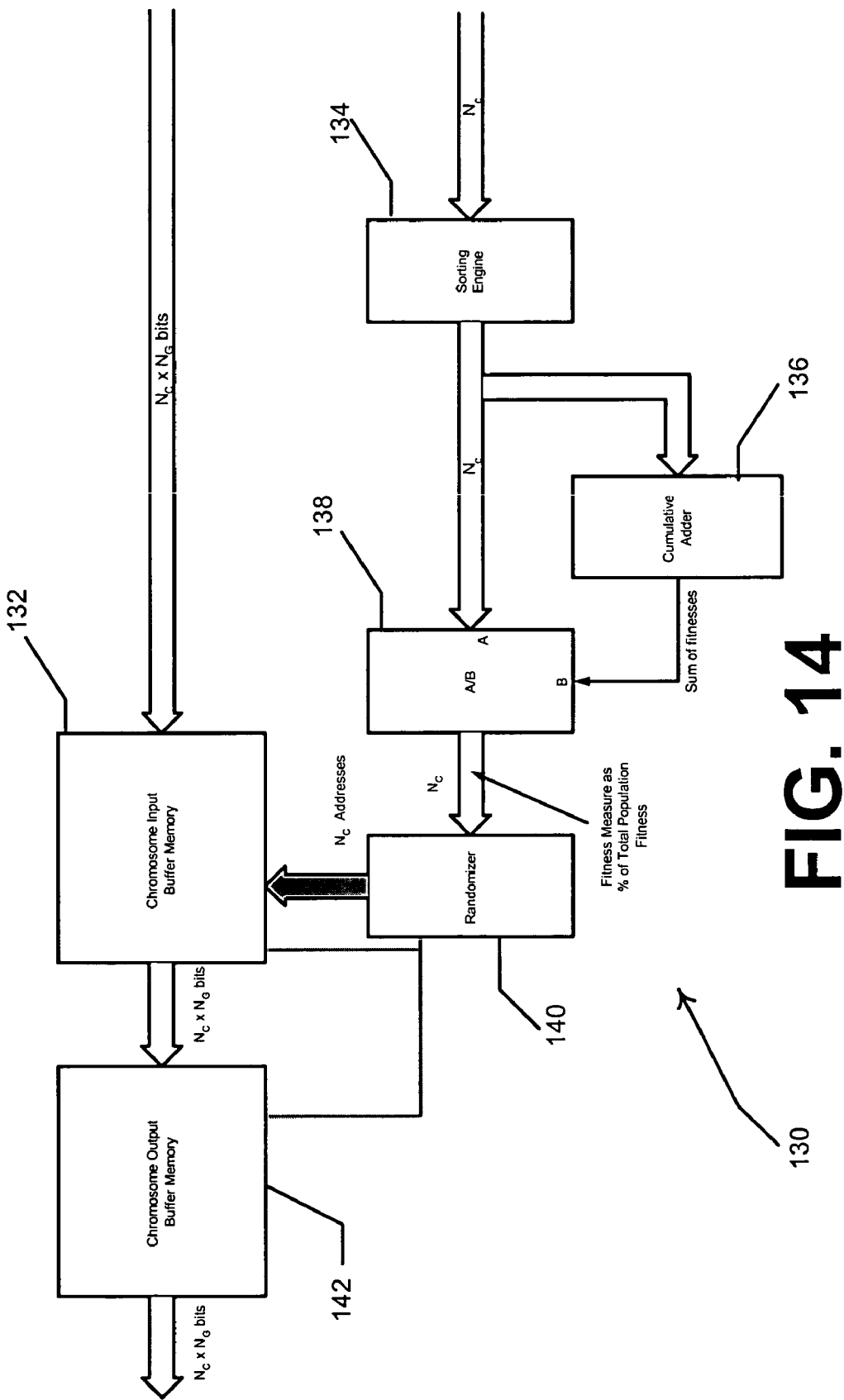
FIG. 14 illustrates a roulette wheel selection processor.

Selection processor 118, shown generically in FIG. 9, may use at step 1400 of FIG. 10 at least one of a variety of methods known in the art that may include, for example, roulette wheel selection, and rank selection, with or without elitism. An embodiment of a roulette wheel selection processor 130 (which is a particular type of selection processor 118 as shown in FIG. 9) is shown in FIG. 14. Processor 130 typically receives an input stream of $N_C \times N_G$ bits, where $N_C$ is the number of chromosomes and $N_G$ is the number of bits per chromosome in a binary encoding scheme. However, other encoding schemes may include, for example, value encoding, where each element in the chromosome string is a numerical object rather than a binary digit (e.g., signed or unsigned integer, single or double-precision floating point). In general, an element (typically one bit) of the chromosome string is called a "gene."

Processor 130 further comprises chromosome input buffer memory 132, and an input stream of $N_C$ fitness measures (one per chromosome) is received by sorting engine 134, which outputs an array of fitness ranks in ascending or descending order. A cumulative adder 136 computes the sum of all fitness of all chromosomes and divide-by module 138 divides the fitness of each chromosome by the sum of all chromosome fitness, the output representing the percentage of the total population fitness that any given chromosome possesses. This output is fed into randomizer 140, which selects a particular chromosome in input buffer memory 132 with a probability between 0 and 1 that increases monotonically with the percentage fitness that any given chromosome possesses. A chromosome output buffer memory 142 accepts chromosomes from input buffer memory 132 selected by randomizer 140.

Figure 15:
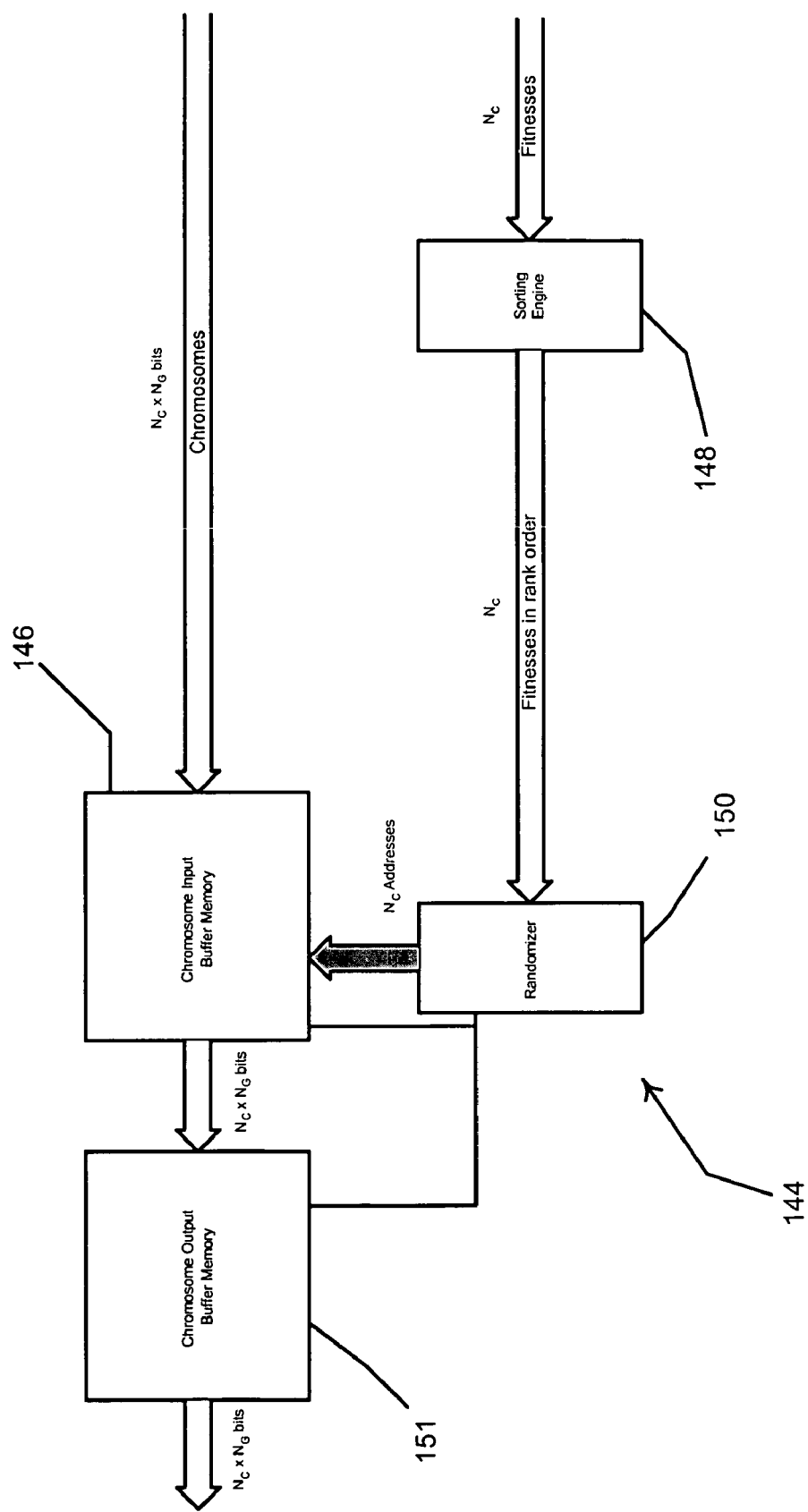
FIG. 15 illustrates rank selection processor.

An alternative selection processor 144 embodiment that employs rank selection is illustrated in FIG. 15. This embodiment receives an input stream of $N_C \times N_G$ bits, as with roulette wheel selection processor 130 of FIG. 14. Chromosome input buffer memory 146 receives the chromosome input stream and sorting engine 148 receives an input stream of $N_C$ fitness measures. Sorting engine 148 ranks the chromosome fitnesses in order and provides these ranked fitnesses to randomizer 150, which selects a particular chromosome within chromosome input buffer memory 146 with a probability between 0 and 1 that increases monotonically with its fitness relative rank within the population. The output of input buffer 146 is fed through output buffer 151.

Figure 16:
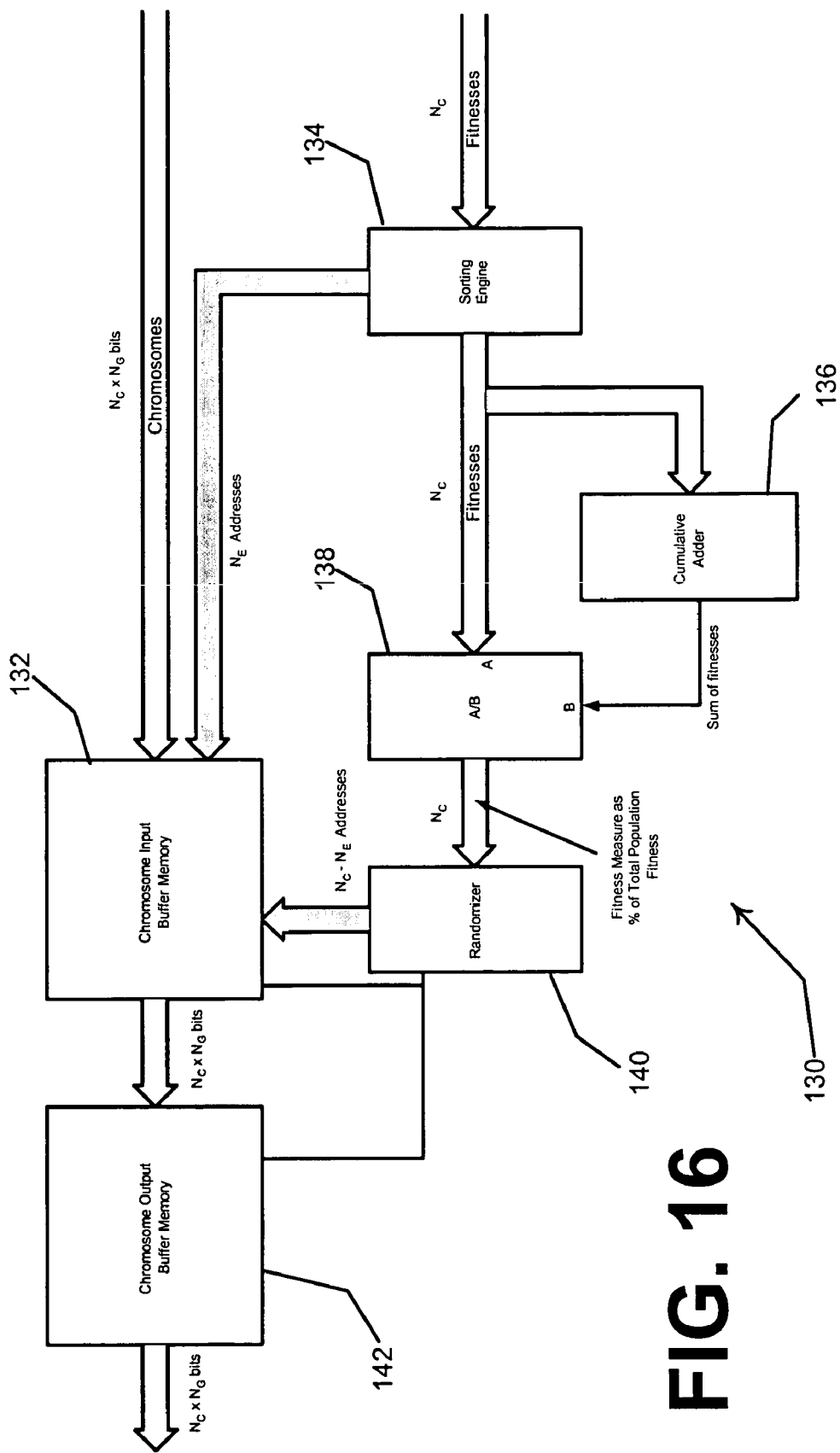
FIG. 16 illustrates a roulette wheel selection processor with elitism.
Figure 17:
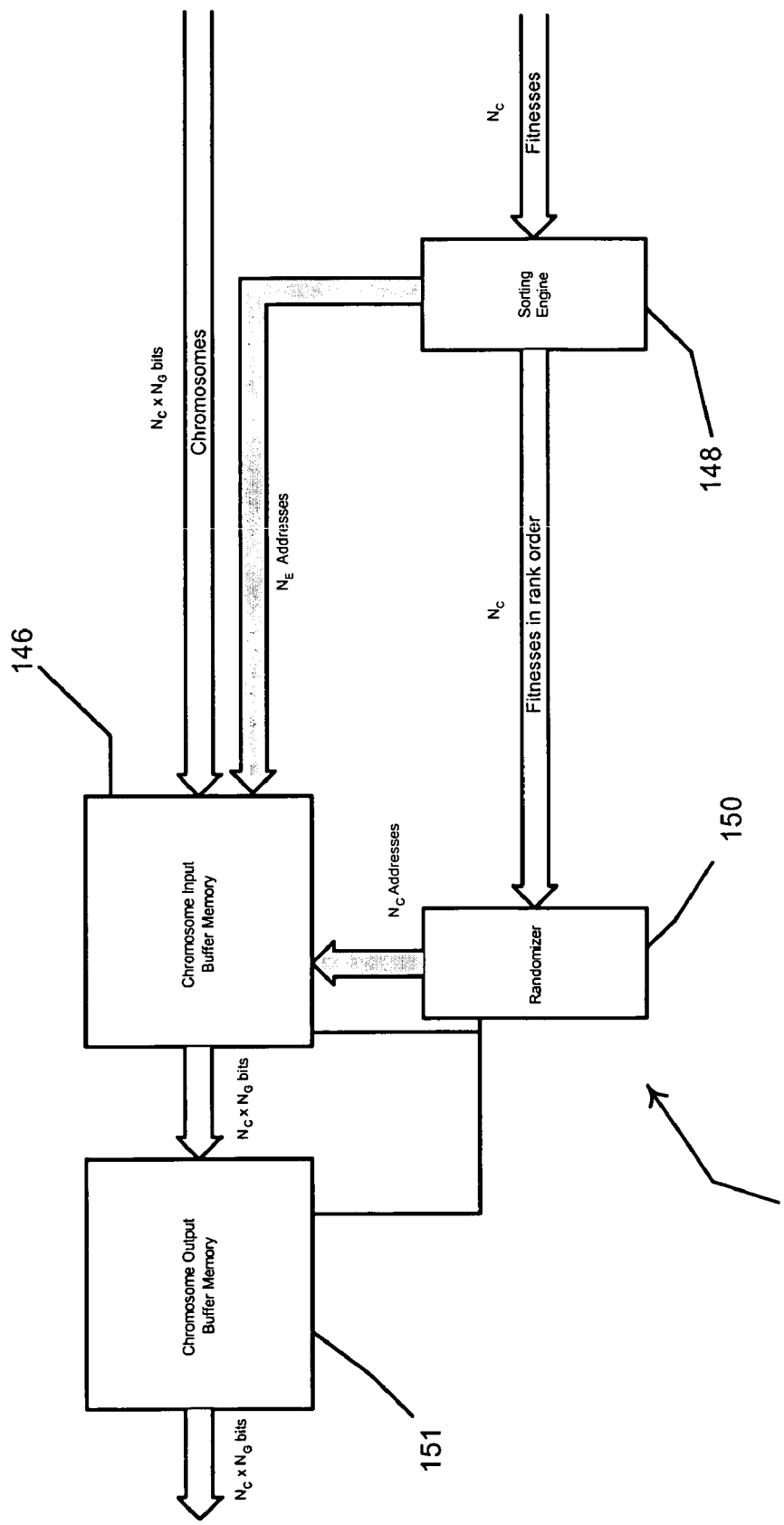
FIG. 17 illustrates rank selection processor with elitism.

Either roulette wheel shown in FIG. 14 or rank selection shown in FIG. 15 may implement elitism. Under elitism, the $N_E$ fittest chromosomes are automatically selected and placed in the input buffer memory. Elitism under Roulette Wheel and Rank Selection is illustrated in FIGS. 16 and 17, respectively. Thus, whenever randomizer 140 or 150 from FIGS. 16 and 17, respectively, selects a particular chromosome from the input buffer memory, the address of the fittest chromosome from the initial chromosome input bit stream is assured of being available for use in determining which chromosome is selected by the randomizer. It will be appreciated that preferably, the elite chromosome(s) is/are copied into the input buffer before crossover or mutation occurs. This is represented by the dashed line in FIG. 10 from step 1300 to immediately after step 1600. However, the elite chromosomes may be 'injected' at any point in the process.

Crossover Processor

FIG. 18 illustrates a preferred embodiment of the crossover process. A pair of chromosomes—chromosome A and chromosome B—is selected from the selection output buffer memory. The pair is selected for crossover using some predetermined probability, $P_C$. Then, a common gene locus is selected with uniform probability, and each chromosome is severed at the crossover locus. Next, the head of chromosome A is joined with the tail of chromosome B to form a new chromosome, the head of chromosome B is joined with the tail of chromosome A to form a second new chromosome. The Crossover Process may also implement alternative embodiments (e.g. crossover at multiple loci or exchange of specific genes between chromosomes). These general processes are known in the art.

Figure 19:
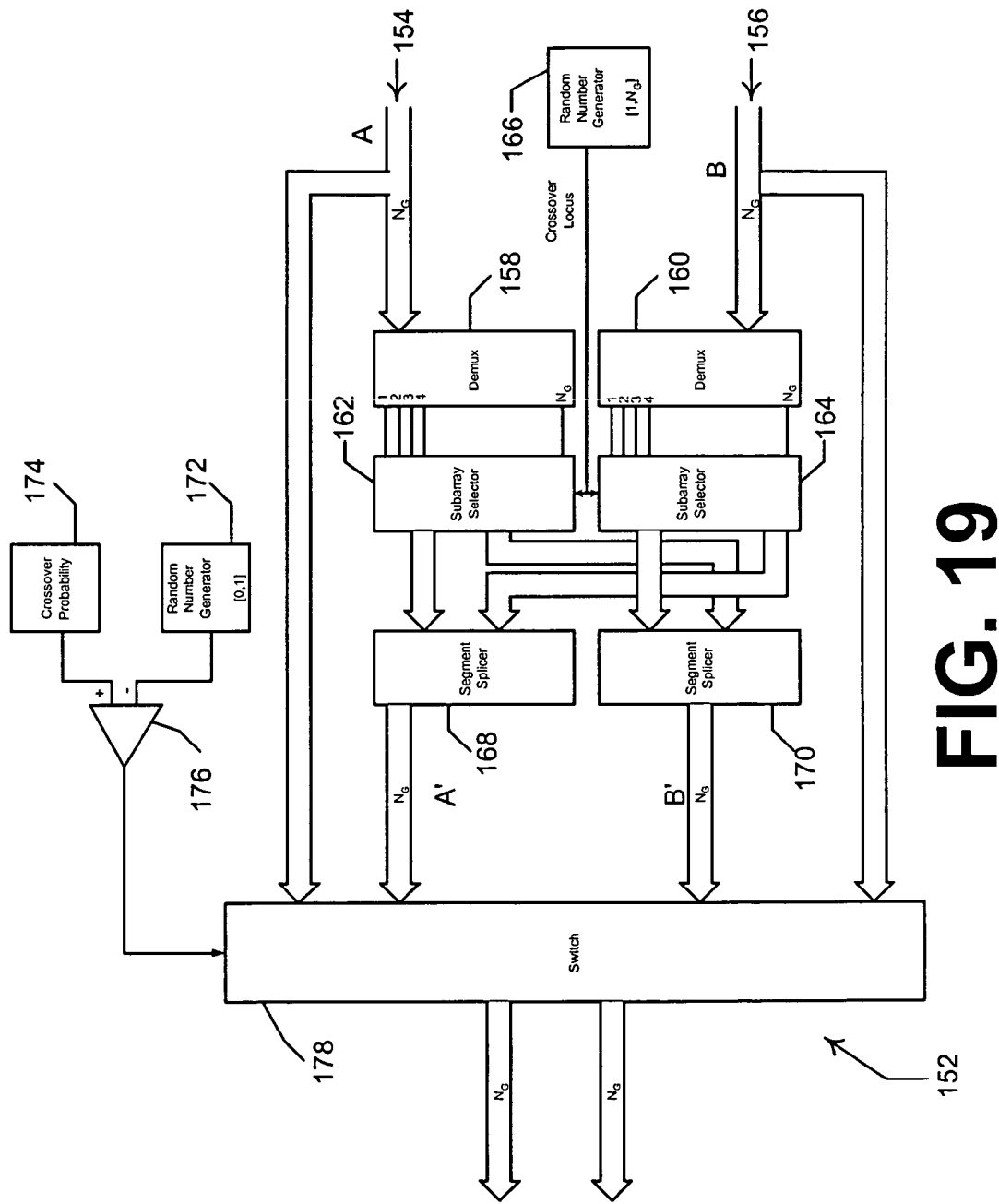
FIG. 19 illustrates the structure of a crossover processor.

FIG. 19 illustrates a preferred embodiment of a processor which executes the crossover function. The crossover processor 152 comprises: two input chromosome parallel or serial bit streams, 154 and 156, which are fed into demultiplexers 158 and 160, respectively. Demultiplexers 158 and 160 accept each chromosome input and provide parallel outputs of gene bits to subarray selectors 162 and 164 respectively. A first random number generator 166 produces an integer, L, between 1 and $N_G$ with uniform probability, where $N_G$ represents the number of genes (bits) per chromosome. The two-port subarray selectors 162 and 164 each produce a one word output which contains bits 1 through L at the first output port and bits L+1 through $N_G$ at the second output port. Segment splicers 168 and 170 each include two input ports and one output port. Each segment splicer 168 and 170 forms an $N_G$ bit output by concatenating the word at the first input port with the word at the second input port.

Processor 152 further comprises a second random number generator 172 that produces a random number between zero and one inclusive and a memory element 174 that contains a pre-defined crossover probability $P_C$ value between 0 and 1. Crossover comparator 176 receives as inputs the outputs of the second random number generator 172 and the crossover probability memory element 174, and outputs a 0 if the output of the second random number generator is greater than the $P_C$ and a 1 otherwise.

Switch 178 accepts five inputs and produces two outputs. The inputs include the original chromosome A bits, the original chromosome B bits, the bits from a chromosome A' and B', which results from the above crossover process, applied to chromosome A and B, respectively, and the output of crossover comparator 176. If the output of crossover comparator 176 is 0, the original chromosomes A and B are output by the switch 178. Otherwise, chromosomes A' and B' are output.

Mutation Processor

Figure 20:
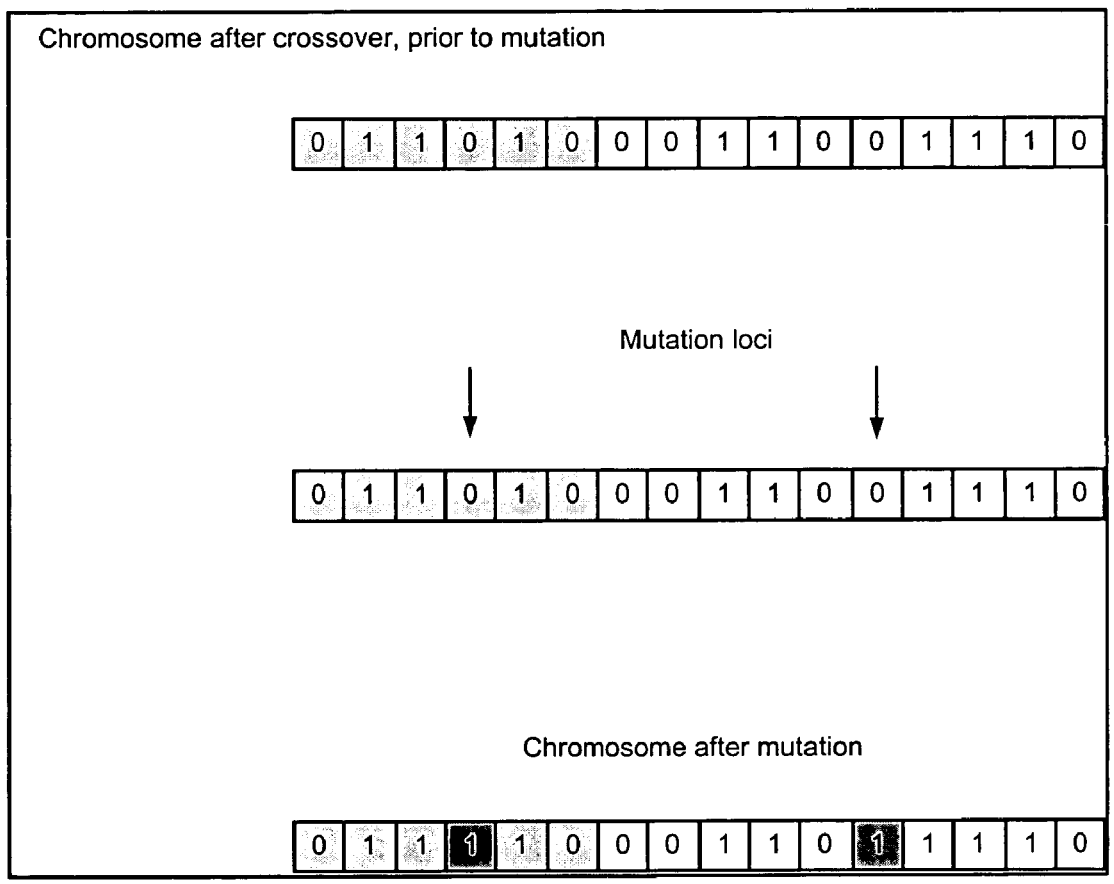
FIG. 20 illustrates a mutation process.

A preferred embodiment of a mutation process is illustrated in FIG. 20. First, a particular gene, or genes, is/are selected for mutation using some predetermined probability, $P_M$ Then, the logical value of the selected gene or genes is/are inverted. Thus, for example, if the gene has value 0, the value is changed to 1, or if the gene has value 1, the value is changed to 0.

Figure 21:
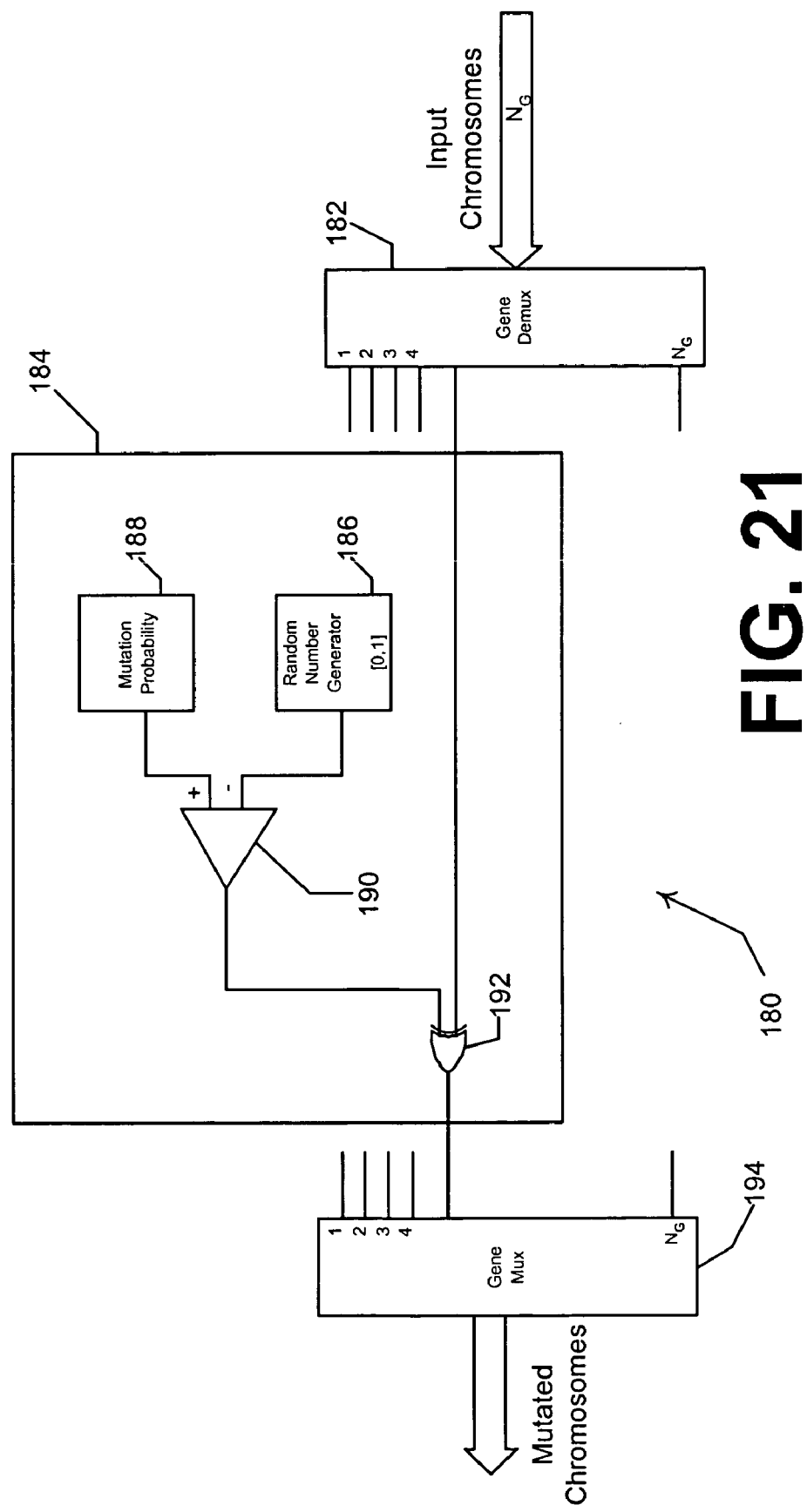
FIG. 21 illustrates the structure of a mutation processor.

The preferred embodiment of a mutation processor 180 is shown in FIG. 21. Mutation processor 180 comprises the following functional modules a gene demultiplexer 182, which accepts serial or parallel input bits from a particular chromosome and provides $N_G$ parallel outputs, where $N_G$ is the number of genes and each output represents a particular gene value. For each output of gene demultiplexer 182, an intermediate network 184 performs various functions that mutate selected genes. Random number generator 186 outputs a random number between 0 and 1 inclusive and mutation probability memory element 188 stores the predetermined mutation probability, $P_M$. Mutation comparator 190 receives its input from the outputs of random number generator 186 and mutation probability memory element 188, and outputs a 1 if the random number generator output is less than $P_M$, and 0 otherwise. An exclusive-OR (XOR) gate 192 receives its inputs from the outputs of gene demultiplexer 182 and mutation comparator 190.

Processor 180 further comprises gene multiplexer 194, which accepts the $N_G$ XOR outputs corresponding to information of each gene output from gene demultiplexer 182, and produces a new mutated chromosome $N_G'$.

Uplink DABF System With Space-Time Processing

Figure 22:
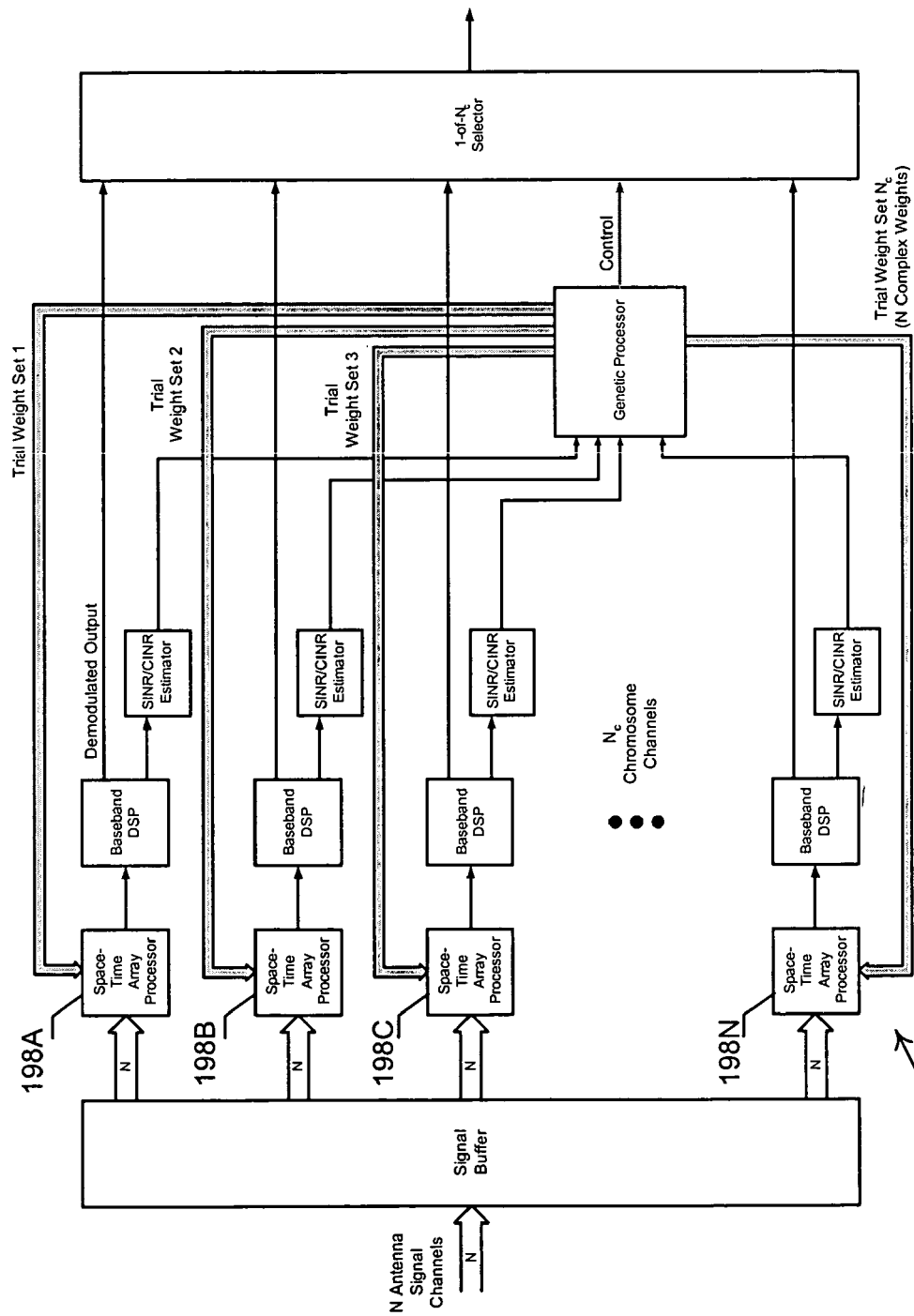
FIG. 22 illustrates an uplink DABF system with time-domain processing capability.

FIG. 22 illustrates an alternative embodiment of a DABF which features additional time-domain processing. The space-time DABF 196 implementation employs space-time array processors 198 in place of the array processors 72 shown in FIG. 5.

Figure 23:
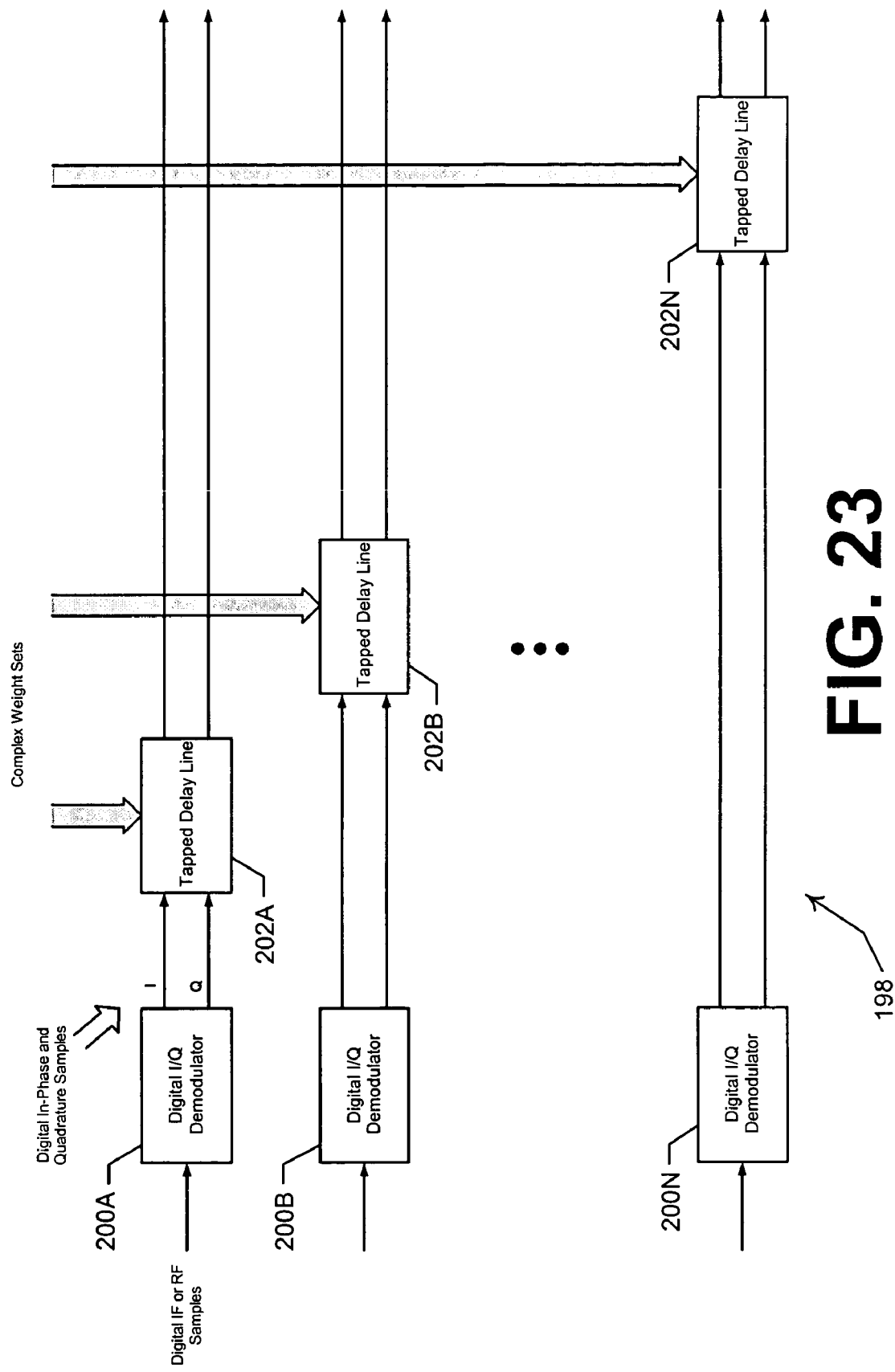
FIG. 23 illustrates the structure of a space-time array processor.
Figure 24:
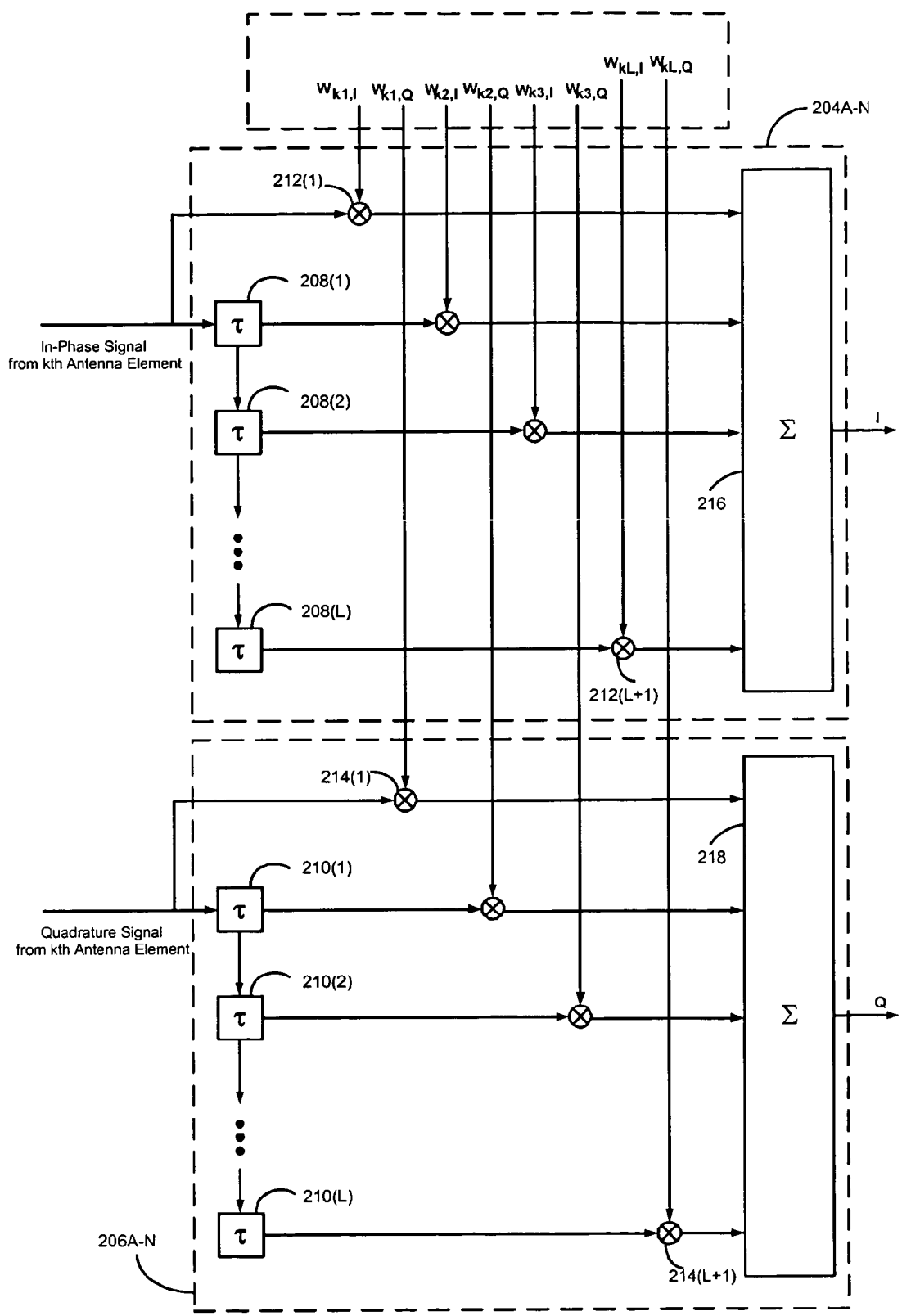
FIG. 24 illustrates the structure of a tapped delay line.

FIG. 23 illustrates the structure of each space-time array processor 198. As with the spatial array processor 72 of FIG. 6, the space-time array processor also comprises digital I/Q demodulators 200. Unlike array processor 72, however, the space-time array processor employs tapped delay lines ("TDL"s) 202 in place of the I/Q multipliers 76 and 78 shown in FIG. 6. As shown in FIG. 24, each TDL 202 provides separate in-phase and quadrature finite impulse response (FIR) filters 204 and 206 respectively, the coefficients of which are generated by the genetic processor. Each in-phase and quadrature FIR filter 204 and 206 includes a plurality of delay elements ($\tau$) 208 and 210, respectively, (the delay elements are denoted by $\tau$) and a plurality of multipliers 212 and 214, respectively, where one multiplier is associated with each delayed path and one additional multiplier is associated with the input to the FIR filter prior to any delay. The outputs of multipliers 212 (1–L) and 214 (1–1+L) feed into separate in-phase and quadrature combiners 216 and 218, respectively, (the combiners are denoted by $\Sigma$) which output the sum of the direct and delayed FIR inputs weighted by the respective inputs from weight factors 216 to the multipliers.

Figure 25:
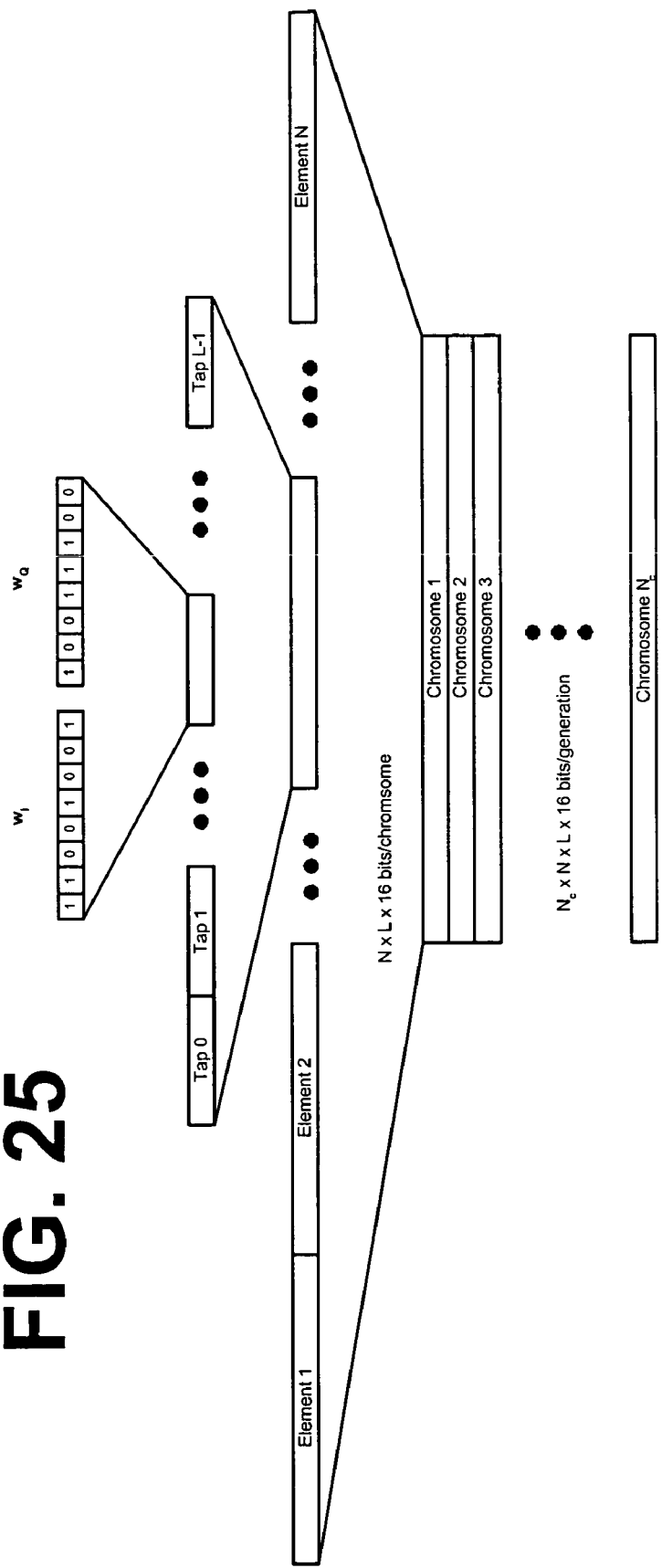
FIG. 25 illustrates chromosome encoding when space-time delay processing is used.

FIG. 25 shows a preferred embodiment of chromosome encoding when space-time array processing is employed. Under space-only array processing, B bits per in-phase and quadrature element weights are employed, yielding 2B bits per antenna elements and N antenna elements are employed in the array, yielding N×2B total bits per chromosome (e.g., 8 elements, 8 bits per each of I and Q weight yields 128 bits per chromosome).

Under space-time array processing, B bits per in-phase and quadrature tap weight are used, yielding 2B bits per tap; each antenna element has L taps, yielding L×2B bits per element; and N antenna elements are used, yielding N×L× 2B bits per chromosome (e.g. 4 taps per element would produce 1024 bits per chromosome in the above example). Although complex (I and Q) encoding is illustrated, the methods of FIGS. 12 and 13 (i.e. amplitude and phase or phase only) may also be employed.

Polarimetric Uplink DABF System

Figure 26:
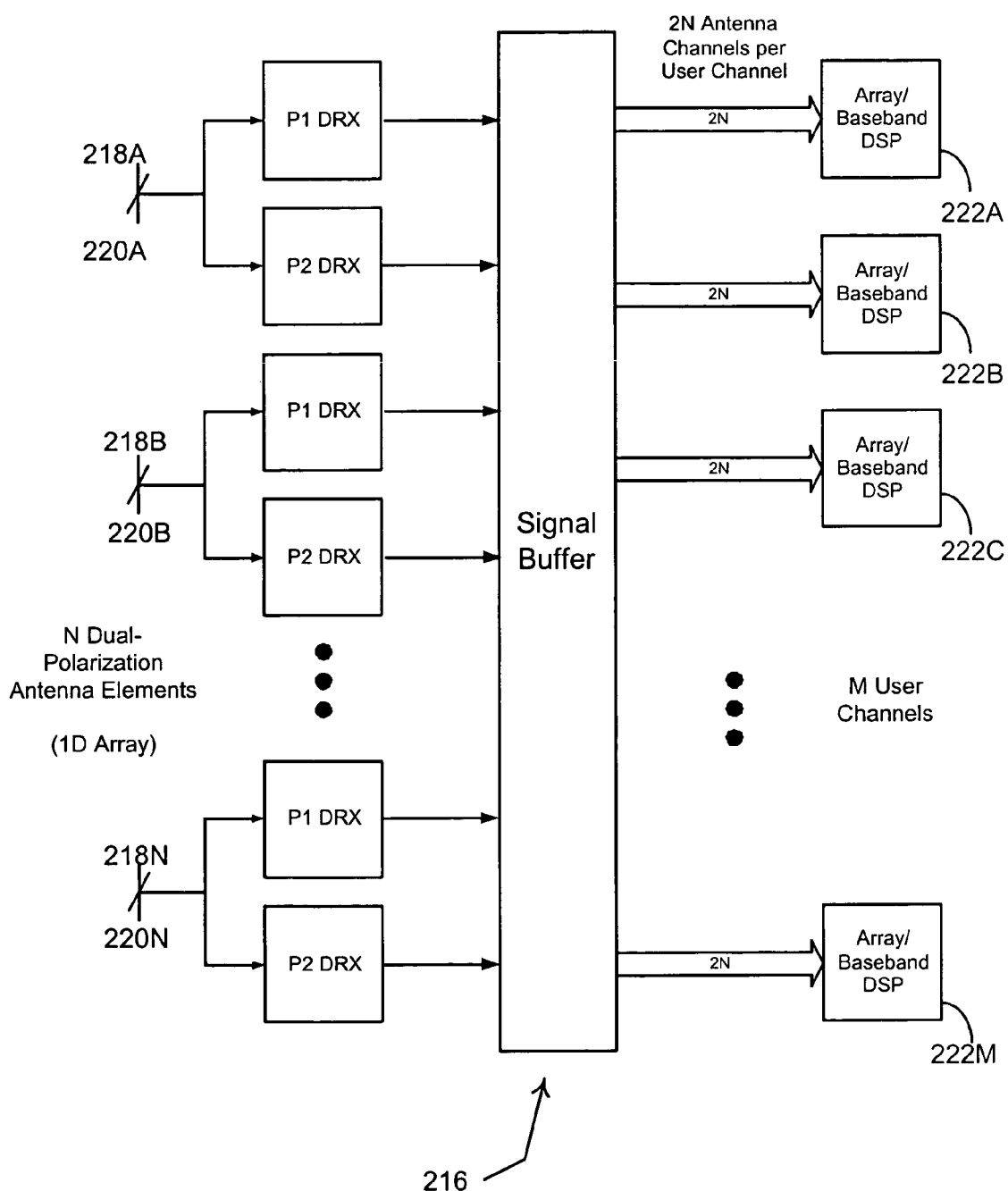
FIG. 26 illustrates a polarimetric uplink DABF system.

FIG. 26 illustrates a preferred embodiment of a polarimetric uplink DABF system 216. In this embodiment, the antenna elements 218 within the original array are assumed to be identically polarized. A second plurality of antenna elements 220—each of which may or may not be exactly co-located with each element of the first plurality—is added to the array. The elements in the second plurality are also identically polarized, but at a polarization that is distinct from the polarization of the first plurality. Ideally, the polarization of the second plurality is orthogonal to the polarization of the first plurality. Examples of orthogonal polarizations include: horizontal and vertical polarization, right-hand and left-hand circular polarization, and 45° and −45° slant linear polarization.

The form and function of the array/baseband signal processors are identical to the form and function taken in the singly-polarized uplink DABF system 50 shown in FIG. 4., with the exception that 2N rather than N inputs—one for each orthogonal polarization of each antennae element pair—are provided to each arraylbaseband signal processor.

Figure 27:
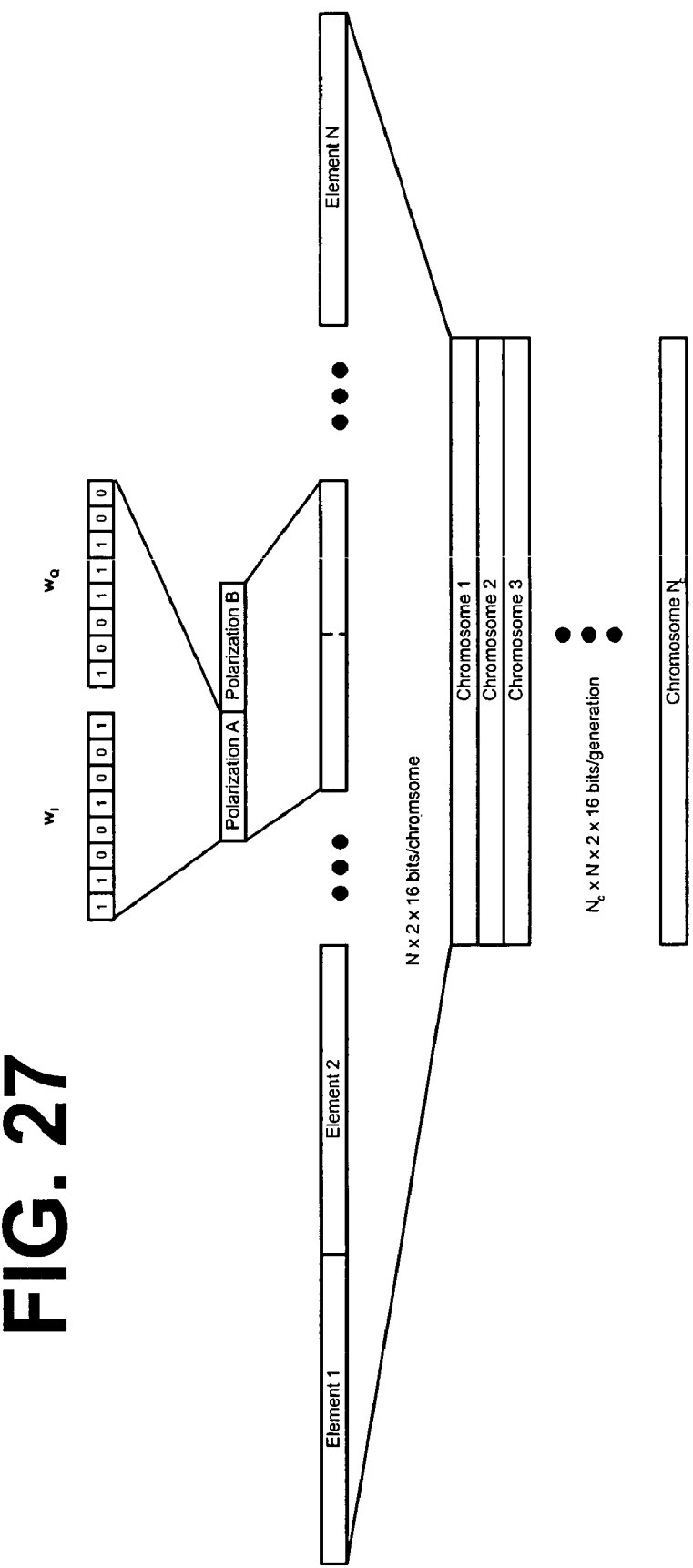
FIG. 27 illustrates chromosome encoding in a polarimetric uplink DABF system.

FIG. 27 illustrates the preferred embodiment for chromosome encoding in polarimetric uplink DABF system 216. Under the preferred polarimetric array processing embodiment, there are B bits per in-phase and quadrature element weight each. Two polarizations states for each antennae yield 2×2B bits per element and N antenna elements yield N×4B bits per array (e.g. the 128 bits per chromosome in the original DABF example would be doubled to 256 bits).

Although complex (I and Q) encoding is illustrated, the encoding schemes of FIGS. 12 and 13 (i.e. amplitude and phase or phase only) may also be employed.

In wireless systems in which both the transmitter and receiver are fixed in location and over sufficiently short distances, e.g., a wireless local area network ("WLAN"), the present invention can employ an antenna array, in which each element has P number of polarizations and where P may exceed 2. The elements in the transmitter and receiver have the identical polarizations. Ideally, a system in which the polarization of one plurality of elements is orthogonal to the polarization of a second plurality of elements will generate two signals that do not interfere with each other. However, there may be some transmissions over some path that can tolerate mutual interference between non-orthogonal polarizations. In such cases, the present invention employs multiple polarizations to increase capacity.

Polarimetric Uplink DABF System with Space-Time Processing

Figure 28:
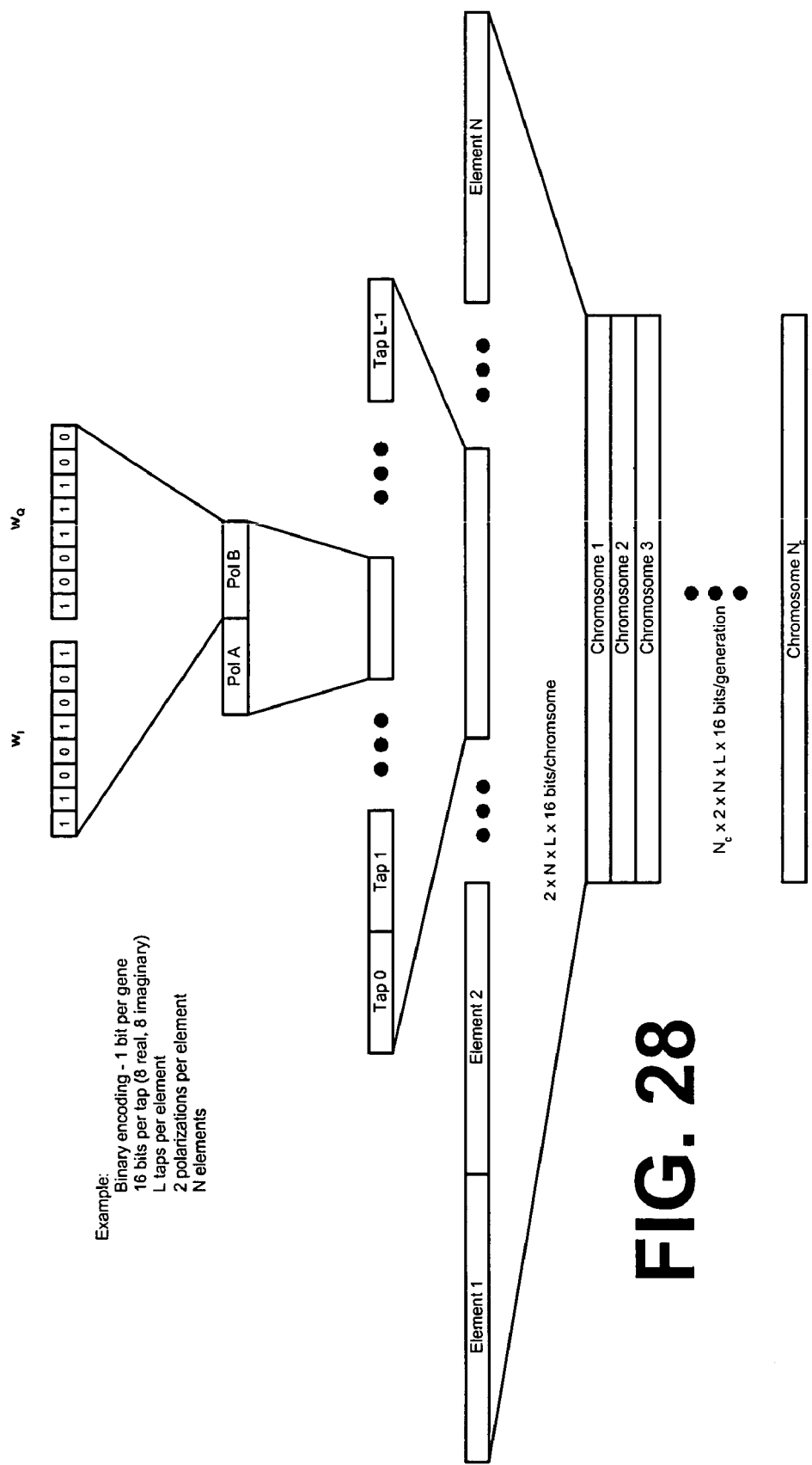
FIG. 28 illustrates an alternative chromosome encoding embodiment in a polarimetric uplink DABF system.

The embodiments illustrated in FIGS. 26 (polarimetric array processing) and 22–24 may be combined to produce an array processing system that is both polarimetric and employs space-time processing. FIG. 28 illustrates another embodiment for chromosome encoding. In this embodiment, B bits per in-phase and quadrature tap weight yield 2B bits per tap. Two polarizations per tap yield 4B bits per polarimetric tap. L taps per polarimetric element yield L×4B bits per element. Accordingly, N antenna elements yield N×L× 4B bits per array.

Bits may be reordered in other embodiments, but when complex (I/Q) weighting is used, each chromosome will comprise N×L×4B bits. Although complex (I and Q) encoding is illustrated, the methods of FIGS. 12 and 13 (i.e. amplitude and phase or phase only) may also be employed.

Two Dimensional Array DABF

Figure 29:
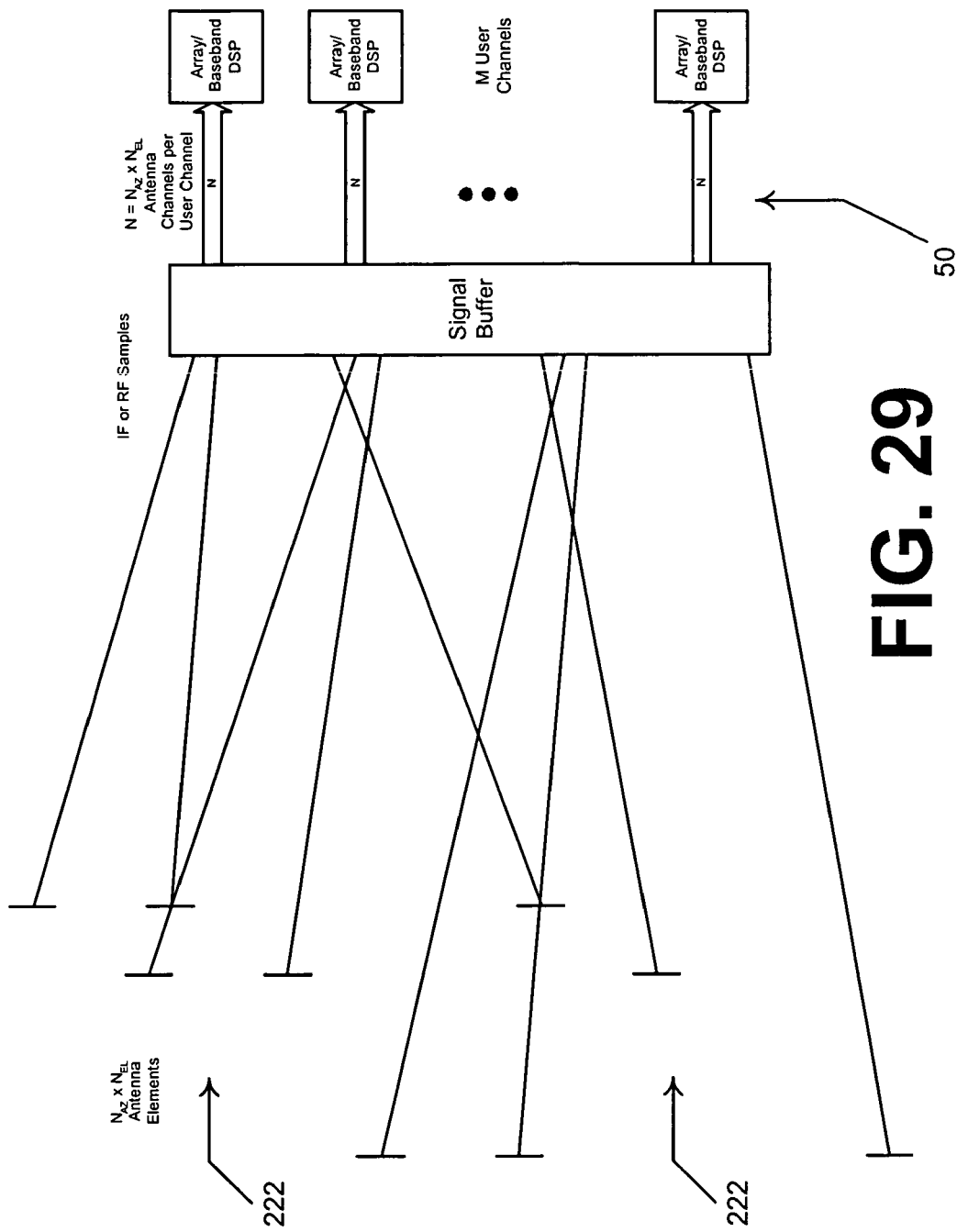
FIG. 29 illustrates independent control of signals of each of a plurality of antennae elements with respect to azimuth and elevation.

The methods and systems described in the preceding sections pertain generally to one dimensional arrays—that is, arrays which employ beamforming in either the azimuth or elevation plane. Two dimensional beamforming may be accomplished in any one of the following ways. For example, each element 222 may be independently controlled with respect to azimuth and elevation as shown in FIG. 29. It will be appreciated that the term 'control' does not necessarily imply that the beam pattern of the RF signal being either transmitted to or receiving sensitivity of a given antenna element or elements 222 is physically altered by the DABF system, but that the DABF system uses the GA to digitally decide how to process said signal in the baseband realm.

Figure 30:
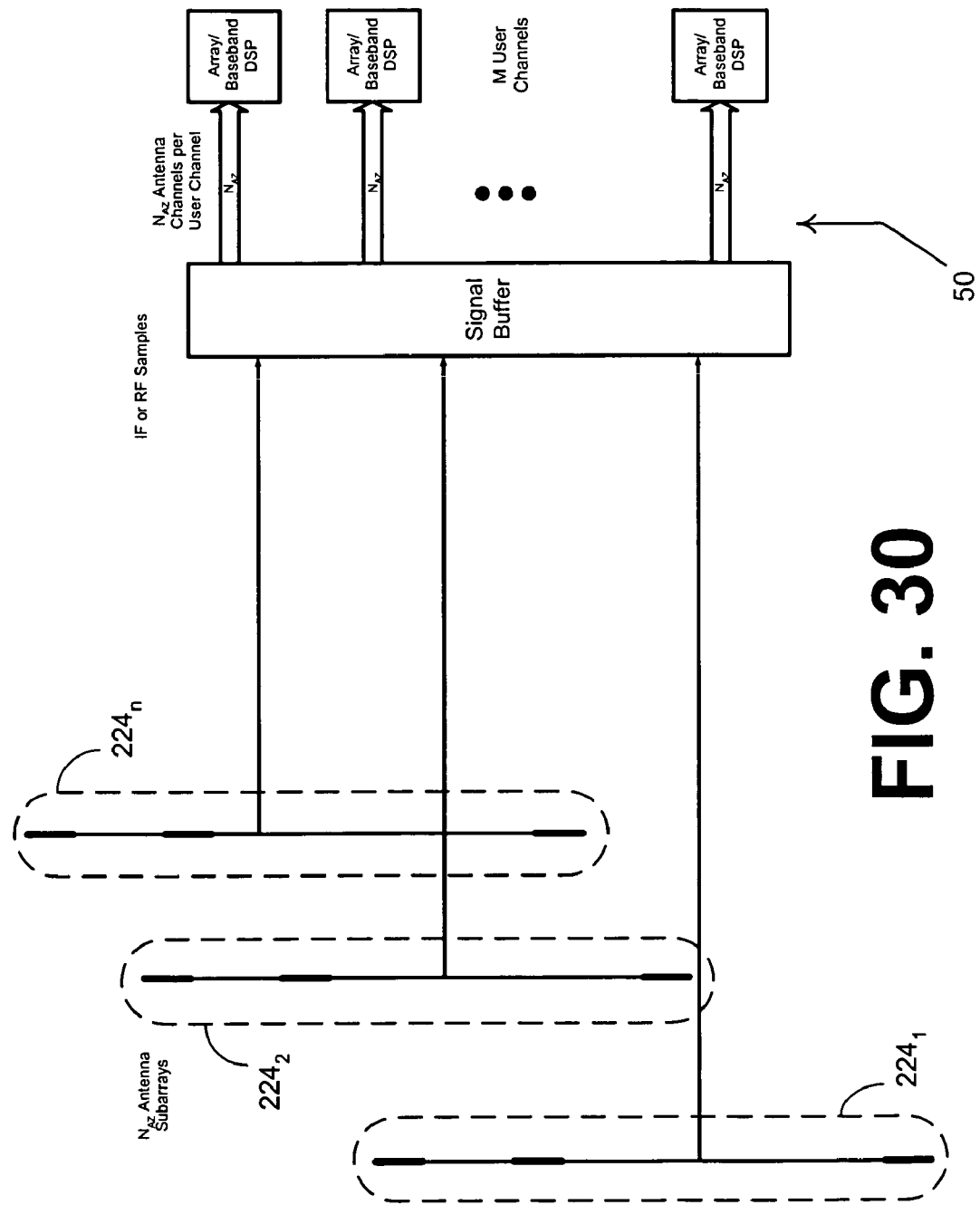
FIG. 30 illustrates independent control of the signals of subarrays within a plurality of antennae elements, the subarrays grouped with respect to elevation.

In an azimuth-plane-DABF embodiment having a fixed elevation pattern as shown in FIG. 30, elements may be grouped in elevation plane subarrays 224, which are treated as single azimuth elements. Thus, with respect to centrally located system 50, the elements in a given subarray 224 are all azimuthally aligned with one another, but at different elevations These subarrays 224 can be visualized as vertical columns with the elements of each subarray lying in the same vertical column.

Figure 31:
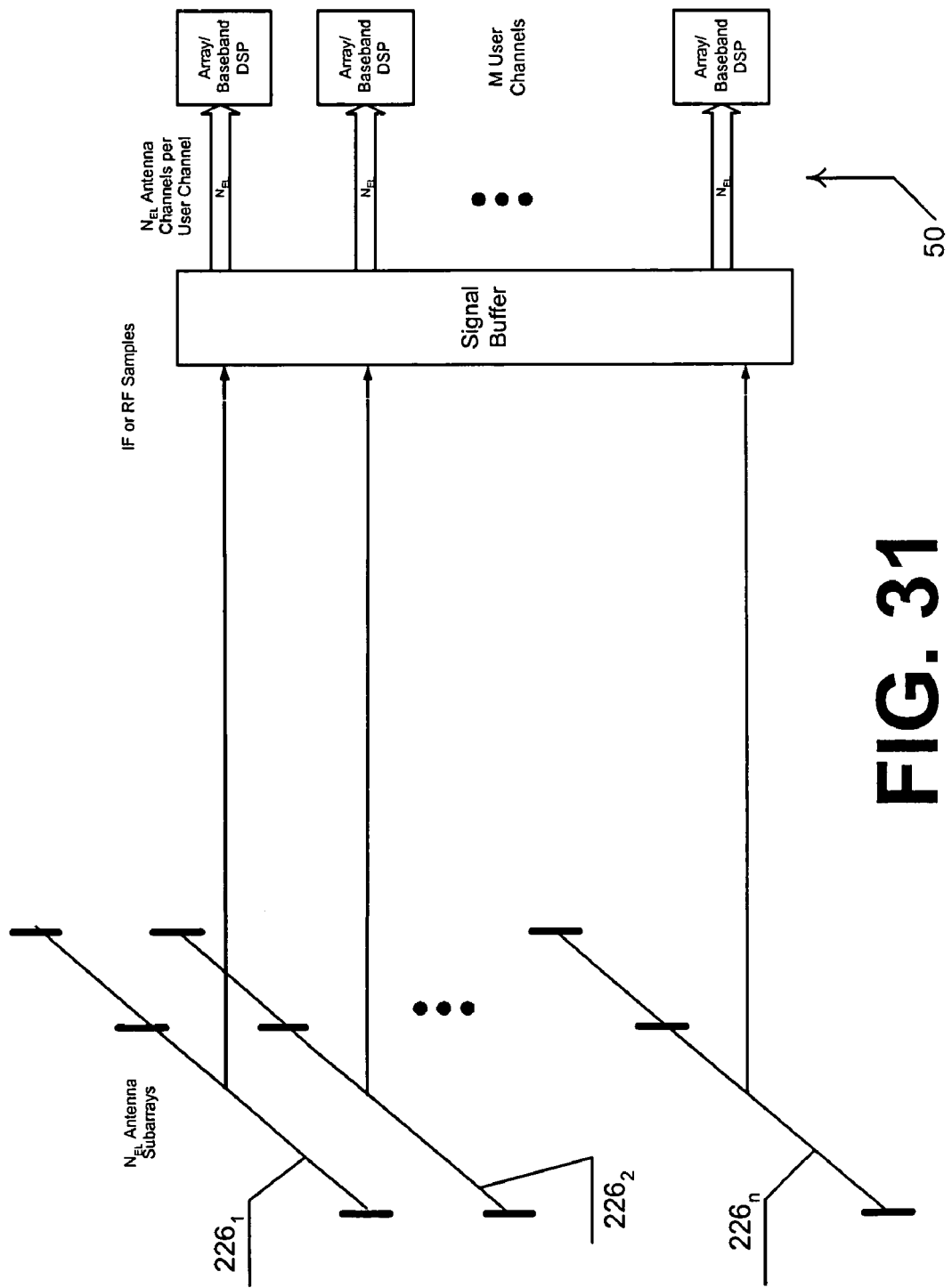
FIG. 31 illustrates independent control of the signals of subarrays within a plurality of antennae elements, the subarrays grouped with respect to azimuth.

Alternatively, instead of azimuth-plane-DABF, elements are grouped in azimuth plane subarrays 226 in elevation-plane-DABF, each subarray having a fixed azimuth pattern as shown in FIG. 31 such that each subarray is treated as a single elevation elements. These subarrays 226 can be visualized as being the antennae elements that lie within coaxial doughnut-shaped areas in space, such that for any element lying within a given doughnut, the gene(s) of its chromosome that correspond to azimuth would be the same as the azimuth gene(s) of the chromosomes of all the other elements within that same doughnut.

In another embodiment, which is not illustrated, separate azimuth and elevation DABF using separate subarrays is equivalent to controlling each element independently.

The polarimetric and space-time processing embodiments may be applied to the subarrays described above as only the number of antenna elements has changed.

Hybrid RFAB/DABF

Figure 32:
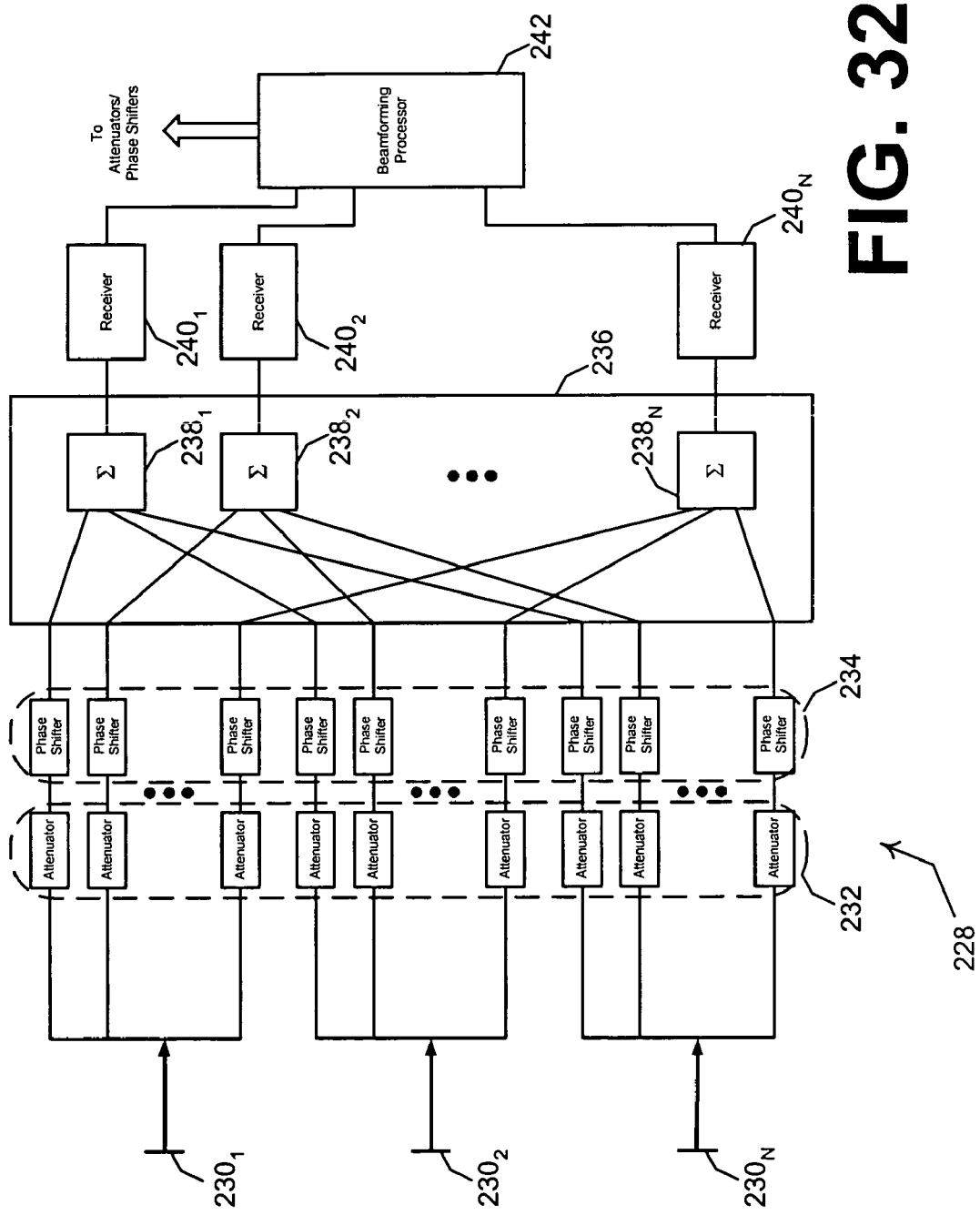
FIG. 32 illustrates an RF adaptive beamforming system.

An RF Adaptive Beamforming (RFAB) system 228 is illustrated in FIG. 32. The RFAB system includes a plurality of antenna elements 230 and a plurality of analog or digitally controlled attenuators 232 and phase shifters 234 for each antenna element, where the number of attenuators and phase shifters may be less than, the same as, or greater than the number of antenna elements. A plurality of signal combiners 236 is also included, where the number of signal combiners is equal to the numbers of antenna elements in the first plurality. The output of each signal combiner is referred to as a beam port 238. The system also uses a plurality of receivers 240, where the number of receivers is equal to the number of signal combiners 238, and hence the number of antennae elements 230

A beamforming processor 242 controls the attenuators and phase shifters associated with each beam port based on information input from the receiver, including, signal-to-noise ratio ("SNR"), carrier-to-noise and interference ratios ("CINR"), and other performance metrics such as packet or frame error rate. Beamforming processor 242 may also implement remote commands from other network elements, such as, for example, a base station controller ("BSC") and a radio network controllers ("RNC").

Any of the digital adaptive beamfomiing (DABF) embodiments described above may be combined with an RFAB implementation. A beamsteering system may be constructed, for example, that implements DABF in the azimuth plane while implementing RFAB in the elevation plane.

Downlink Aspects

The uplink direction is defined as the direction from some fixed or mobile user terminal to a base station and the downlink direction as the direction from the base station to some fixed or mobile user terminal. The aspects described to this point may be incorporated into additional embodiments that perform beamsteering in both the uplink and downlink directions.

Figure 33:
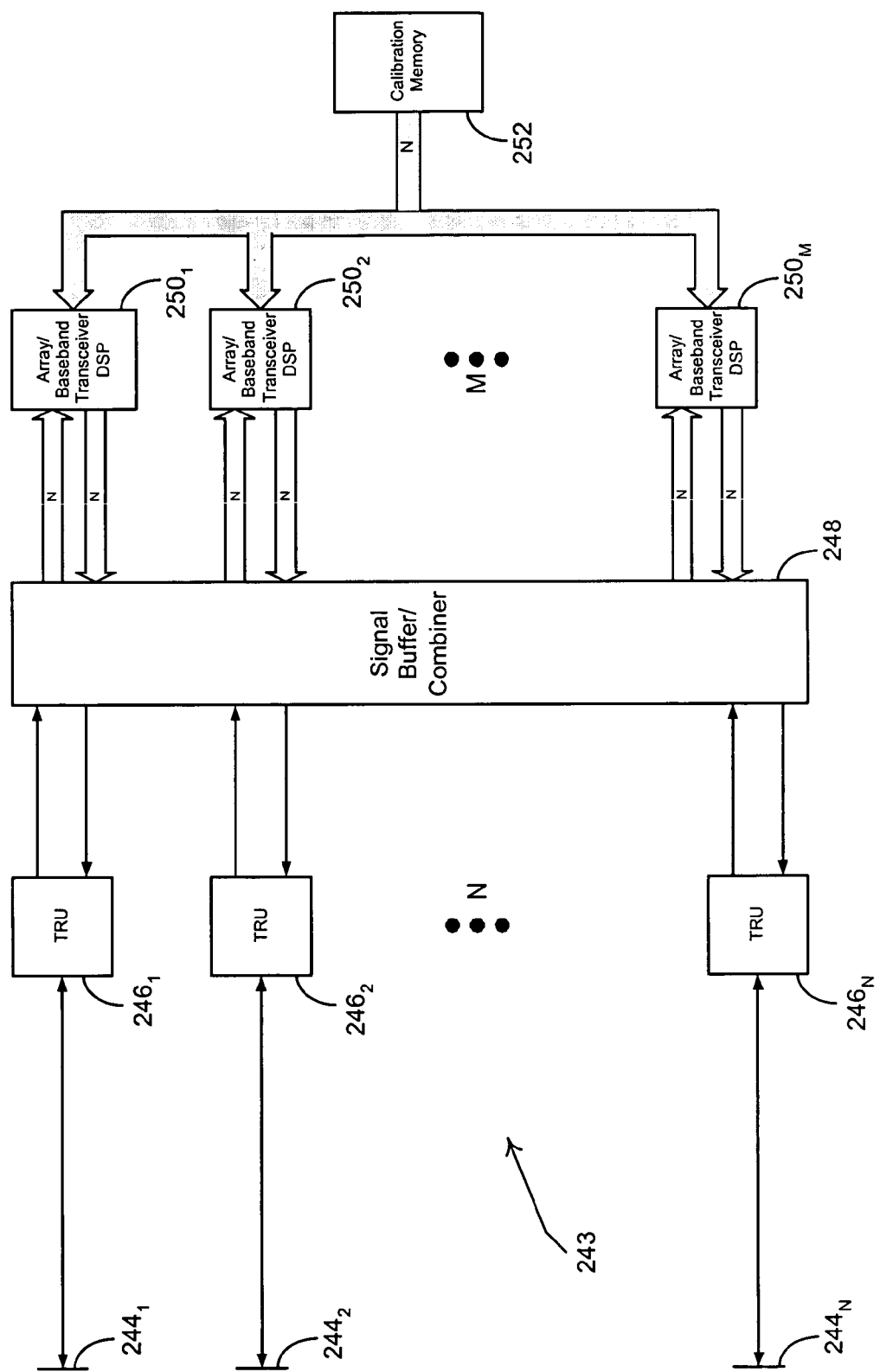
FIG. 33 illustrates a downlink system.

FIG. 33 illustrates a basic downlink solution. The illustrated system 243 includes a plurality of antenna elements 244, a corresponding plurality of transrnit-receive units ("TRU") 246, which convert RF signals produced at each antenna element to digitized IF or baseband sequences. The TRU's 246 also convert input digital IF or baseband sequences to RF signals to be input to each antenna element. A signal buffer 248 produces M copies of each set of digital received signals produced by the plurality of TRUs 246 and accepts M×N input sequences from a plurality of array/baseband transceiver DSPs 250 (described below) and produces N output sequences to be processed by the plurality of TRUs.

The signal buffer 248 adjusts the amplitude of all sequences to the input of the TRU so that the power of each of the N composite element output sequences does not exceed some predetermined level. The system also comprises a plurality of M array/baseband transceiver DSPs 250, where M may be less than, equal to, or greater than the number of antenna elements N. The function of each Array/Baseband Transceiver DSP is described in more detail below. In addition, the system comprises a calibration memory element 252, which contains amplitude and phase correction factors which compensate for differences between receive and transmit channels when applying uplink amplitude and phase factors to beams formed in the downlink.

Figure 34:
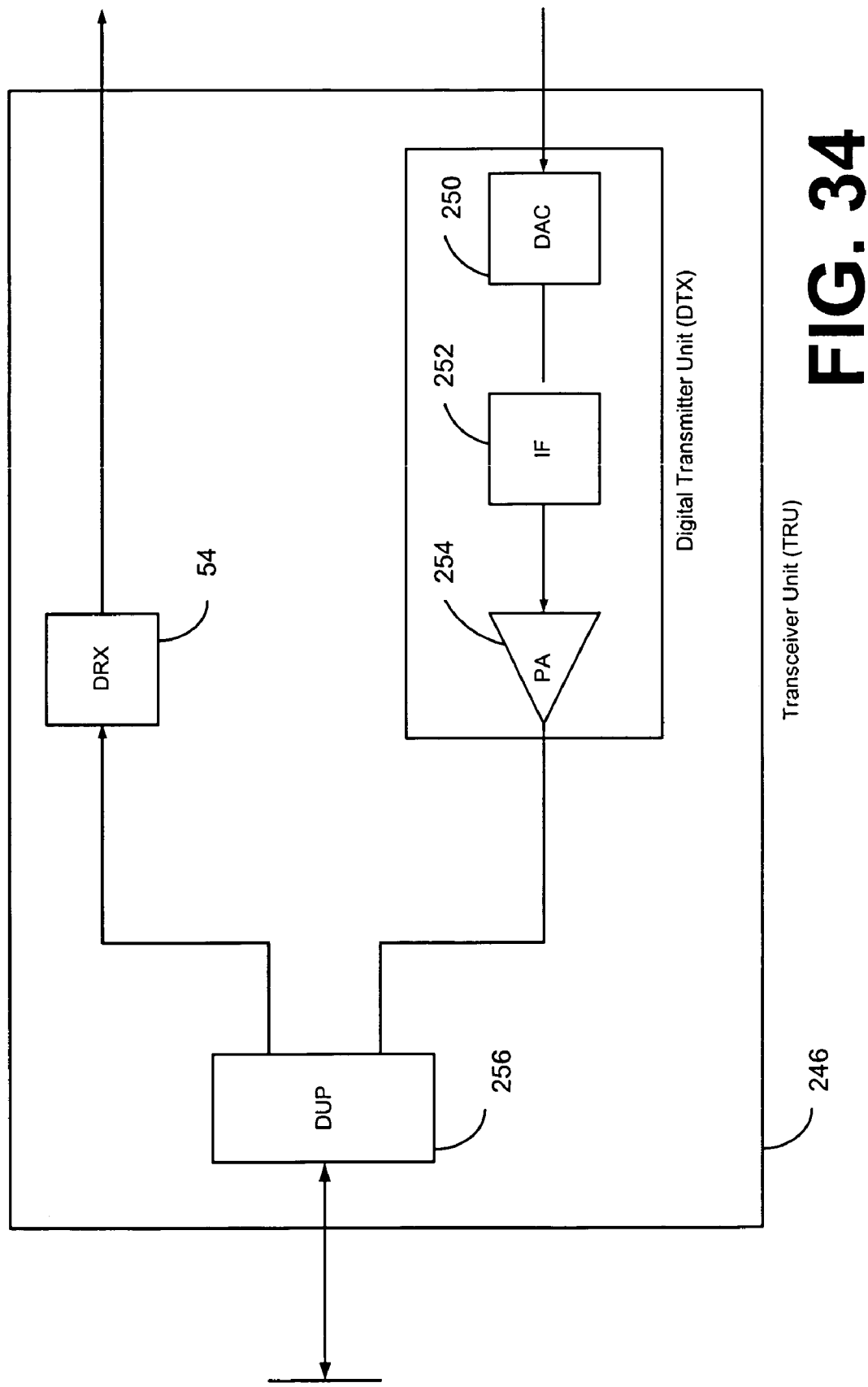
FIG. 34 illustrates the structure of a transmit receive unit used in a system that provides downlink and uplink functionality.

As shown in FIG. 34, each TRU comprises a DRX 54, as described above, a digital transmitter unit ("DTX") 248, which further comprises a digital-to-analog converter ("DAC") 250, an optional IF upconverter stage 252 and a power amplifier 254. Each TRU also comprises a duplexer or diplexer ("DUP") 256.

In an alternate embodiment (not illustrated), separate antenna elements are designated as transmit or receive elements. In this embodiment, no duplexer or diplexer is required—each receive element is connected to a dedicated DRX and each transmit element is connected to a dedicated DTX.

Figure 35:
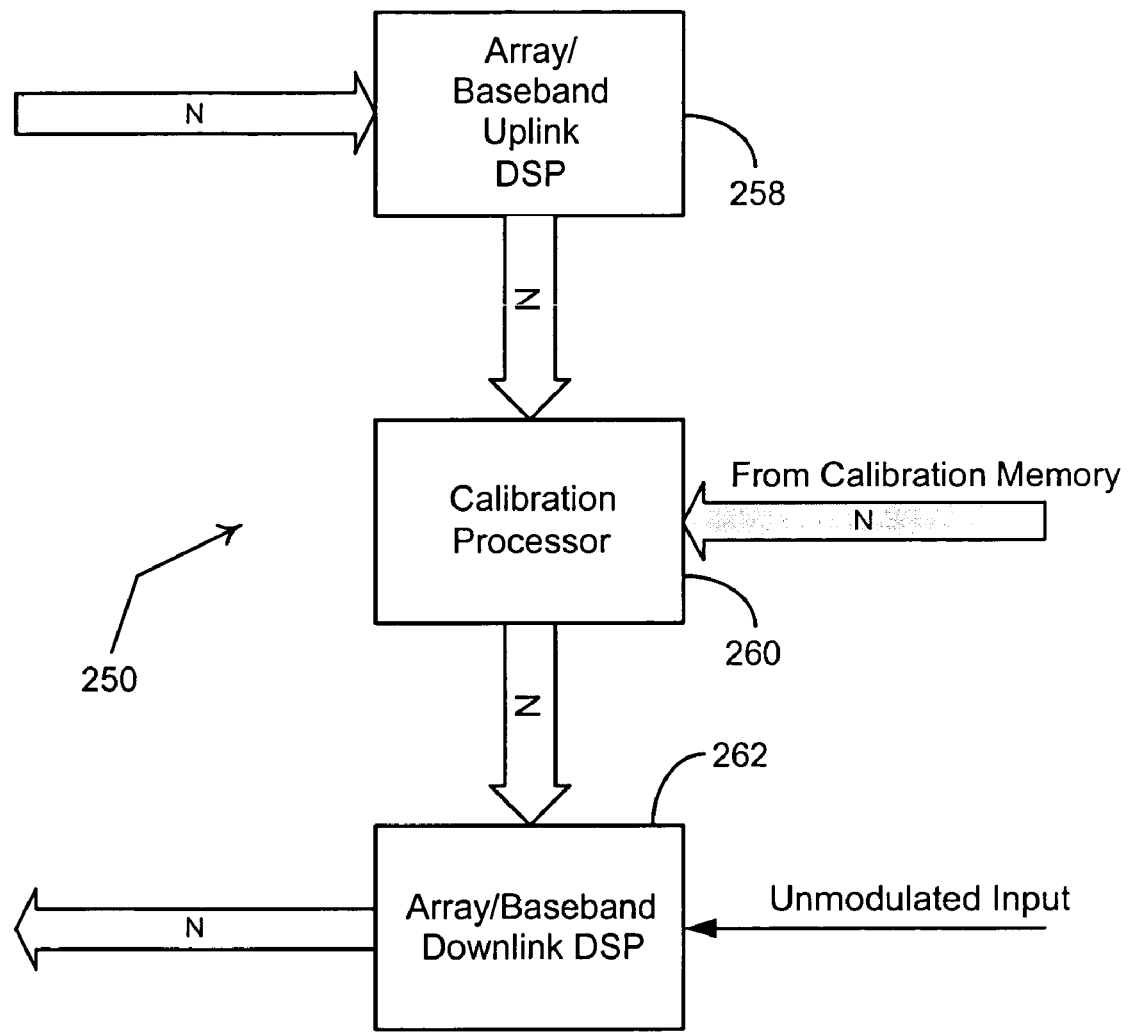
FIG. 35 illustrates the structure of an array/baseband transceiver digital signal processor.

FIG. 35 illustrates the preferred embodiment for each array/baseband transceiver DSP 250 as shown in FIG. 33. Each array/baseband transceiver DSP 250 comprises an array/baseband uplink DSP 258, which performs the function of the array/baseband DSP described above and illustrated in FIG. 5, but with an additional output for providing the optimal trial weight set identified by the genetic processor 78 within the DSP. A calibration processor 260 accepts inputs from the calibration memory 252 shown in FIG. 33 and applies appropriate amplitude and phase corrections to the weight's output by the array/baseband uplink DSP 258. An array/baseband downlink DSP 262 accepts a weight set from the calibration processor 260 and an unmodulated input, and provides inputs for each antenna element to the signal buffer/combiner 248 shown in FIG. 33.

Figure 36:
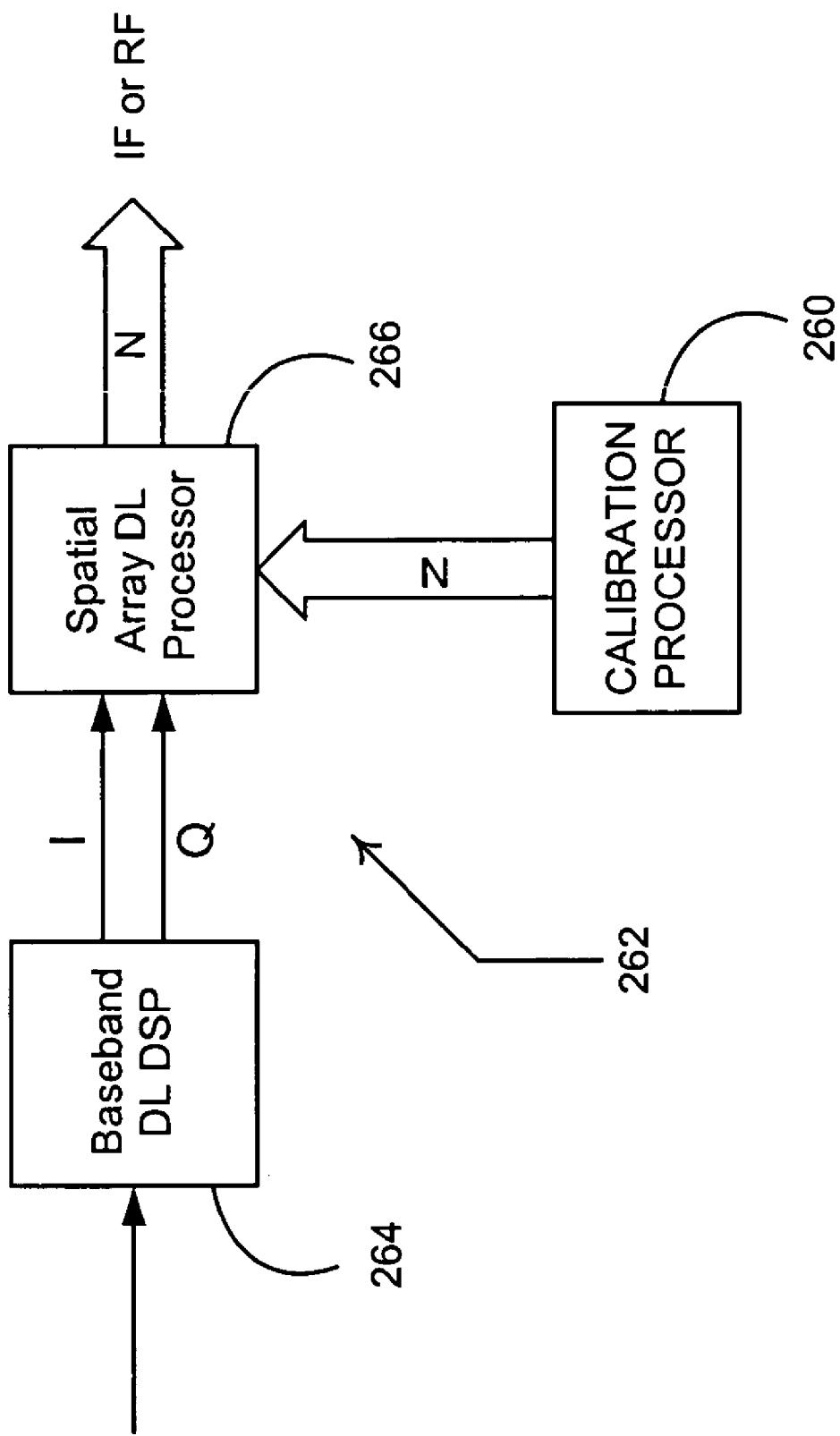
FIG. 36 is a block diagram illustrating an array/baseband downlink digital signal processor.

FIG. 36 shows a block diagram of internal components of array/baseband downlink DSP 262 as including a baseband downlink DSP 264 that receives unmodulated inputs corresponding to a specific user and provides digital baseband in-phase and quadrature signals to spatial array downlink processor 266, which also receives antenna element weighting factors from the calibration processor 260 and provides independent digital IF or RF outputs for each antenna element.

Figure 37:
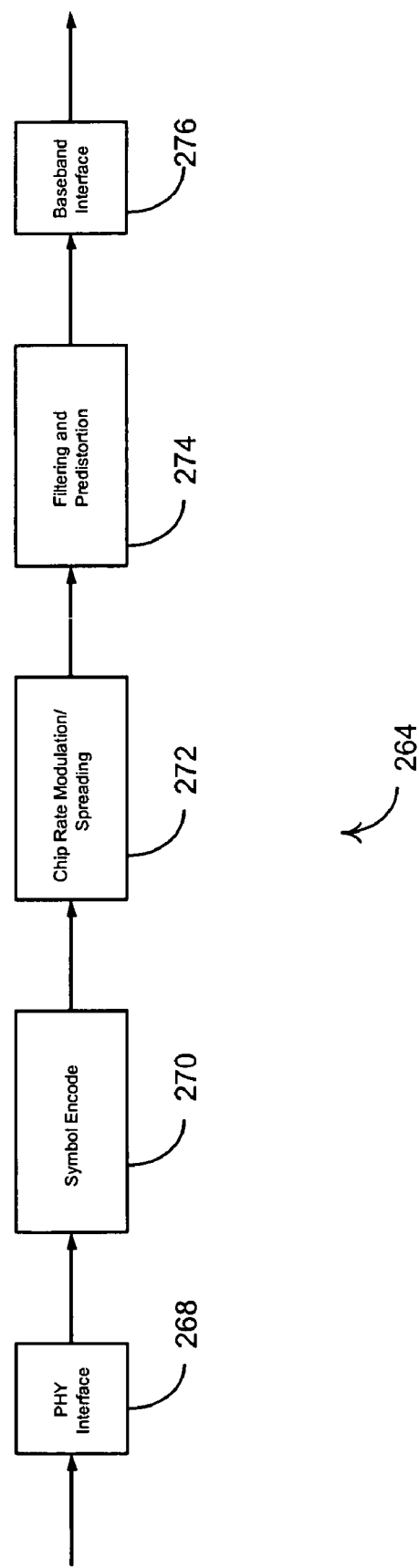
FIG. 37 illustrates a baseband downlink digital signal processor.

The preferred embodiment of the baseband downlink DSP 264 provides downlink baseband signal processing functions required for a CDMA system, such as, for example, IS-95, cdma2OOO, W-CDMA, and SC-CDMA. As shown in FIG. 37, baseband downlink DSP comprises a physical layer interface function means ("PHY") 268, a symbol encoding means 270, a chip rate modulation/spreading function means 272, a filtering and predistortion function means 274 and a baseband interface 276.

Figure 38:
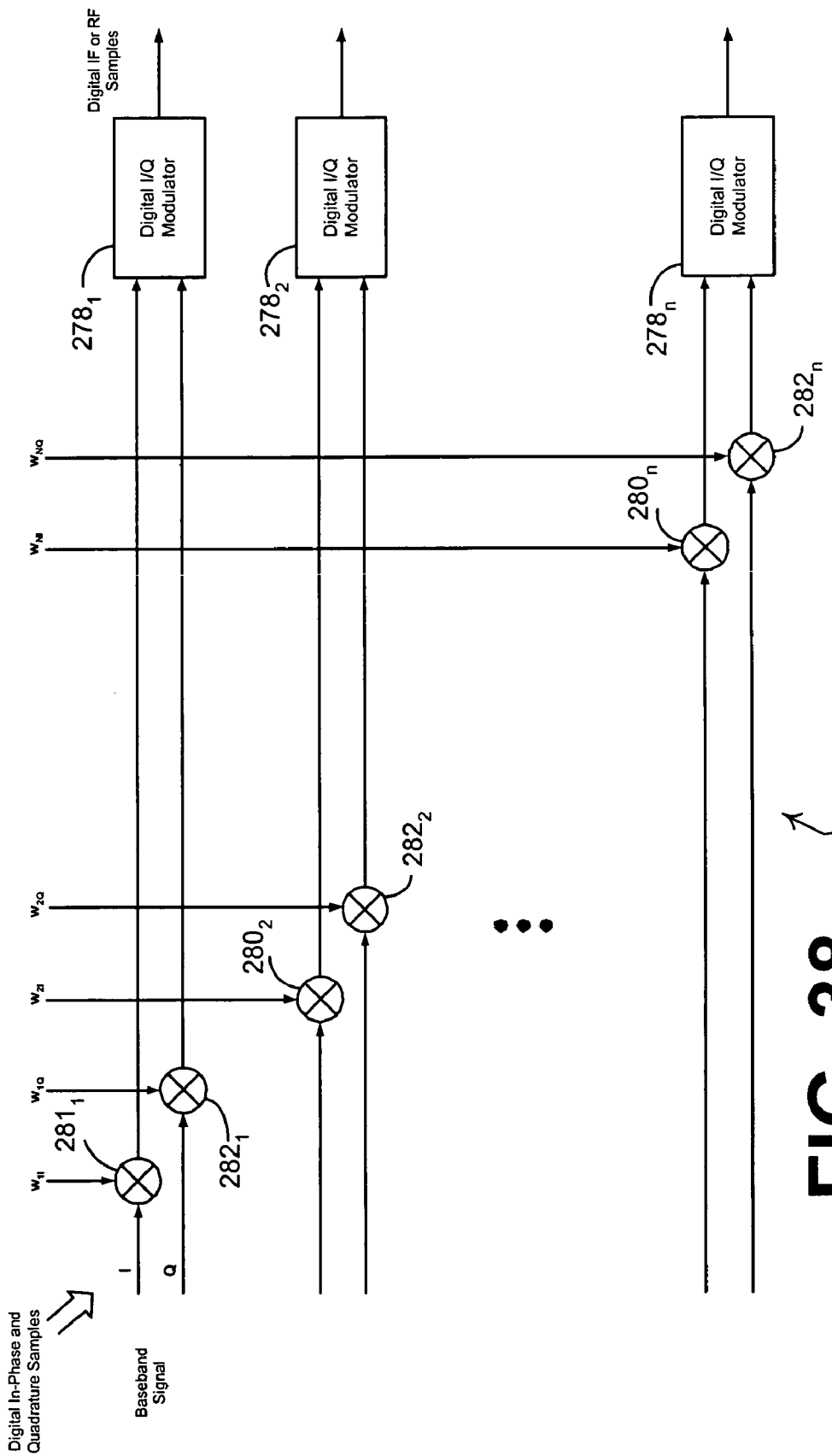
FIG. 38 illustrates a spatial array downlink processor.

In FIG. 38, spatial array downlink processor 266 shown in FIG. 36 includes for each antennae element weight a digital I/Q modulator 278, an in-phase multiplier 280 and a quadrature multiplier 282 that multiply the in-phase and quadrature outputs respectively of each baseband downlink DSP 264, shown in FIG. 36, by the respective in-phase and quadrature scalar components of the corresponding antenna element weight. As with the uplink embodiment discussed above, it will be appreciated that instead of separate I and Q output signals from downlink DSP 264, the output may be complex, and accordingly, be multiplied by a single complex multiplier that receives a complex weight factor from the selection processor.

Figure 39:
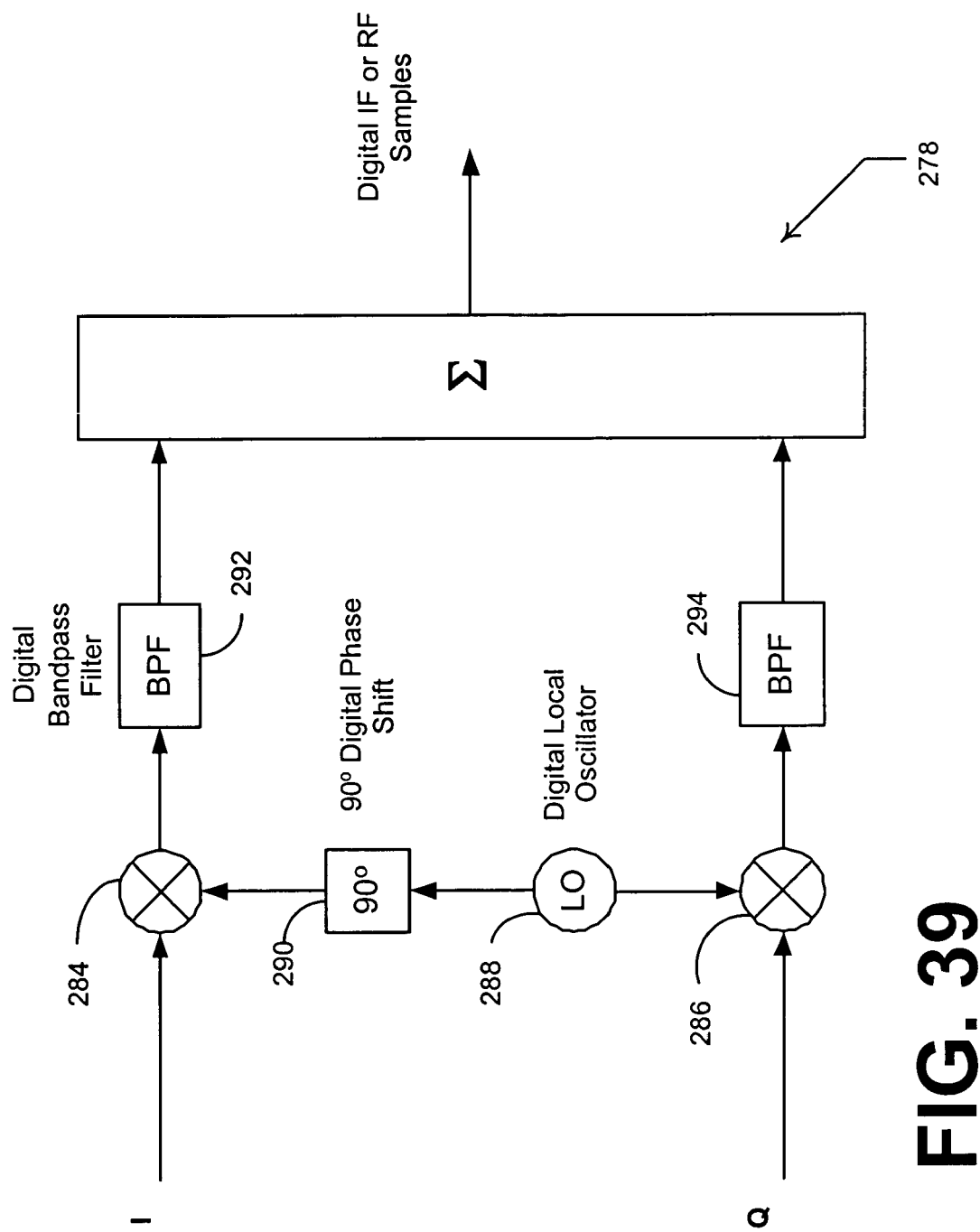
FIG. 39 illustrates a digital I/Q modulator used in a spatial array downlink processor.

FIG. 39 illustrates the preferred embodiment of each digital I/Q modulator 278 of FIG. 38. Each modulator 278 includes an in-phase multiplier 284 and a quadrature multiplier 286 for processing of the input signals. Digital local oscillator 288 provides a digital sequence that takes the place of an analog local oscillator and 90° digital phase shifter 290 may act on either one or the other of the outputs from digital local oscillator 288 (the illustrated embodiment implements the phase shift in the in-phase leg). Digital band pass filters 292 and 294 are implemented at the output of multipliers 284 and 286 respectively.

System 243 shown in FIG. 33 can be extended to include, for example, the polarimetric and tapped delay line features discussed in reference to the uplink aspect. These additions merely serve to increase the number of downlink signal channels that need to be implemented for each user. The system described above and illustrated in FIG. 33 uses accurate knowledge of mismatches between the phases and amplitudes of each transmit and receive channel.

Figure 40:
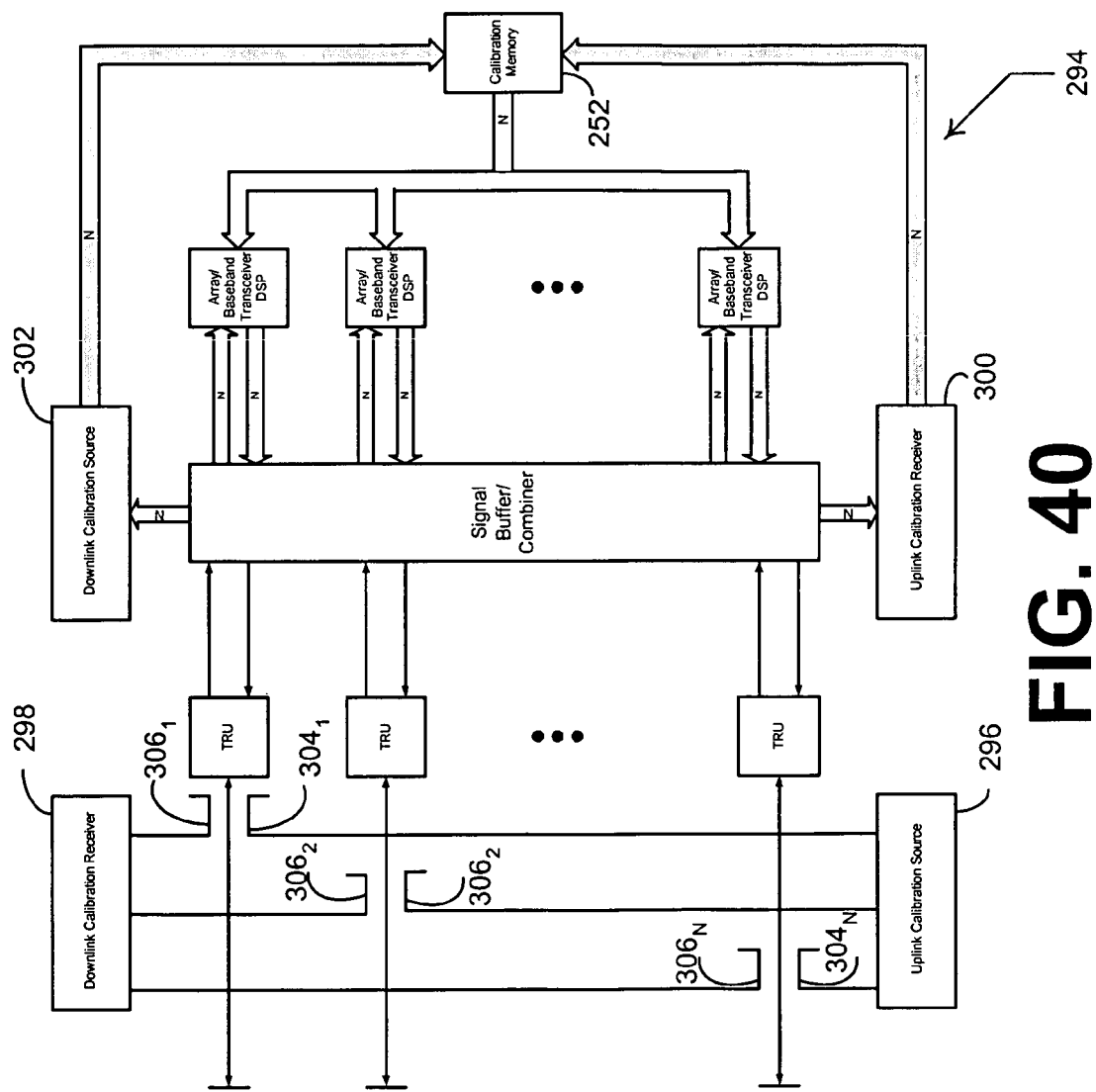
FIG. 40 illustrates a system for measurement of amplitude and phase calibration coefficients.

FIG. 40 illustrates the preferred embodiment of a system 294 with components that enable active measurement of the amplitude and phase calibration coefficients. This system is based on system 243, illustrated in FIG. 33, with added components. Uplink calibration RF source 296 and downlink calibration receiver 298 are coupled respectively to the duplex lines between the antennae elements and TRUs 246 via a plurality of calibration injection ports 304 and a plurality of calibration test points 306 associated with the plurality of N antenna elements. Uplink calibration digital receiver 300 and downlink calibration source 302 are connected to the signal buffer/combiner 248.

The uplink calibration source 296 and calibration injection port network 300 is designed such that the amplitude and phase of the response between the output of the calibration source and the calibration signal injection point are known and any anticipated phase or amplitude changes of the source and injection port network with time and/or in response to changes in the external environment are either negligible or can be accounted for.

The downlink calibration source 302 inputs a digital calibration sequence to the signal/buffer combiner 248 that is multiplexed with the outgoing digital downlink sequences. The test point network 306 and calibration receiver 298 are designed such that the amplitude and phase of the response between the calibration test point and the calibration receiver are known, and any anticipated phase or amplitude changes of the receiver and test point network with time and/or in response to changes in the external environment are negligible, or can be accounted for. Calibration constants determined by the uplink and downlink calibration source/receiver pairs are stored in calibration memory 252 and applied as described in the methods above.

Figure 41:
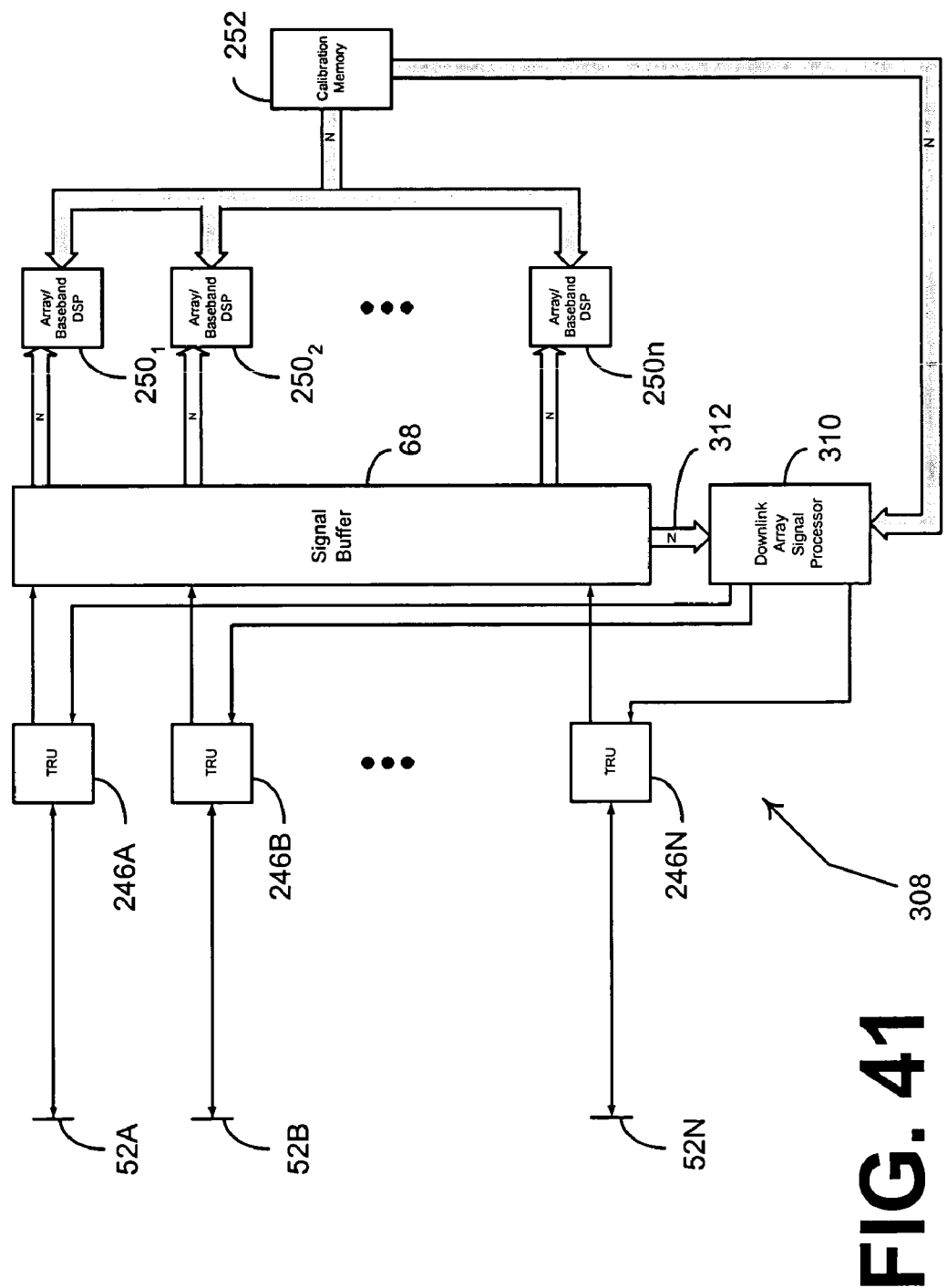
FIG. 41 illustrates an alternative embodiment of an uplink/downlink array processing system.

An alternative embodiment of an uplink/downlink array processing system 308 is shown in FIG. 41. The system comprises a plurality of N antenna elements 52B, a corresponding plurality of N TRUs 246, as described above, a plurality of M receiver array/baseband DSPS 250, as defined above under the uplink system description, a calibration memory 252, as previously defined and a downlink array signal processor 310.

Figure 42:
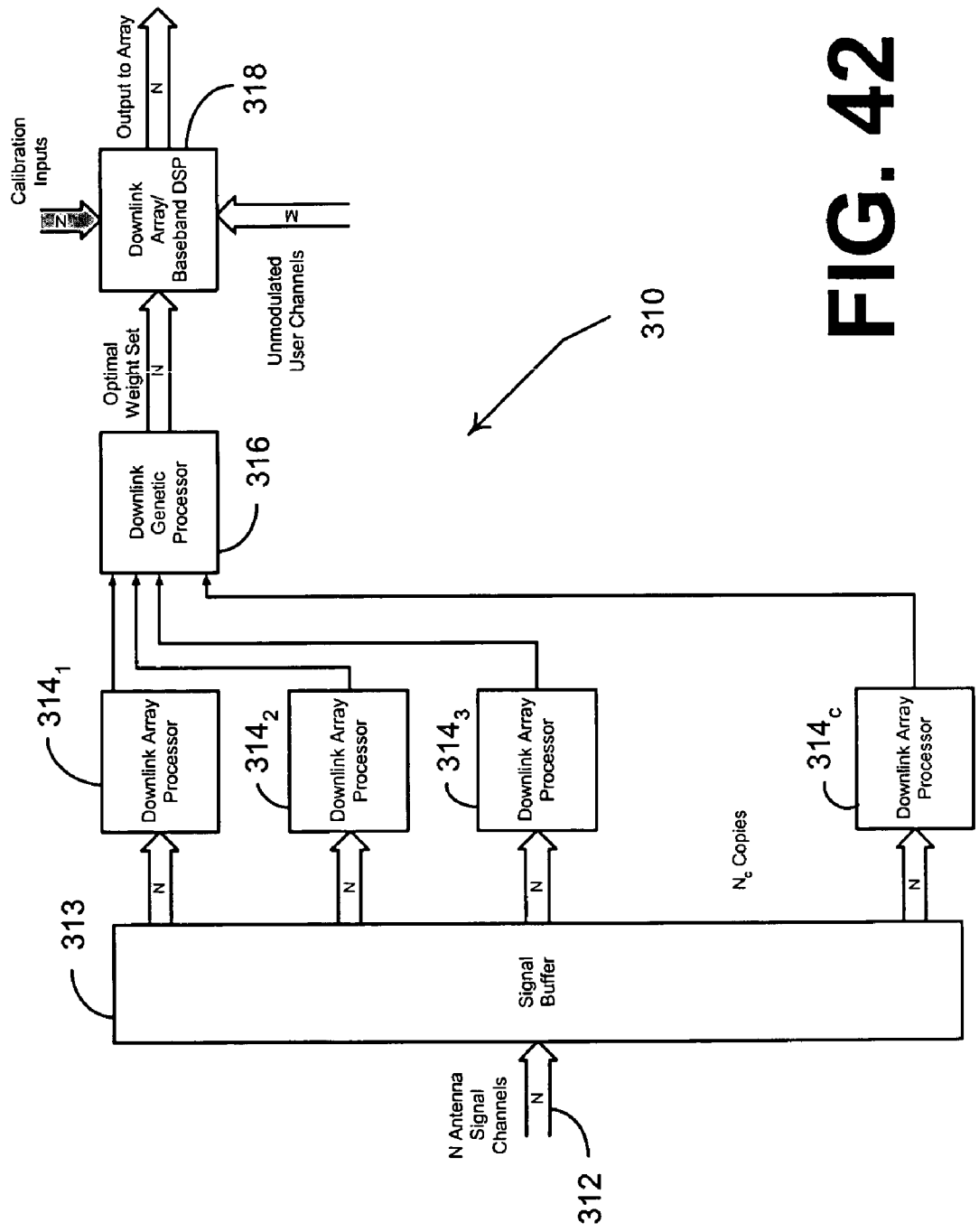
FIG. 42 illustrates the structure of a downlink array signal processor used in an alternative embodiment of an uplink/downlink array processing system.

Internal components of downlink array signal processor 310 are shown in FIG. 42, including signal buffer 313 that accepts the N antenna uplink signal channels 312, and produces $N_C$ copies of each set of N channels at its outputs, a plurality of N downlink array processors 314, a downlink genetic processor 316 and a downlink array/baseband DSP 318.

Figure 43:
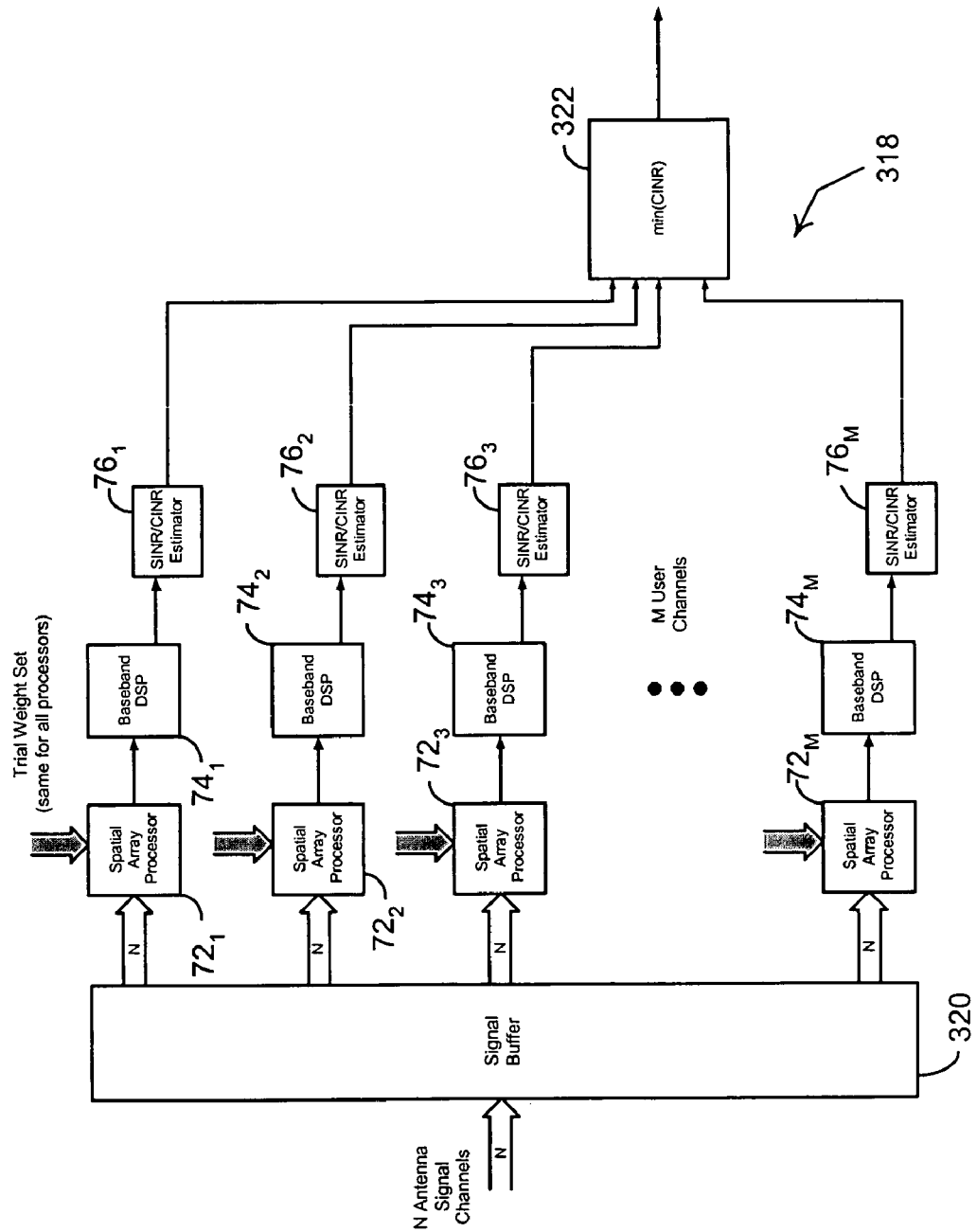
FIG. 43 illustrates the structure of an array/baseband digital signal processor used in an alternative embodiment of an uplink/downlink array processing system.

Internal components of downlink array/baseband DSP 318 are shown in FIG. 43, including signal buffer 320, which accepts N antenna signal input channels from downlink genetic processor 316 as described in reference to FIG. 42 and produces M copies of each set of N channels. Also included in each downlink array/baseband DSP is a plurality of M spatial array processors 72, which are described in reference to FIGS. 5 and 6, a corresponding plurality of baseband DSPS 74, the preferred embodiment of which is illustrated in FIG. 8, a plurality of SINR/CINR estimators 76, each of which performs the similar function as that served in the system shown in FIG. 5, and estimator block 322, which evaluates the minimum SINR/CINR produced by the plurality of SINR/CINR estimators.

In the embodiment shown in FIG. 41, the property of reciprocity between the uplink and downlink is exploited. In general, the response of each individual mobile terminal is simulated within each downlink array processor. The system optimization process seeks to identify the antenna beam that will simultaneously and jointly optimize received SINR/CINR at each mobile terminal. Calibration processes identical to those employed in FIGS. 33 and 40 may be employed to equalize imbalances in phase and amplitude between individual uplink and downlink channels.

Downlink embodiments may also implement polarimetry and tapped delay lines as disclosed above. The effect of implementing either of these features can expand the number of antenna signal channels that the system processes.

Macrodiversity

The systems described in FIGS. 4, 26, 29–33, and 40–42 do not require that receive and/or transmit antenna elements be co-located either with each other or with other base station hardware. This feature enables the elements from two or more geographically separated arrays, A and B, for example, to be combined and processed as if they were a single 10 antenna array. For example, the system could combine elements from an array in cell A with elements in cell B to form a single beam targeted at a user in either cell A, cell B, the handover area between cell A and cell B, or some third cell.

Optoelectronic Array Signal Processing

Figure 44:
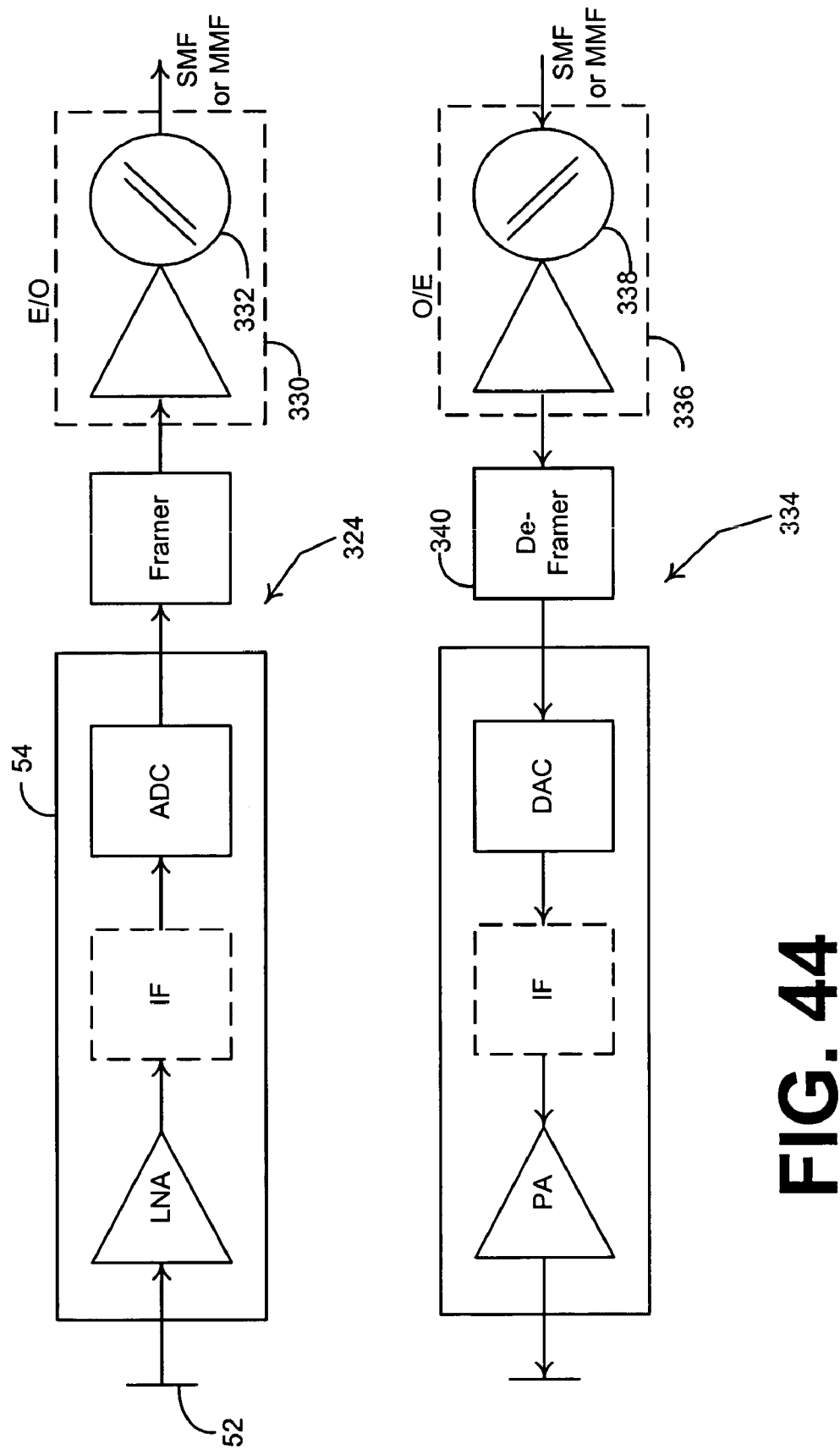
FIG. 44 illustrates the preferred embodiments of an optical transmission technique designed to facilitate the deployment of adaptive antenna arrays.

Optoelectronic array signal processing is a enabling technology that may be used in the systems and methods described above. FIG. 44 illustrates the preferred embodiments of an optical transmission technique designed to facilitate the deployment of adaptive antenna arrays. The uplink, or receive direction, system 324 comprises a plurality of N receiving antenna elements, a corresponding plurality of N DRXs 54 as described previously, a corresponding plurality of framing modules 326, each of which formats raw bit streams from the DRX into higher open system interconnect ("OSI") layer protocol data units ("PDU"s), including, for example, synchronous optical network ("SONET") frames, and a corresponding plurality of electrical-to-optical conversion modules 328 that each incorporate a coherent or non-coherent digital optical transmitter 332.

The downlink, or transmitter, system comprises a plurality of N optical-to-electrical conversion modules 336 that includes photodiodes 338, or other suitable conversion devices. A corresponding plurality of de-framing modules 340 recovers raw bit streams for input to a digital-to-analog converter ("DAC") from some higher OSI layer PDU, including, for example, SONET frames. A corresponding plurality of DTXs as described previously in reference to item 248 of FIG. 34, and a corresponding plurality of transmitting antenna elements.

Figure 45:
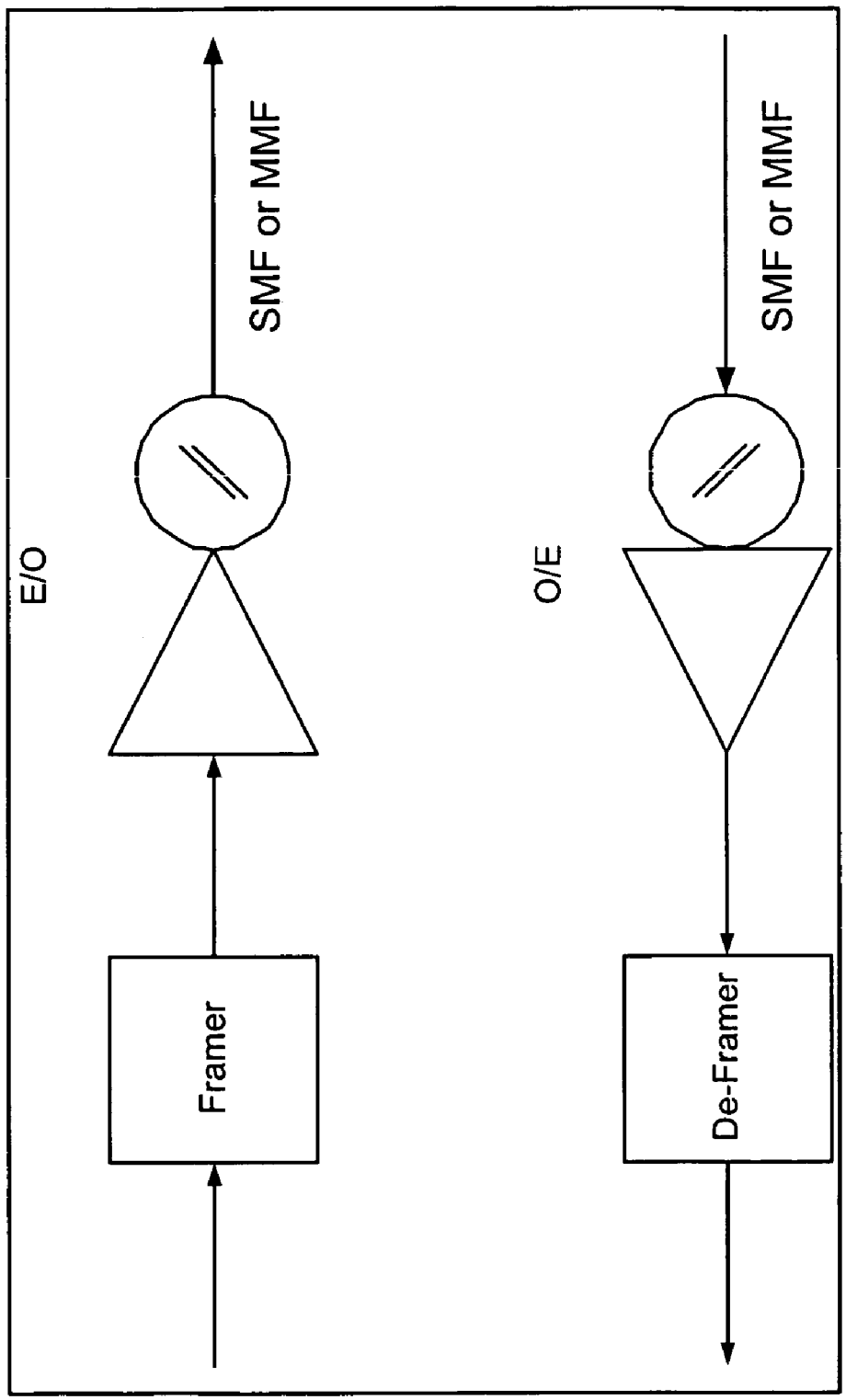
FIG. 45 illustrates interfacing components used in the preferred embodiments of an optical transmission system.

In order to use the systems, methods, and apparatus described in this disclosure, the interfacing components shown in FIG. 45 are typically used prior to any signal buffer, DTX, DRX, or TRU, as appropriate, for each antenna element signal. The uplink components comprise, an optical-to-electronic conversion module, a de-framing module, which recovers raw bit streams from a higher OSI layer PDU (including, for example, SONET frames). The downlink components comprise an electronic-to-optical conversion module and a framing module, which produces higher layer PDUs (including, for example, SONET frames) from raw bit streams.

Figure 46:
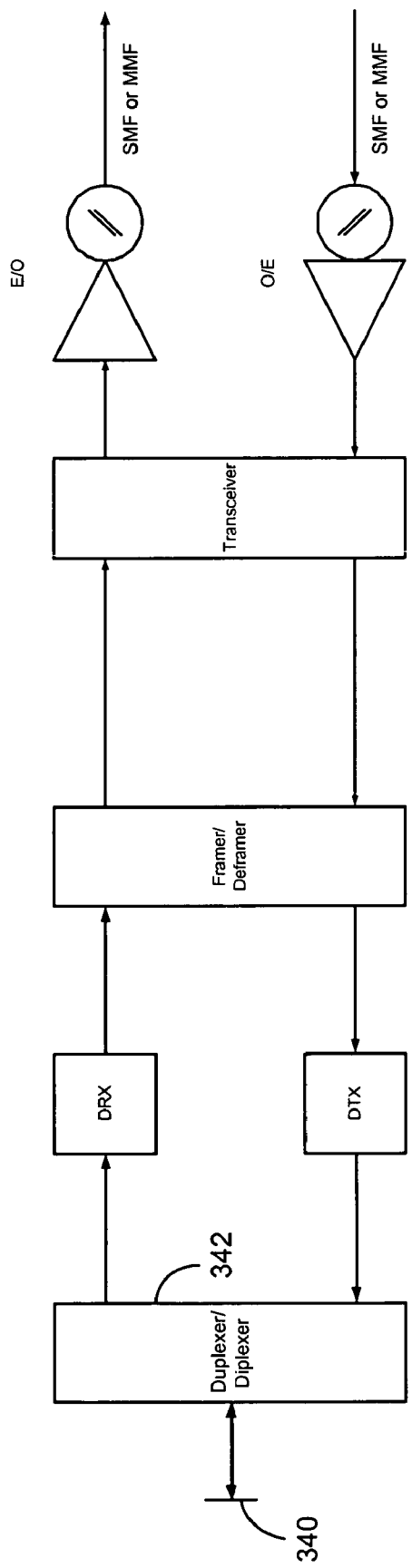
FIG. 46 illustrates optical interface components that may be used when only a single antennae element is available for both transmission and reception.

The embodiments illustrated in FIGS. 44 and 45 typically use separate receive and transmit antenna elements. When only a single element is available for both reception and transmission, the system illustrated in FIG. 46 may be employed. This embodiment comprises the components of the embodiments shown in FIGS. 44 and 45 with the following exceptions. A single antenna element 340 is employed for both transmission and reception. In such an embodiment, each plurality of antenna elements is associated with a plurality of duplexers or diplexers, 342 which separate transmit and receive signals for processing by separate signal processing chains. Framing and de-framing are performed by an integral component in the preferred embodiment and a transceiver function is implemented between the framing/deframing functions and the optoelectronic conversion functions.

Figure 47:
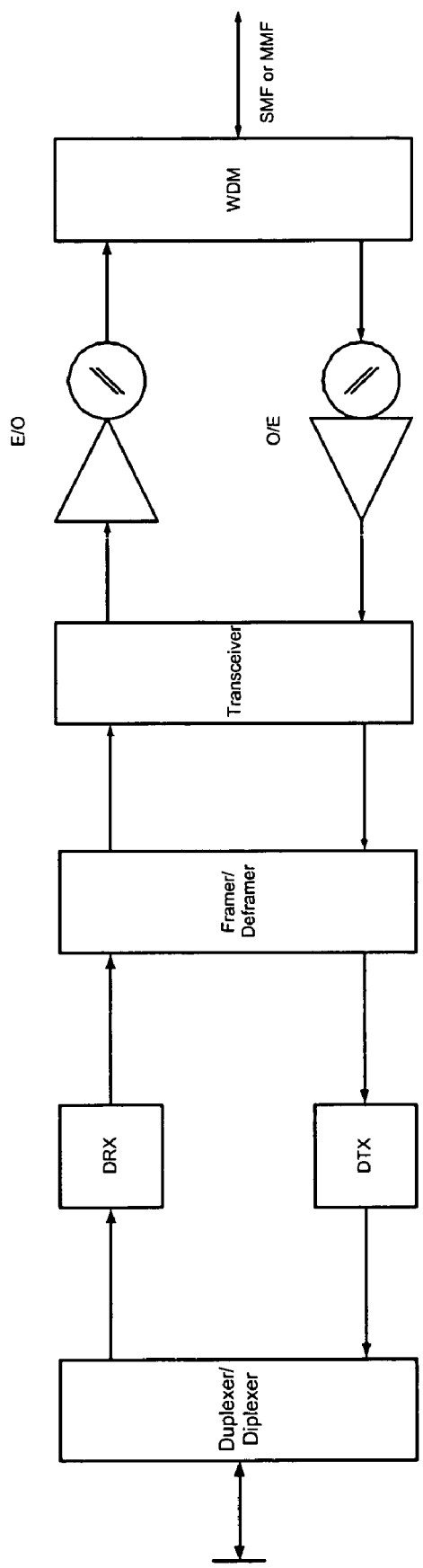
FIG. 47 illustrates an alternative embodiment of an opto-electric array transmission system.

One additional embodiment of the optoelectronic array transmission system is shown in FIG. 47. This embodiment employs wave division multiplexing ("WDM") or dense wave division multiplexing ("DWDM") to eliminate one of the two fibers required to implement the transmit or receive path from the antenna element. The WDM/DWDM technique may utilize, for example, carriers of 1310 nm in the uplink path and 1550 nm in the downlink path, or 1550 nm in the uplink path and 1310 nm in the downlink path. Alternatively, a first 1550 nm wavelength signal from a ITU grid in the uplink path, and a second 1550 nm wavelength from the ITU grid in the downlink path may be used.

Mobile Array Applications

The systems and methods previously described may also be extended to mobile applications. A mobile receiving system would take the form of the system shown in FIG. 4, but typically with a smaller number of user channels. Each user channel would correspond to an independent path, as in the case with a conventional CDMA RAKE, receiver, or would support a signal from a supporting base station, as is the case in soft hand-off in CDMA systems.

Similarly, the transmitter and receiver concepts detailed in FIGS. 33–43 may be used in a mobile application, such as, for example, where the M user channels correspond to individual signal paths or base station links.

Figure 48:
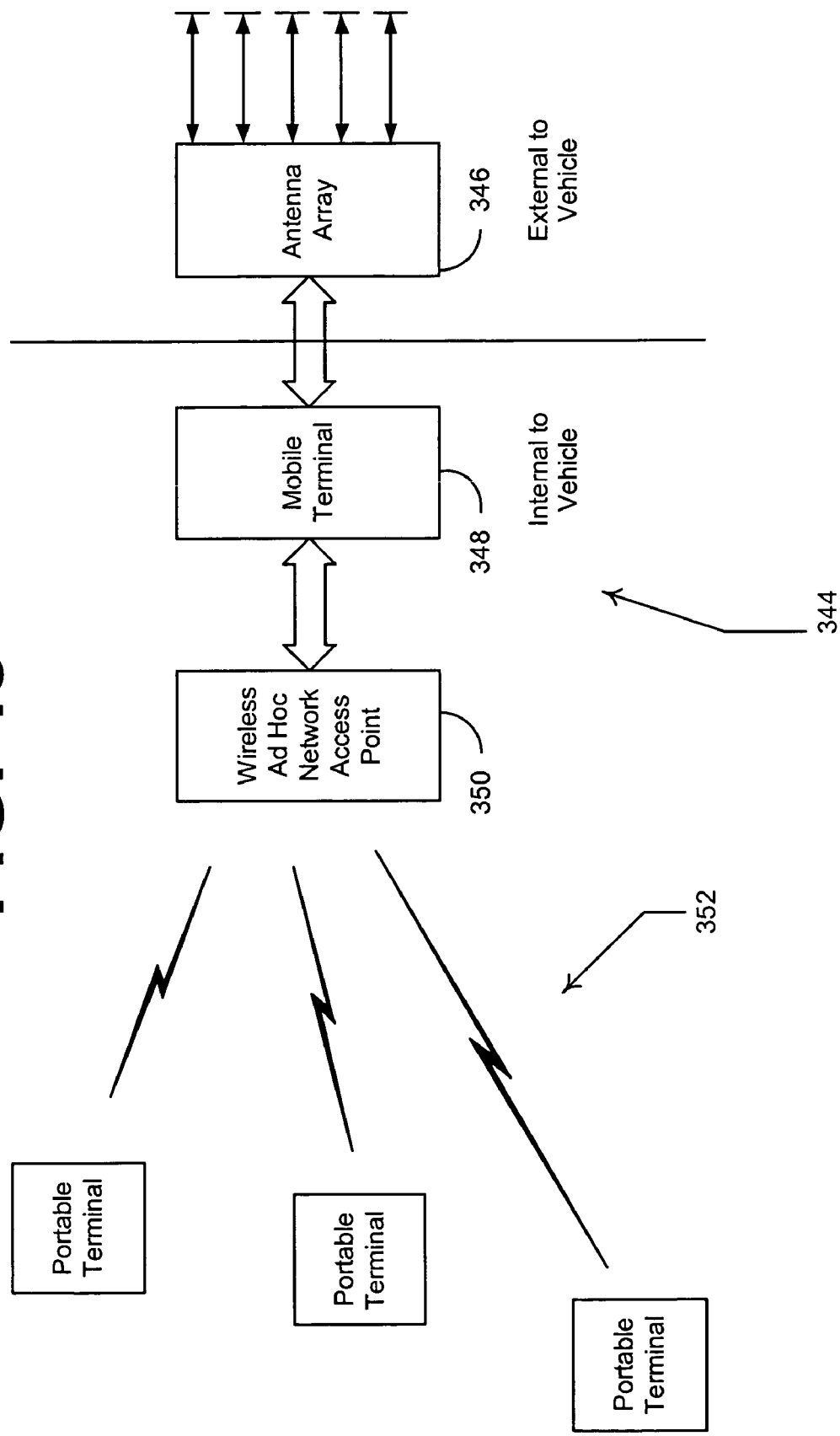
FIG. 48 illustrates a mobile adaptive array system.

One system enabled by the proposed mobile adaptive array is illustrated in FIG. 48. In this system 344, the array elements 346 and all or part of the array active electronics are external to the vehicle. A mobile terminal 348 that implements the described array processing techniques is mounted inside the vehicle and interfaces with a Mobile Ad Hoc Network ("MANET") Access Point ("AP") 350. Protocols that support such operation include without limitation Bluetooth, HomeRF, 802.11, 802.11*b*, 802.11*a*, 802.11*g*, and HIPERLAN/2. The proximity of portable terminals within the vehicle including without limitation mobile handsets, Personal Digital Assistants (PDAs), or portable computers will generally support a relatively high data rate between the portable terminal and the MANET AP 350. The MANET AP 350 then interfaces with the mobile terminal 348 using a high bandwidth wired connection, while the mobile terminal—by virtue of its connection to the external array—is able to support a relatively high data rate between the MANET-connected user(s) 352 and the wireless data provider radio access network. This system could be installed not only within a public conveyance such as a train or bus, but also within a personal vehicle in order to support single or multiple passengers or terminals.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for selectively detecting a user communication signal received with a plurality of antennae elements, the output of said antennaes being multiplexed into a plurality of user-channel signals comprising:

for each of a plurality of chromosome channels, demodulating each user channel signal into a predetermined number of baseband signals based on a candidate weight set associated with the corresponding chromosome channel;

estimating a fitness level corresponding to the baseband signals for each chromosome channel;

genetically processing each fitness level to update each candidate weight set; and selecting one of the demodulated baseband output signals based on a predetermined fitness level.

2. The method of claim 1 wherein the fitness level corresponds to a signal-to-interference and noise ratio of the baseband signal.

3. The method of claim 1 wherein a spatial array processor is used to demodulate each user channel into the predetermined number of baseband signals.

4. The method of claim 1 wherein a space-time array processor is used to demodulate each user channel into the predetermined number of baseband signals.

5. The method of claim 1 wherein the plurality of antennae elements includes a plurality of pairs of antennae elements.

6. The method of claim 5 wherein each element in each pair of elements is orthogonally polarized with respect to the other element in said pair.

7. The method of claim 1 wherein the antennae elements are grouped in elevation plane subarrays.

8. The method of claim 1 wherein the antennae elements are grouped in azimuth plane subarrays.

9. A method for genetically processing a fitness level to selectively process baseband signals in a communication system having a plurality of antennae elements, the method comprising:
   loading predefined seed chromosomes, the seed chromosomes being a parent generation for a first iteration;
   generating a candidate weight set embodied in a plurality of chromosome weights by decoding of the parent generation, wherein the chromosome weights represent phase and amplitude for each of the antenna elements;
   estimating the fitness level for each of the chromosomes in the parent generation based on the candidate weight set;
   selecting chromosomes from the parent generation based on their corresponding fitness levels, wherein the selected chromosomes represent a child generation; and
   converting the selected chromosomes into a parent generation of a next iteration.

10. The method of claim 9 further comprising, for the uplink direction, selecting a baseband signal from the baseband signals being processed based on the chromosome having the highest level of fitness.

11. The method of claim 9 wherein the method is halted when a predetermined condition has been met based on the fitness levels of the chromosomes, the method further comprising, for the downlink direction, using the child chromosomes existing after the method has halted to determine the in-phase and quadrature components of each of a plurality of baseband signals that are fed to a corresponding plurality of antennaes.

12. The method of claim 9 wherein the step of converting includes crossover between at least two different chromosomes of the selected chromosomes.

13. The method of claim 9 wherein the step of converting includes mutation of a gene within one of the selected chromosomes.

14. The method of claim 9 wherein roulette wheel selection is used to determine fitness levels of the chromosomes.

15. The method of claim 9 wherein rank selection is used to determine fitness levels of the chromosomes.

16. The method of claim 9 wherein the step of converting includes elitism.

* * * * *